(12) United States Patent
Tsurumi et al.

(10) Patent No.: US 11,190,533 B2
(45) Date of Patent: Nov. 30, 2021

(54) ANOMALY DETECTION ELECTRONIC CONTROL UNIT, ONBOARD NETWORK SYSTEM, AND ANOMALY DETECTION METHOD

(71) Applicant: Panasonic Intellectual Property Corporation of America, Torrance, CA (US)

(72) Inventors: Junichi Tsurumi, Osaka (JP); Yoshihiro Ujiie, Osaka (JP); Takamitsu Sasaki, Osaka (JP); Takeshi Kishikawa, Osaka (JP); Tohru Wakabayashi, Hyogo (JP); Toshihisa Nakano, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 440 days.

(21) Appl. No.: 16/237,243

(22) Filed: Dec. 31, 2018

(65) Prior Publication Data
US 2019/0141070 A1 May 9, 2019

Related U.S. Application Data

(63) Continuation of application No. PCT/JP2017/023471, filed on Jun. 27, 2017.

(30) Foreign Application Priority Data

Jul. 5, 2016 (JP) .............................. JP2016-133759
Apr. 24, 2017 (JP) .............................. JP2017-085179
Jun. 16, 2017 (JP) .............................. JP2017-118669

(51) Int. Cl.
*H04L 29/06* (2006.01)
*H04L 12/28* (2006.01)
(Continued)

(52) U.S. Cl.
CPC ............ *H04L 63/1425* (2013.01); *B60R 1/00* (2013.01); *B60R 16/0232* (2013.01);
(Continued)

(58) Field of Classification Search
CPC . H04L 63/1425; H04L 12/28; H04L 63/1416; H04L 2012/40215; H04L 2012/40273; B60R 1/00; B60R 16/0232
See application file for complete search history.

(56) References Cited

U.S. PATENT DOCUMENTS 9,616,828 B2 * 4/2017 Ben Noon ............ G06F 21/606
9,705,678 B1 * 7/2017 Wang .................. H04L 63/1466
(Continued)

FOREIGN PATENT DOCUMENTS

JP   2014-146868      8/2014
WO   2015/170451 A1   11/2015

OTHER PUBLICATIONS

Shorabi "FPGA Based Controller Area Network," International Journal of Reconfigurable and Embedded Systems (IJRES), vol. 4, No. 2, Jul. 2015, pp. 122-128 (Year: 2015).*
(Continued)

*Primary Examiner* — Luu T Pham
*Assistant Examiner* — James J Wilcox
(74) *Attorney, Agent, or Firm* — Greenblum & Bernstein, P.L.C.

(57) ABSTRACT

An anomaly detection electronic control unit (ECU) that detects unauthorized messages on a communication path is provided. An ECU that periodically transmits a first-type message including data to be monitored, and an ECU that periodically transmits a second-type message including data for comparison, are connected to the communication path. The anomaly detection ECU includes: a receiver that successively receives first-type and second-type messages; a
(Continued)

processor that determines whether a first-type message received is normal or anomalous; and a transmitter that transmits a predetermined message in accordance with results of the determining. The determining is performed based on content of the first-type message, content of a second-type message last received at the time of receiving this first-type message, and at least one of content of a first-type message received further in the past than this first-type message, and content of a second-type message received further in the past than the second-type message last received.

20 Claims, 34 Drawing Sheets

(51) Int. Cl.
  *B60R 1/00* (2006.01)
  *B60R 16/023* (2006.01)
  *H04L 12/40* (2006.01)
(52) U.S. Cl.
  CPC ............. *H04L 12/28* (2013.01); *H04L 12/40* (2013.01); *H04L 63/1416* (2013.01); *H04L 2012/40215* (2013.01); *H04L 2012/40273* (2013.01)

(56) References Cited

U.S. PATENT DOCUMENTS

| | | | | |
|---|---|---|---|---|
| 9,792,440 | B1* | 10/2017 | Wang | H04L 63/1466 |
| 9,794,286 | B2* | 10/2017 | Otsuka | H04L 63/1416 |
| 9,840,212 | B2* | 12/2017 | Ben Noon | G06F 11/30 |
| 9,843,594 | B1* | 12/2017 | Evans | H04L 63/1425 |
| 9,881,165 | B2* | 1/2018 | Litichever | H04L 12/40169 |
| 9,967,274 | B2* | 5/2018 | Corrales | H04L 63/1441 |
| 10,091,077 | B1* | 10/2018 | Pukish | H04L 67/12 |
| 10,369,942 | B2* | 8/2019 | Ben Noon | G06F 21/55 |
| 2005/0222933 | A1* | 10/2005 | Wesby | H04W 4/50 705/36 R |
| 2006/0015231 | A1* | 1/2006 | Yoshimura | B60T 7/12 701/48 |
| 2007/0054685 | A1* | 3/2007 | Kellum | G01S 13/931 455/517 |
| 2009/0157252 | A1* | 6/2009 | Saen | G07C 5/0816 701/31.4 |
| 2009/0187370 | A1* | 7/2009 | Pasolini | G01P 15/00 702/141 |
| 2010/0030421 | A1* | 2/2010 | Yoshimura | B60W 10/10 701/31.4 |
| 2010/0169717 | A1* | 7/2010 | Sonoda | H04L 12/437 714/48 |
| 2011/0126082 | A1* | 5/2011 | Pickel | G06F 11/0739 714/768 |
| 2012/0053778 | A1* | 3/2012 | Colvin | G06Q 10/1097 701/29.4 |
| 2014/0188343 | A1* | 7/2014 | Yoshimura | B60W 30/00 701/41 |
| 2014/0195808 | A1* | 7/2014 | Lortz | H04L 63/0263 713/170 |
| 2015/0033016 | A1* | 1/2015 | Thornton | H04L 63/061 713/171 |
| 2015/0089236 | A1* | 3/2015 | Han | H04W 12/10 713/181 |
| 2015/0100207 | A1* | 4/2015 | Yoshimura | B60L 15/2009 701/41 |
| 2015/0113638 | A1* | 4/2015 | Valasek | G06F 21/562 726/22 |
| 2015/0271201 | A1* | 9/2015 | Ruvio | H04L 63/1441 726/23 |
| 2015/0358351 | A1 | 12/2015 | Otsuka et al. | |
| 2015/0363606 | A1* | 12/2015 | Nairn | H04L 63/1491 701/32.6 |
| 2015/0373158 | A1* | 12/2015 | Kim | H04L 12/40189 709/223 |
| 2016/0035147 | A1* | 2/2016 | Huang | H04L 9/3271 701/31.4 |
| 2016/0188396 | A1* | 6/2016 | Sonalker | H04L 63/1425 714/37 |
| 2016/0189056 | A1* | 6/2016 | Mayhew | G06N 20/00 706/12 |
| 2016/0197944 | A1* | 7/2016 | Allouche | H04L 63/1466 726/23 |
| 2016/0205194 | A1 | 7/2016 | Kishikawa et al. | |
| 2016/0264071 | A1* | 9/2016 | Ujiie | H04L 63/123 |
| 2016/0308891 | A1* | 10/2016 | Cain | H04L 12/40 |
| 2016/0359893 | A1* | 12/2016 | Kishikawa | H04L 67/12 |
| 2016/0381059 | A1* | 12/2016 | Galula | B60R 25/30 726/23 |
| 2016/0381066 | A1* | 12/2016 | Galula | B60R 25/30 726/23 |
| 2016/0381067 | A1* | 12/2016 | Galula | H04W 12/12 726/23 |
| 2016/0381068 | A1* | 12/2016 | Galula | H04L 63/123 726/23 |
| 2017/0093659 | A1* | 3/2017 | Elend | H04L 43/08 |
| 2017/0098070 | A1* | 4/2017 | Ning | G06F 21/51 |
| 2017/0324557 | A1* | 11/2017 | Morita | H04L 63/08 |
| 2017/0349143 | A1* | 12/2017 | Menard | B60R 25/24 |
| 2018/0012272 | A1* | 1/2018 | Menard | H04L 9/006 |
| 2018/0115575 | A1* | 4/2018 | Hartkopp | H04L 63/1425 |
| 2018/0196941 | A1* | 7/2018 | Ruvio | H04W 12/122 |
| 2018/0213351 | A1* | 7/2018 | Gusikhin | H04W 4/80 |

OTHER PUBLICATIONS

Boudguiga et al "A Simple Intrusion Detection Method for Controller Area Network," IEEE ICC 2016 Communication and Information Systems Security Symposium, pp. 1-7 (Year: 2016).*
Abbott-McCune et al "Techniques in Hacking and Simulating a Modern Automotive Controller Area Network," 2016, IEEE, pp. 1-7 (Year: 2016).*
Lin et al "Cyber-Security for the Controller Area Network (CAN) Communication Protocol," 2012 International Conference on Cyber Security, 2012, IEEE, pp. 1-7 (Year: 2012).*
The Extended European Search Report dated May 22, 2019 for the related European Patent Application No. 17824059.4.
International Search Report of PCT application No. PCT/JP2017/023471 dated Sep. 19, 2017.

* cited by examiner

FIG. 5

| | | |
|---|---|---|
| ERROR FLAG (PRIMARY) | ERROR FLAG (SECONDARY) | DEL |

RECESSIVE — top; DOMINANT — bottom

FIG. 6A

| ID | DLC | DATA |
|---|---|---|
| 0x01 | 2 | 0x10 0x12 |

FIG. 6B

| FIRST BYTE | SECOND BYTE | READ RESULTS |
|---|---|---|
| 0x00 | OTHER THAN 0x00 | TRAVELING FORWARD |
| 0x00 | 0x00 | STOPPED |
| 0x10 | OTHER THAN 0x00 | TRAVELING BACKWARD |

FIG. 7A

| ID | DLC | DATA |
|---|---|---|
| 0x02 | 1 | 0x01 |

FIG. 7B

| FIRST BYTE | READ RESULTS |
|---|---|
| 0x00 | PARK |
| 0x01 | NEUTRAL |
| 0x02 | DRIVE |
| 0x03 | REVERSE |

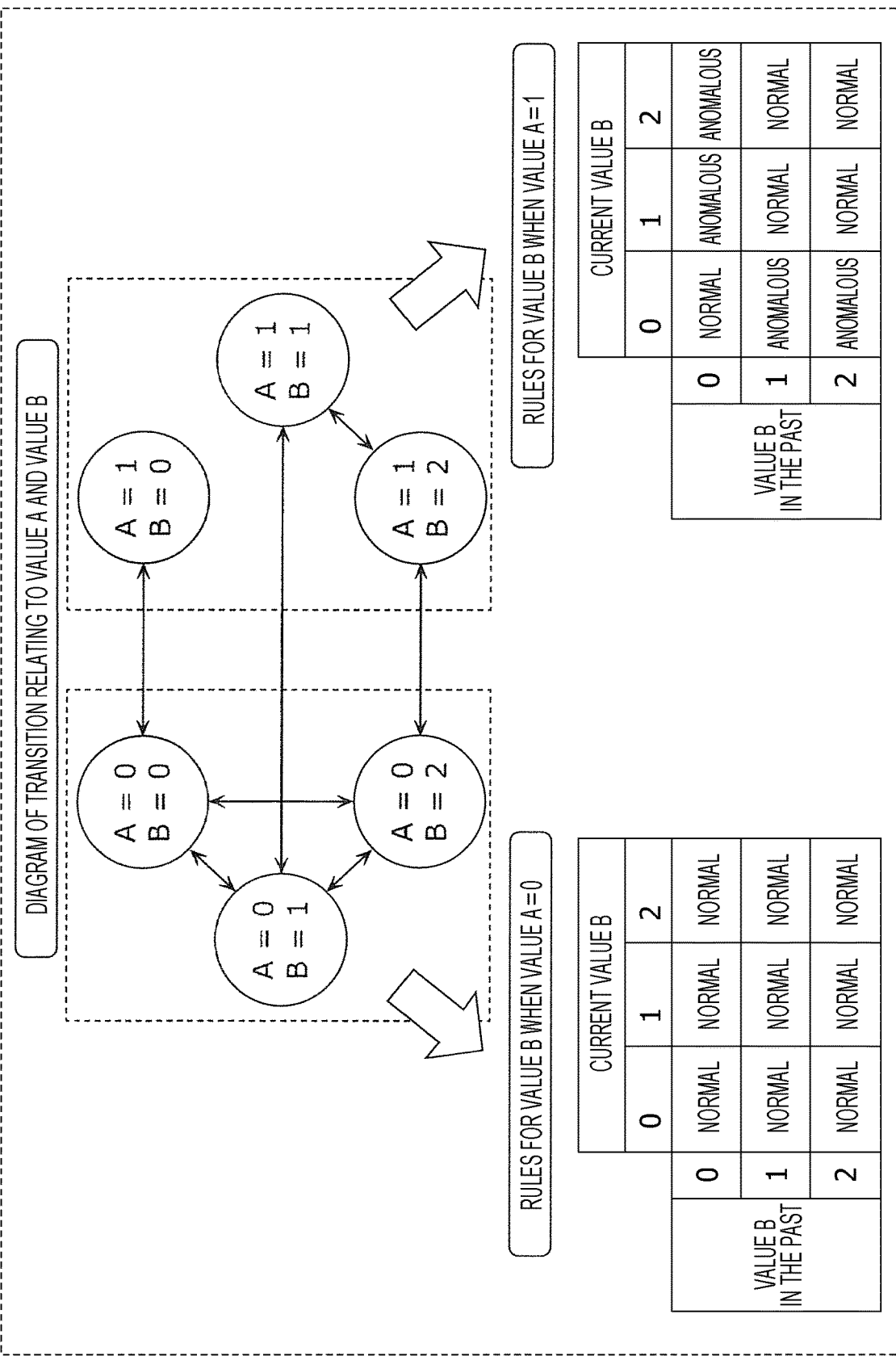

FIG. 9

RULES FOR WHEN STOPPED

| | | CURRENT STATE OF GEARSHIFT POSITION | |
|---|---|---|---|
| | | DRIVE | REVERSE |
| STATE OF GEARSHIFT POSITION IN PAST | DRIVE | NORMAL | NORMAL |
| | REVERSE | NORMAL | NORMAL |

RULES FOR WHEN TRAVELING FORWARD

| | | CURRENT STATE OF GEARSHIFT POSITION | |
|---|---|---|---|
| | | DRIVE | REVERSE |
| STATE OF GEARSHIFT POSITION IN PAST | DRIVE | NORMAL | ANOMALOUS |
| | REVERSE | N/A | N/A |

FIG. 10

RULES FOR WHEN GEARSHIFT POSITION IS IN DRIVE

| | | CURRENT MOTION OF VEHICLE | | |
|---|---|---|---|---|
| | | TRAVELING FORWARD | STOPPED | TRAVELING BACKWARD |
| MOTION OF VEHICLE IN PAST | TRAVELING FORWARD | NORMAL | NORMAL | ANOMALOUS |
| | STOPPED | NORMAL | NORMAL | ANOMALOUS |
| | TRAVELING BACKWARD | N/A | N/A | N/A |

RULES FOR WHEN GEARSHIFT POSITION IS IN REVERSE

| | | CURRENT MOTION OF VEHICLE | | |
|---|---|---|---|---|
| | | TRAVELING FORWARD | STOPPED | TRAVELING BACKWARD |
| MOTION OF VEHICLE IN PAST | TRAVELING FORWARD | N/A | N/A | N/A |
| | STOPPED | ANOMALOUS | NORMAL | NORMAL |
| | TRAVELING BACKWARD | ANOMALOUS | NORMAL | NORMAL |

FIG. 11

RULES FOR STOPPED → TRAVELING FORWARD

| | | CURRENT STATE OF GEARSHIFT POSITION | |
|---|---|---|---|
| | | DRIVE | REVERSE |
| STATE OF GEARSHIFT POSITION IN PAST | DRIVE | NORMAL | ANOMALOUS |
| | REVERSE | NORMAL | ANOMALOUS |

RULES FOR TRAVELING BACKWARD → STOPPED

| | | CURRENT STATE OF GEARSHIFT POSITION | |
|---|---|---|---|
| | | DRIVE | REVERSE |
| STATE OF GEARSHIFT POSITION IN PAST | DRIVE | N/A | N/A |
| | REVERSE | NORMAL | NORMAL |

FIG. 12

| | ID | CURRENT VALUE | VALUE ONE TIME BACK | .... |
|---|---|---|---|---|
| DATA TO BE MONITORED | 0x02 | DRIVE | NEUTRAL | .... |
| DATA FOR COMPARISON | 0x01 | TRAVELING FORWARD | STOPPED | .... |
| | .... | .... | .... | .... |

FIG. 28

| ID | DLC | DATA |
|---|---|---|
| 0x10 | 3 | 0x01 0x02 0xFD |

FIG. 30

| ID | DLC | DATA |
|---|---|---|
| 0x20 | 2 | 0x02 0xF8 |

FIG. 31

| FIRST TO SECOND BYTES<br>STEERING STATE ANGLE | READ RESULTS |
|---|---|
| 0x02 0xF8 | DECIMAL NOTATION → 760<br>STATE WHERE STEERING WHEEL IS TURNED IN RIGHT DIRECTION BY 40 DEGREES |

FIG. 33

| DATA TO BE MONITORED | DATA FOR COMPARISON | RULE |
|---|---|---|
| DATA FIELD (SECOND TO THIRD BYTES) OF DATA FRAME OF ID=0x10 | DATA FIELD (FIRST TO SECOND BYTES) OF DATA FRAME OF ID=0x20 | DIFFERENCE OF VALUES BETWEEN DATA TO BE MONITORED AND DATA FOR COMPARISON WITHIN 30 IS NORMAL |

FIG. 34

| | ID | CURRENT VALUE | VALUE ONE TIME BACK | VALUE TWO TIMES BACK | |
|---|---|---|---|---|---|
| DATA TO BE MONITORED | 0x10 | 0x02 0xFD | 0x02 0xF8 | 0x02 0xD5 | ... |
| DATA FOR COMPARISON | 0x20 | 0x02 0xF8 | 0x02 0xD5 | | ... |

COMPARE

ANOMALY DETECTION ELECTRONIC CONTROL UNIT, ONBOARD NETWORK SYSTEM, AND ANOMALY DETECTION METHOD

BACKGROUND

1. Technical Field

The present disclosure relates to security measures technology for detecting anomalous messages flowing over a network.

2. Description of the Related Art

In recent years, a great number of devices called electronic control units (ECU) have been placed in systems in automobiles. A network connecting these ECUs is referred to as an onboard network. Many communication standards exist for onboard networks. One of the most mainstream of these onboard networks is a standard called Controller Area Network (CAN), that is stipulated in ISO11898.

In CAN, a communication channel is a bus (network bus) configured using two wires, and each ECU connected to the buses is called a node. Each node connected to a bus transmits/receives messages called frames. A transmitting node that transmits a frame applies voltage to the two wires, and generates potential difference between the wires, thereby transmitting a value "1" called recessive, and a value "0" called dominant. In a case where multiple transmitting nodes transmit recessive and dominant at exactly the same timing, the dominant is transmitted with priority. In a case where there is an anomaly in the format of a received frame, a receiving node transmits a frame called an error frame. An error frame is a continuous transmission of six bits dominant, thereby notifying the transmitting node and other receiving nodes that there is an anomaly in a frame.

No identifiers indicating the transmission destination or transmission source exist in CAN, with the transmitting node attaching an ID to each frame and transmitting, and the receiving nodes only receiving frames of a predetermined ID. The Carrier Sense Multiple Access/Collision Avoidance (CSMA/CA) format is employed, so when multiple nodes transmit at the same time, arbitration by ID is performed, with frames having a smaller ID value being transmitted with higher priority.

There is a threat to CAN onboard network systems in that an attacker might unauthorizedly control an ECU by accessing the bus and transmitting unauthorized frames, and security measures are being studied. For example, Japanese Unexamined Patent Application Publication No. 2014-146868 describes an anomaly detecting method where judgement is made that unauthorized activity has occurred in a case where second data having the same identifier has been received within a communication interval stipulated on the network.

SUMMARY

The above described related art has required further improvement.

In one general aspect, the techniques disclosed here feature an anomaly detection electronic control unit in a network system having a plurality of electronic control units that communicate via a communication path, the anomaly detection electronic control unit being connected to the communication path, the plurality of electronic control units including a first electronic control unit that periodically transmits a first-type message including data to be monitored, and a second electronic control unit that periodically transmits a second-type message including data for comparison. The anomaly detection electronic control unit includes: a receiver that successively receives first-type messages and second-type messages from the communication path; a processor, that in operation, performs operations including determining whether a first-type message received by the receiver is normal or anomalous, based on content of the first-type message, content of a second-type message last received by the receiver at the time of receiving this first-type message, and at least one of content of a first-type message received by the receiver further in the past than this first-type message, or content of a second-type message received by the receiver further in the past than the second-type message last received; and a transmitter that transmits a predetermined message, in accordance with results of the determination.

It should be noted that general or specific embodiments may be implemented as a system, a method, an integrated circuit, a computer program, a storage medium, or any selective combination thereof.

According to the present disclosure, further improvement can be realized. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a diagram illustrating a format of an error frame stipulated in the CAN protocol;

FIG. 6A is a diagram illustrating an example of a data frame that a speed control ECU according to the first embodiment transmits;

FIG. 6B is a diagram illustrating an example of a method of reading speed control information in a data frame transmitted by the speed control ECU;

FIG. 7A is a diagram illustrating an example of a data frame that a gearshift position control ECU according to the first embodiment transmits;

FIG. 7B is a diagram illustrating an example of a method of reading gearshift position control information in a data frame transmitted by the gearshift position control ECU;

FIG. 8 is a diagram illustrating rules that the anomaly detection ECU according to the first embodiment uses;

FIG. 9 is a diagram (part 1) illustrating a specific example of rule tables stored in a rule storage unit of the anomaly detection ECU according to the first embodiment;

FIG. 10 is a diagram (part 2) illustrating a specific example of rule tables stored in a rule storage unit of the anomaly detection ECU according to the first embodiment;

FIG. 11 is a diagram (part 3) illustrating a specific example of rule tables stored in a rule storage unit of the anomaly detection ECU according to the first embodiment;

FIG. 12 is a diagram illustrating an example of a data table stored in a data storage unit of the anomaly detection ECU according to the first embodiment;

FIG. 28 is a diagram illustrating an example of a data frame that a steering wheel control instruction ECU according to the second embodiment transmits;

FIG. 30 is a diagram illustrating an example of a data frame that a steering wheel control ECU according to the second embodiment transmits;

FIG. 31 is a diagram illustrating an example of a method of reading steering wheel state information in a data frame transmitted by the steering wheel control ECU;

FIG. 33 is a diagram illustrating a specific example of a rule table stored in a rule storage unit of the anomaly detection ECU according to the second embodiment;

FIG. 34 is a diagram illustrating an example of a data table stored in a data storage unit of the anomaly detection ECU according to the second embodiment;

DETAILED DESCRIPTION

Figure 1:
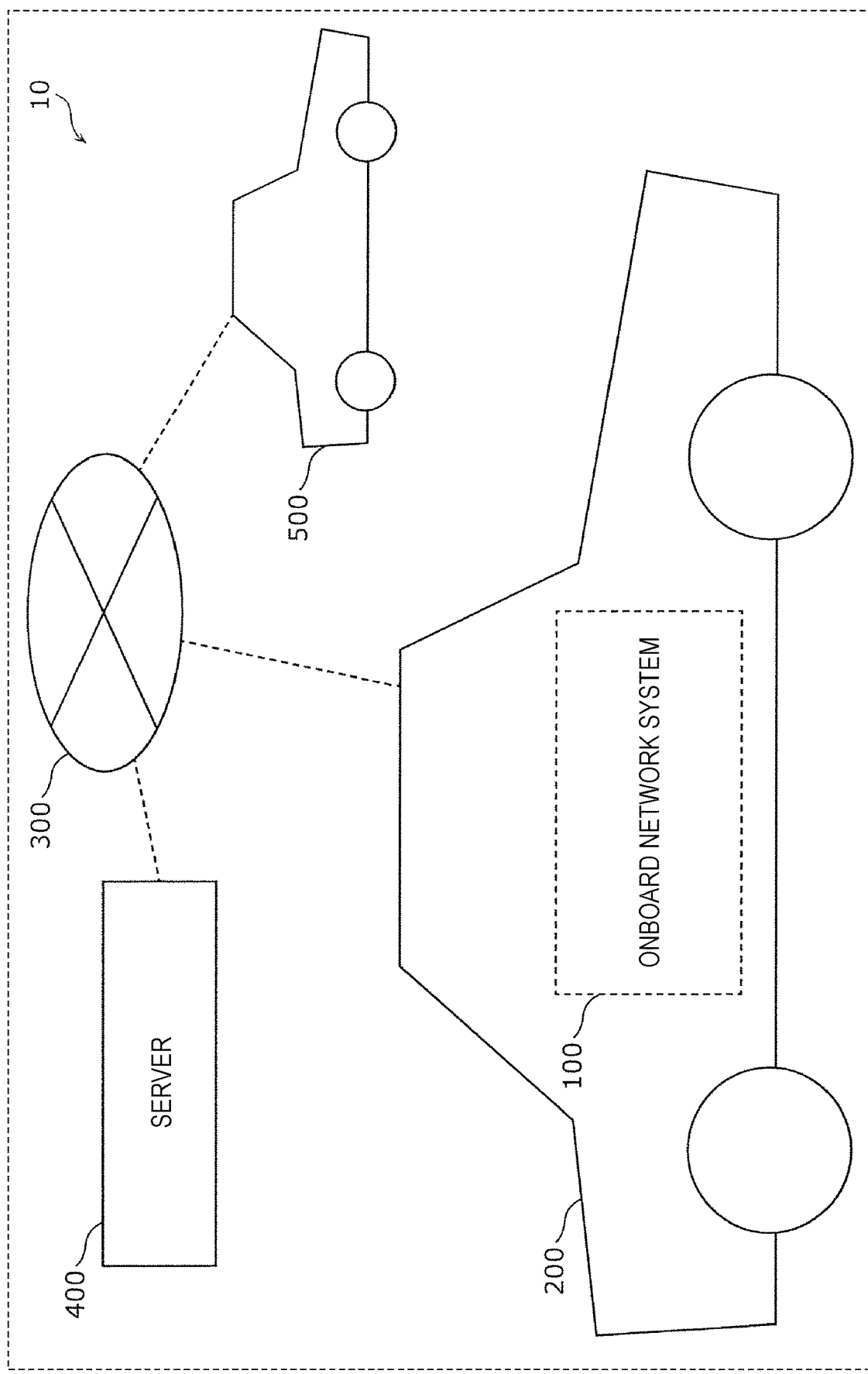
FIG. 1 is a diagram illustrating the overall configuration of an anomaly detection system according to a first embodiment.

With the method according to Japanese Unexamined Patent Application Publication No. 2014-146868, in a case where an attacker transmits a message including unauthorized data at a cycle the same as the cycle as a message including valid data transmitted from a legitimate ECU, and the unauthorized message is transmitted immediately prior to the legitimate message, detection cannot be appropriately made that this is an unauthorized message. With this method, the transmission of the legitimate message following immediately after will be determined to be an occurrence of unauthorized activity. Also, in this method, detection of anomalies cannot be performed with regard to an attack where transmission of a legitimate message by a legitimate ECU is stopped and an unauthorized message is transmitted instead.

Accordingly, the present disclosure provides an anomaly detection electronic control unit (anomaly detection ECU) that appropriately detects anomalies in a case where an unauthorized message is transmitted onto the network by an attacker. Also provided is an onboard network system that appropriately detects anomalies in a case where an unauthorized message has been transmitted, and an anomaly detection method for appropriately detecting anomalies.

An anomaly detection electronic control unit according to an aspect of the present disclosure is an anomaly detection electronic control unit in a network system having a plurality of electronic control units that communicate via a communication path, the anomaly detection electronic control unit being connected to the communication path, the plurality of electronic control units including a first electronic control unit that periodically transmits a first-type message including data to be monitored, and a second electronic control unit that periodically transmits a second-type message including data for comparison. The anomaly detection electronic control unit includes: a receiver that successively receives first-type messages and second-type messages from the communication path; a processor, that in operation, performs operations including determining whether a first-type message received by the receiver is normal or anomalous, based on content of the first-type message, content of a second-type message last received by the receiver at the time of receiving this first-type message, and at least one of content of a first-type message received by the receiver further in the past than this first-type message, or content of a second-type message received by the receiver further in the past than the second-type message last received; and a transmitter that transmits a predetermined message, in accordance with results of the determination.

Accordingly, for example, appropriate determination is possible based on whether the relation or the like between change appearing in the values of multiple data for comparison in multiple second-type messages successively transmitted over time, and the value of the data to be monitored in the first-type message at the time of the change, satisfies a predetermined reference that should be satisfied when normal or should be satisfied when anomalous. Thus, setting and using second-type messages relating to data for comparison so that the determination unit can determine whether data to be monitored is anomalous or not by using the relationship between data to be monitored and data for comparison, enables the anomaly detection electronic control unit to appropriately detect a first-type message, where an attacker has made the content of data to be monitored to be unauthorized content and has caused this to flow onto the network, as being anomalous. For example, even in a case where the attacker transmits an unauthorized first-type message at the same cycle as the cycle as which legitimate electronic control units transmit on the network system, the anomaly can be appropriately detected, and security of the network can be secured.

The anomaly detection electronic control unit may further include a storage, wherein the receiver stores, in the storage, content of each of the first-type message and second-type message that have been received, and wherein the determining is performed by referencing the storage unit. Accordingly, the anomaly detection electronic control unit can use the storage unit in the anomaly detection electronic control unit to speedily perform appropriate determination.

When a first-type message is received by the receiver, the determining may be performed in accordance with whether or not a first data to be monitored included in the first-type message, a first data for comparison included in the second-type message last received by the receiver, and second data to be monitored included in a first-type message received by the receiver one time back from that first-type message, satisfy a predetermined reference. Accordingly, an anomaly regarding the first-type message can be appropriately determined, using the fact that the value of each data to be monitored in two first-type messages and the value of data for comparison in a second-type message are in a certain relation.

When a first-type message is received by the receiver, the determining may be performed in accordance with whether or not a first data to be monitored included in the first-type message, a first data for comparison included in the second-type message last received by the receiver, and second data for comparison included in a second-type message received by the receiver one time back from last time, satisfy a predetermined reference. Accordingly, an anomaly regarding the first-type message can be appropriately determined, using the fact that the value of data to be monitored in a first-type messages and the value of each data for comparison in two second-type messages are in a certain relation.

When a first-type message is received by the receiver, the determining may be performed in accordance with whether or not a first data to be monitored included in the first-type message, a first data for comparison included in the second-type message last received by the receiver, second data to be monitored included in a first-type message received by the receiver one time back from that first-type message, and second data for comparison included in a second-type message received by the receiver one time back from the last, satisfy a predetermined reference. Accordingly, an anomaly regarding the first-type message can be appropriately determined, using the fact that the value of each data to be monitored in two first-type messages and the value of each data for comparison in two second-type messages are in a certain relation.

When a first-type message is received by the receiver, the determining may be performed in accordance with whether or not a first data to be monitored included in the first-type message, a first data for comparison included in the second-type message last received by the receiver, and second data to be monitored included in a first-type message including second data to be monitored of a value different from the first data to be monitored, received by the receiver before reception of the first-type message, satisfy a predetermined reference. Accordingly, an anomaly regarding the first-type message can be appropriately determined, using the fact that there is a certain relation between transition of values of data to be monitored in multiple first-type messages successively transmitted over time, and a value of data for comparison in a second-type message transmitted at the time of the transition.

When a first-type message is received by the receiver, the determining may be performed in accordance with whether or not a first data to be monitored included in the first-type message, a first data for comparison included in the second-type message last received by the receiver, and second data to be monitored included in a second-type message including second data to be monitored of a value different from the first data to be monitored, last received by the receiver before reception of the second-type message last received, satisfy a predetermined reference. Accordingly, an anomaly regarding the first-type message can be appropriately determined, using the fact that there is a certain relation between transition of values of data for comparison in multiple second-type messages successively transmitted over time, and a value of data to be monitored in a first-type message transmitted at the time of the transition.

When a first-type message is received by the receiver, the determining may be performed in accordance with whether or not a first data to be monitored included in the first-type message, a first data for comparison included in the second-type message last received by the receiver, second data to be monitored included in a first-type message including second data to be monitored of a value different from the first data to be monitored, received by the receiver last before reception of the first-type message, and second data for comparison in a second-type message including the second data for comparison of a different value from the first data for comparison last received by the receiver last before receiving the second-type message last received, satisfy a predetermined reference. Accordingly, an anomaly regarding the first-type message can be appropriately determined, using the fact that there is a certain relation between transition of values of data to be monitored in multiple first-type messages successively transmitted over time, and values of data for comparison in multiple second-type messages transmitted at the time of the transition.

The plurality of electronic control units may include a third electronic control unit that periodically transmits a third-type message including reference data, wherein the receiver successively receives third-type messages, and wherein the determining is further performed based on content of the third-type message last received by the receiver at the time of receiving the first-type message, and content of a third-type message received further in the past than the third-type message last received by the receiver. Accordingly, the relation with reference data in the third-type messages is used in addition to the relationship between data to be monitored and data for comparison, so anomaly regarding the first-type message can be determined more appropriately by deciding the third-type message appropriately.

The plurality of electronic control units may include a third electronic control unit that periodically transmits a third-type message including reference data, wherein the receiver further successively receives the third-type messages, wherein the operations further include determining whether a second-type message received by the receiver is normal or not, based on content of the second-type message, content of a third-type message last received by the receiver at the time of receiving the second-type message, and at least one of content of a second-type message received by the receiver further in the past than the second-type message, and content of a third-type message received further in the past than the third-type message last received by the receiver, and wherein determining of whether the first-type message received by the receiver is normal or anomalous is performed based on content of the first-type message, content of the second-type message that was last received by the receiver at the time of receiving the first-type message that has been determined to be normal, and either of content of a first-type message received further in the past by the receiver than that first-type message, or content of a second-type message that was received by the receiver and determined to be normal further in the past than the second-type message last received by the receiver and determined to be normal.

The network system may be installed in a vehicle, wherein the data to be monitored and the data for comparison is data used for control of the vehicle, wherein the communication path is a wired communication path in the vehicle, and wherein the plurality of electronic control units exchange message following the CAN protocol or Ethernet protocol. Accordingly, an attack on the onboard network can be detected, and security of the vehicle can be secured.

When data to be monitored in a first-type message is being received by the receiver, the determining may be performed before the final bit of the first-type message is received, and in a case where determination is made that the first-type message is anomalous, the transmitter may transmit a predetermined message that invalidates the first-type message onto the communication path before the final bit of the first-type message is received by the receiver. Accordingly, the network system can be protected from attacks where unauthorized messages are caused to flow onto the network.

The communication path may be a network bus, wherein the plurality of electronic control units exchange frames following the CAN protocol, wherein the first-type message is a data frame that includes a predetermined value in an ID field, and data to be monitored in a data field, wherein the second-type message is a data frame that includes a particular value that differs from the predetermined value in an ID field, and data for comparison in a data field, and wherein the transmitter transmits an error frame as the predetermined message. Accordingly, data frames containing unauthorized data to be monitored can be efficiently invalidated on the onboard network.

The communication path may be a network bus, and in a case of determining that a first-type message is anomalous, the transmitter transmits an anomaly notification message onto the network bus. Thus, other electronic control units are notified of the anomaly. Accordingly, an electronic control unit that has received notification of the anomaly can take security measures such as suppressing unauthorized messages from being processed in the same way as legitimate messages, for example.

An onboard network system, according to an aspect of the present disclosure, having a plurality of electronic control units that communicate via a communication path, the plurality of electronic control units including a first electronic control unit that periodically transmits a first-type message including data to be monitored, and a second electronic control unit that periodically transmits a second-type message including data for comparison; and an anomaly detection electronic control unit connected to the communication path. The anomaly detection electronic control unit includes a receiver that successively receives first-type messages and second-type messages from the communication path, and a processor, that in operation, performs operations including determining whether a first-type message received by the receiver is normal or anomalous, based on content of the first-type message, content of a second-type message last received by the receiver at the time of receiving this first-type message, and at least one of content of a first-type message received by the receiver further in the past than this first-type message, and content of a second-type message received by the receiver further in the past than the second-type message last received. Accordingly, a first-type message, where an attacker has made the content of data to be monitored to be unauthorized content and has caused this to flow onto the network, can be appropriately detected as being anomalous. Thus, the onboard network system can perform appropriate protection regarding attacks.

The operations may further include notifying, in a case where a first-type message has been determined to be anomalous, a server situated outside of a first vehicle in which the onboard network system is installed, or a second vehicle other than the first vehicle, of the anomaly. Accordingly, in a case where an anomaly is detected in an onboard network system of a certain vehicle, the anomaly is notified to other vehicles, either directly or via the server. Also, the server can instruct security measures to one or multiple vehicles upon receiving notification of the anomaly.

The operations may further include notifying, in a case where a first-type message has been determined to be anomalous, of the anomaly by transmitting information indicating the anomaly to the second vehicle that is of a same vehicle type as the first vehicle. Also, the operations may further include notifying, in a case where a first-type message has been determined to be anomalous by, of the anomaly by transmitting information indicating the anomaly to the second vehicle that is present nearby the first vehicle. Accordingly, protection against consecutive attacks by an attacker on multiple vehicles of the same vehicle type, consecutive attacks on multiple vehicles locally, and so forth, can be realized.

An anomaly detection method, according to an aspect of the present disclosure is used in a network system having a plurality of electronic control units that communicate via a communication path. The plurality of electronic control units are connected to the communication path, and the plurality of electronic control units include a first electronic control unit that periodically transmits a first-type message including data to be monitored, and a second electronic control unit that periodically transmits a second-type message including data for comparison. The anomaly detection method includes: successively receiving first-type messages and second-type messages from the communication path; determining whether a first-type message received in the receiving is normal or anomalous, based on content of the first-type message, content of a second-type message last received in the receiving at the time of receiving this first-type message, and at least one of content of a first-type message received in the receiving further in the past than this first-type message, and content of a second-type message received in the receiving further in the past than the second-type message last received; and transmitting a predetermined message, in accordance with results of the determining. Accordingly, appropriate protection can be made against attacks where first-type messages containing unauthorized data to be monitored are made to flow onto the network.

An anomaly detection electronic control unit according to an aspect of the present disclosure is an anomaly detection electronic control unit connected to a communication path in a network system having a plurality of electronic control units that communicate via the communication path, including an electronic control unit that periodically transmits a first-type message including data to be monitored, and an electronic control unit that periodically transmits a second-type message including data for comparison. The anomaly detection electronic control unit includes: a receiver that successively receives first-type messages and second-type messages from the communication path; a determining unit that determines whether a first-type message received by the receiver is normal or anomalous, based on content of the first-type message, and content of a second-type message last received by the receiver at the time of receiving this first-type message. The first-type message and second-type message are periodically transmitted following rules decided beforehand on the network, and the values of the data to be monitored and data for comparison that are the contents of the individual messages change with a certain relationship to each other, for example, in accordance at the time of the messages being transmitted. Accordingly, for example, appropriate determination is possible based on whether the relation or the like between change appearing in the values of multiple data for comparison in multiple second-type messages successively transmitted over time, and the value of the data to be monitored in the first-type message at the time of the change, satisfies a predetermined reference that should be satisfied when normal or should be satisfied when anomalous. Thus, setting and using second-type messages relating to data for comparison so that the determination unit can determine whether data to be monitored is anomalous or not by using the relationship between data to be monitored and data for comparison, enables the anomaly detection electronic control unit to appropriately detect a first-type message, where an attacker has made the content of data to be monitored to be unauthorized content and has caused this to flow onto the network, as being anomalous. For example, even in a case where the attacker transmits an unauthorized first-type message at the same cycle as the cycle as which legitimate electronic control units transmit on the network system, the anomaly can be appropriately detected, and security of the network can be secured.

An arrangement may be made where the first-type message includes instruction information indicating instruction as to a control device that controls behavior of the vehicle, and the second-type message includes state information indicating the state of the control device. Accordingly, the anomaly detection electronic control unit can secure security regarding behavior of the vehicle.

An arrangement may be made where the instruction information includes instruction information for rotating the steering wheel, and the state information includes state information relating to rotation of the steering wheel. Accordingly, the anomaly detection electronic control unit can secure security as to the steering wheel relating to behavior of the vehicle.

An arrangement may be made where the instruction information includes instruction information for deceleration of speed, and the state information includes state information relating to speed. Accordingly, the anomaly detection electronic control unit can secure security as to deceleration relating to behavior of the vehicle.

An arrangement may be made where the instruction information includes instruction information for acceleration of speed, and the state information includes state information relating to speed. Accordingly, the anomaly detection electronic control unit can secure security as to acceleration relating to behavior of the vehicle.

An arrangement may be made where the anomaly detection electronic control unit includes a storage unit, and the receiver may store the contents of the first-type message and second-type message that have been received in the storage unit, and the determining unit performs the determination referencing the storage unit. Accordingly, the anomaly detection electronic control unit can speedily perform appropriate determination using the storage unit in the anomaly detection electronic control unit.

An arrangement may be made where, when a first-type message is received by the receiver, the determining unit determines whether the first-type message is normal or anomalous, according to whether data to be monitored included in the first-type message and first data for comparison included in the second-type message last received by the receiver satisfy a predetermined reference. Accordingly, an anomaly regarding the first-type message can be appropriately determined, using the fact that the value of data to be monitored in a first-type messages and the value of data for comparison in a second-type messages are in a certain relation.

An arrangement may be made where the plurality of electronic control units include an electronic control unit that periodically transmits third-type message including reference data, the receiver further successively receives third-type messages, and the determining unit further determines whether a first-type message received by the receiver is normal or anomalous, based on content of a third-type message last received by the receiver at the time of receiving the first-type message, and content of a third-type message received further in the past than the third-type message last received by the receiver. Accordingly, the relation with the reference data in the third-type message is used in addition to the relationship regarding data to be monitored and data for comparison, so an anomaly regarding the first-type message can be determined more appropriately by appropriately deciding the third-type message.

An arrangement may be made where the plurality of electronic control units include an electronic control unit that periodically transmits a third-type message including reference data, the receiver successively receives third-type messages, the determining unit further determines whether a second-type message received by the receiver is normal or not, based on content of the second-type message, and content of the third-type message last received by the receiver at the time of receiving the second-type message, and the determining unit determines whether the first-type message received by the receiver is normal or anomalous, based on the content of the first-type message, and the content of the second-type message last received by the receiver and determined to be normal at the time of receiving the first-type message. Accordingly, determination of data to be monitored is performed using the data for comparison that has been determined to be normal based on the relationship between data for comparison and reference data, so determination can be performed more accurately.

An arrangement may be made where the network system is installed in a vehicle, the data to be monitored and data for comparison are data used for control of the vehicle, the communication path is a wired communication path in the vehicle, and the plurality of electronic control units exchange messages following the CAN protocol or Ethernet protocol. This enables detection of attacks on the onboard network, and security of the vehicle can be secured.

An arrangement may be made where, when data to be monitored in a first-type message is being received by the receiver, the determining unit determines whether the first-type message is normal or anomalous before the final bit of the first-type message is received, and in a case where determination is made by the determining unit that the first-type message is anomalous, the transmitter transmits a predetermined message that invalidates the first-type message onto the communication path before the final bit of the first-type message is received by the receiver. Accordingly, the network system can be protected from attacks where unauthorized messages are caused to flow onto the network.

An arrangement may be made where the communication path is a network bus, the plurality of electronic control units exchange frames following the CAN protocol, the first-type message is a data frame that includes a predetermined value in an ID field, and data to be monitored in a data field, the second-type message is a data frame that includes a particular value that differs from the predetermined value in an ID field, and data for comparison in a data field, and the transmitter transmits an error frame as the predetermined message. Accordingly, data frames containing unauthorized data to be monitored can be efficiently invalidated on the onboard network.

An arrangement may be made where the communication path is a network bus, and in a case of the determining unit determining that a first-type message is anomalous, the transmitter transmits an anomaly notification message onto the network bus. Thus, other electronic control units are notified of the anomaly. Accordingly, an electronic control unit that has received notification of the anomaly can take security measures such as suppressing unauthorized messages from being processed in the same way as legitimate messages, for example.

An onboard network system according to an aspect of the present disclosure is an onboard network system having a plurality of electronic control units that communicate via a communication path, including an electronic control unit that periodically transmits a first-type message including data to be monitored, and an electronic control unit that periodically transmits a second-type message including data for comparison, includes an anomaly detection electronic control unit connected to the communication path, where the anomaly detection electronic control unit includes a receiver that successively receives first-type messages and second-type messages from the communication path, and a determining unit that determines whether a first-type message received by the receiver is normal or anomalous, based on content of the first-type message, and content of a second-type message last received by the receiver at the time of receiving this first-type message. Accordingly, a first-type message, where an attacker has made the content of data to be monitored to be unauthorized content and has caused this to flow onto the network, can be appropriately detected as being anomalous. Thus, the onboard network system can perform appropriate protection regarding attacks.

An arrangement may be made where the onboard network system further includes a notification device that, in a case where a first-type message has been determined to be anomalous by the determining unit, notifies a server situated outside of a first vehicle in which the network system is installed, or a second vehicle other than the first vehicle, of the anomaly. Accordingly, in a case where an anomaly is detected in an onboard network system of a certain vehicle, the anomaly can be notified to other vehicles, either directly or via the server. Thus, effective protection against attacks can be implemented at other vehicles. Also, the server can instruct security measures to one or multiple vehicles upon receiving notification of the anomaly.

An arrangement may be made where, in a case where a first-type message has been determined to be anomalous by the determining unit, the notification device notifies of the anomaly by transmitting information indicating the anomaly to the second vehicle that is of a same vehicle type as the first vehicle. Also, in a case where a first-type message has been determined to be anomalous by the determining unit, the notification device notifies of the anomaly by transmitting information indicating the anomaly to the second vehicle that is present nearby the first vehicle. Accordingly, protection against consecutive attacks by an attacker on multiple vehicles of the same vehicle type, consecutive attacks on multiple vehicles locally, and so forth, can be realized.

An anomaly detection method according to an aspect of the present disclosure is an anomaly detection method used in a network system having a plurality of electronic control units that communicate via a communication path, including an electronic control unit that periodically transmits a first-type message including data to be monitored, and an electronic control unit that periodically transmits a second-type message including data for comparison, and includes: successively receiving first-type messages and second-type messages from the communication path; and determining whether a first-type message received by the receiver is normal or anomalous, based on content of the first-type message, and content of a second-type message last received by the receiver at the time of receiving this first-type message. Accordingly, appropriate protection can be made against attacks where first-type messages containing unauthorized data to be monitored are made to flow onto the network.

It should be noted that these general or specific embodiments may be implemented as a system, a method, an integrated circuit, a computer program, or a computer-readable recording medium such as a CD-ROM, and may be realized by any combination of a system, method, integrated circuit, computer program, and recording medium.

An onboard network system including an anomaly detection ECU using the anomaly detection method according to embodiments will be described below with reference to the drawings. Note that the embodiments described below are all specific examples of the present disclosure. Accordingly, values, components, placements and connected states of components, steps that are components of processing, the order of steps, and so forth, illustrated in the following embodiments, are only exemplary, and do not restrict the present disclosure. Components in the following embodiments which are not included in an independent Claim are optionally addable components. The drawings are schematic diagrams, and are not necessarily created in an exact manner.

First Embodiment

An anomaly detection system 10 including a vehicle in which is installed an onboard network system capable of detecting anomalies in messages flowing over an onboard network, another vehicle, and a server, will be described below as a first embodiment of the present disclosure, with reference to the drawings.

1.1 Overall Configuration of Anomaly Detection System 10

FIG. 1 is a diagram illustrating the overall configuration of the anomaly detection system 10. The anomaly detection system 10 is a communication system to detect and handle anomalies in each of multiple vehicles that are automobiles. The anomaly detection system 10 is configured connecting a vehicle 200 in which is installed an onboard network system 100, another vehicle 500, and a server 400, via an external network 300. The anomaly detection system 10 may be configured including, for example, a great number of vehicles besides the vehicle 200 and vehicle 500, which are omitted from FIG. 1.

The onboard network system 100 in the vehicle 200 is a communication system within the vehicle, where ECUs that are electronic control parts or the like of the vehicle 200 exchange information necessary for control of the vehicle and so forth, over the onboard network. Vehicles other than the vehicle 200 also have onboard network systems installed in the same way as the vehicle 200. The external network 300 is a communication network configured of a wireless or cabled communication path, and can include a wide area network such as the Internet or the like.

The vehicle 200 has a notification device that makes external notification in a case where an anomaly occurs. The notification device may be realized as an external communication device, for example. As a specific example, the vehicle 200 has, in the onboard network system 100, an external communication device such as a wireless communication circuit or the like that communicates with the external network 300, and in a case where an anomaly has occurred in the onboard network, makes notification of the anomaly by transmitting information indicating the anomaly to the server 400 or the vehicle 500.

The server 400 is a computer that processes information of anomalies occurring in the vehicles. For example, in a case of having received information indicating an anomaly from the vehicle 200, the server 400 notifies the vehicle 500 that an anomaly has occurred at the vehicle 200, by transmitting information indicating the anomaly to the vehicle 500 or the like, for example. In a case of having received information indicating an anomaly from the vehicle 200, the server 400 may perform various types of analysis or the like, based on the information, and decide a method to handle the anomaly.

1.2 Configuration of Onboard Network System 100

Figure 2:
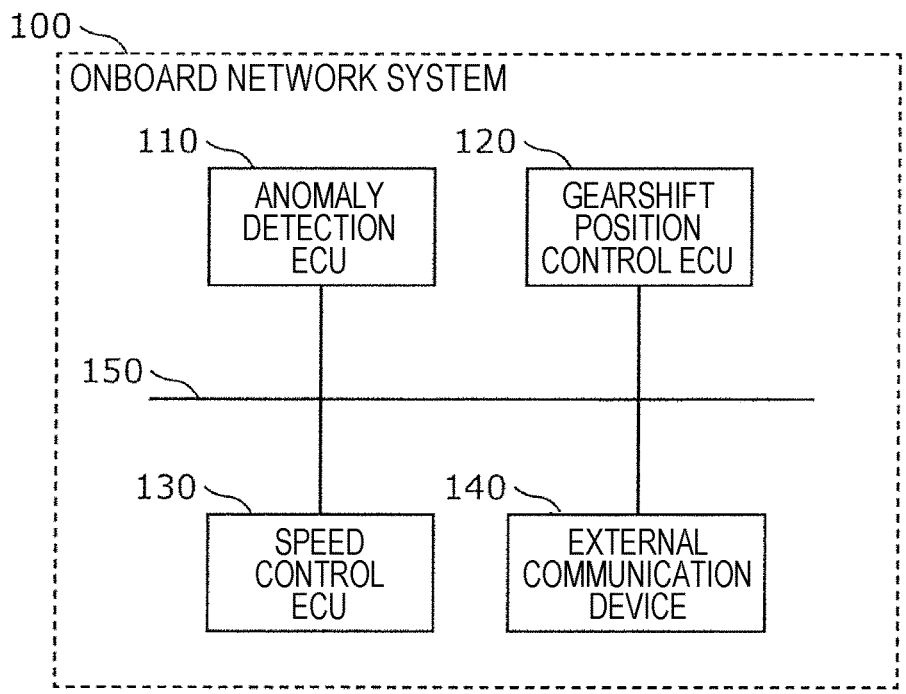
FIG. 2 is a diagram illustrating the configuration of an onboard network system according to the first embodiment.

FIG. 2 illustrates the configuration of the onboard network system 100. The onboard network system 100 is an example of a communication system that performs communication following the CAN protocol, and is a communication system in the vehicle 200 where various types of devices, such as control devices, sensors, actuators, user interface devices, and so forth, have been installed. The onboard network system 100 has multiple ECUs that perform communication relating to frames (also referred to as messages) over a bus (network bus), and uses an anomaly detection method. Specifically, the onboard network system 100 includes a bus 150, and an anomaly detection ECU 110, gearshift position control ECU 120, speed control ECU 130, and external communication device 140 that is a type of ECU, connected to the bus 150. The bus 150 is a wired communication path of the onboard network, and is connected to each ECU. Note that the onboard network system 100 can include many more ECUs than the anomaly detection ECU 110, gearshift position control ECU 120, speed control ECU 130, and external communication device 140, but description will be made here primarily focusing on the ECUs illustrated in FIG. 2, for the sake of convenience.

Each ECU is a device that includes, for example, digital circuits such as a processor (microprocessor), memory, and so forth, analog circuits, communication circuits, and so forth. The memory is read only memory (ROM), random access memory (RAM), and so forth, capable of storing a program (computer program) to be executed by the processor. Various functions of the ECU are realized by the processor operating following the program, for example. A computer program is configured as a combination of multiple command codes representing instructions to the processor, to achieve predetermined functions. ECUs can be connected to various types of devices.

The ECUs can exchange frames via the bus 150, following the CAN protocol. There are data frames in frames exchanged among ECUs. A data frame can include data used for control of the vehicle, such as for example, data relating to the state of the vehicle, data instructing control of the vehicle, and so forth.

The anomaly detection ECU 110 is an ECU that is connected to the bus 150, and that receives a first-type message, second-type message and so forth flowing over the bus 150 of the onboard network system, determines whether the first-type message is normal or anomalous, and performs predetermined processing based on the results of the determination. The anomaly detection ECU 110 uses the received first-type message and second-type message, for determination of whether the first-type message is normal or anomalous. The first-type message is a message that has predetermined identification information (ID), that has been decided indicating that data to be monitored is included. The second-type message is a message having identification information (ID) that differs from the first-type message, that has been decided indicating that data for comparison is included.

The gearshift position control ECU 120 is connected to a transmission mechanism for example, and transmit gearshift position control information relating to gearshift position at a certain cycle. The speed control ECU 130 is connected to a speed sensor for example, and transmits speed control information relating to speed of the vehicle at a certain cycle. The external communication device 140 is connected to the external network 300, and has a function of transmitting information relating to the vehicle 200, such as information indicating anomalies or the like, externally from the vehicle 200.

1.3 Configuration of Anomaly Detection ECU 110

Figure 3:
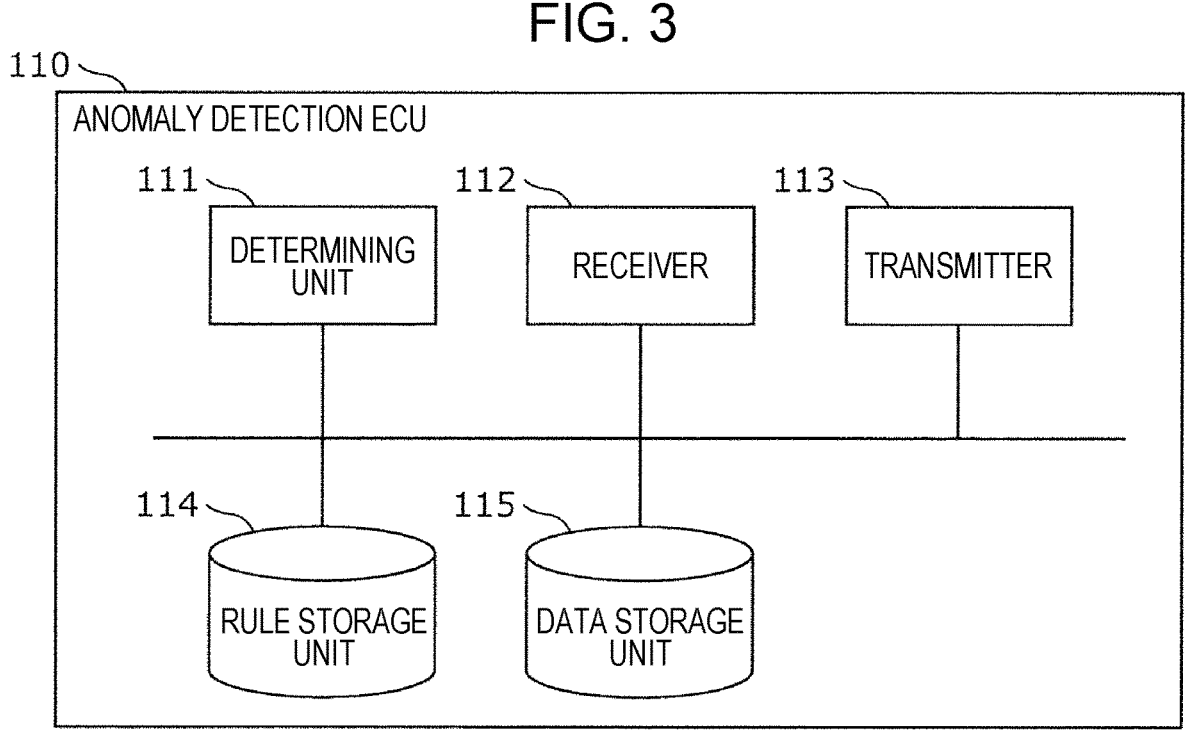
FIG. 3 is a diagram illustrating the configuration of an anomaly detection ECU according to the first embodiment.

FIG. 3 illustrates the configuration of the anomaly detection ECU 110. The anomaly detection ECU 110 includes a determining unit 111, a receiver 112, a transmitter 113, a rule storage unit 114, and a data storage unit 115, as illustrated in FIG. 3. The components of the anomaly detection ECU 110 illustrated in FIG. 3 can be realized by a storage medium such as memory or the like of the anomaly detection ECU 110, a communication circuit, and a processor or the like that executes programs stored in memory.

The determining unit 111 determines whether or not a data frame being received is normal or anomalous, by performing anomaly determination processing using the data frame that the receiver 112 is currently receiving, a data table (see FIG. 12) stored in the data storage unit 115 and sequentially updated, and rules shown in rule tables (see FIGS. 8 through 11) stored in the rule storage unit 114. In a case of having determined that a data frame being received is anomalous, the determining unit 111 performs later-described vehicle protection processing (see FIGS. 23 and 24). The determining unit 111 can be realized by a processor or the like that executes programs, for example.

If messages transmitted from the ECUs within the onboard network system 100 and appearing on the bus 150 (i.e., data frames) are message having identification information (ID) necessary for determination of data to be monitored, from information in the rule tables, the receiver 112 receives the messages. The receiver 112 also performs data saving processing (see FIG. 19) which is processing of updating a data table so as to include the contents of a received message in the data table that the data storage unit 115 stores. The receiver 112 can be realized by a communication circuit or the like.

The transmitter 113 performs transmission in accordance with the results of determination by the determining unit 111, under control of the determining unit 111. In a case of the determining unit 111 has determined that a data frame being received is anomalous, for example, the transmitter 113 transmits a predetermined message to invalidate this data frame to the bus 150, as transmission inhibition processing of the data frame. The predetermined message is an error frame, for example. Also, in a case where the determining unit 111 has determined that a data frame being received is anomalous, for example, the transmitter 113 transmits a message having identification information (ID) set beforehand so that the external communication device 140 will receive, and including information indicating an anomaly, to the bus 150, so that the external communication device 140 notifies the server 400 and another vehicle 500 of the anomaly that has occurred at the vehicle 200. The transmitter 113 can be realized by a communication circuit or the like.

The storage units, i.e., the rule storage unit 114 and data storage unit 115, can be realized by one region of a storage medium, for example. The rule storage unit 114 stores rule tables regarding the relation between data to be monitored, and data for comparison. The data storage unit 115 stores data tables that include data which is the content of messages including data to be monitored, and data for comparison, in accordance with identification information (ID) of the messages received by the receiver 112.

1.4 Data Frame Format

Figure 4:
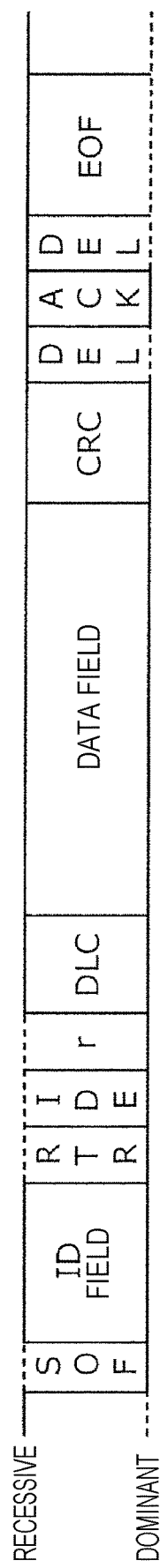
FIG. 4 is a diagram illustrating a format of a data frame stipulated in the CAN protocol.

The following is a description of a data frame which is used on a network according to the CAN protocol. FIG. 4 is a diagram illustrating a format of a data frame stipulated by the CAN protocol. The diagram illustrates a data frame according to a standard ID format stipulated in the CAN protocol. A data frame is configured including the fields of a SOF (Start Of Frame), ID field, RTR (Remote Transmission Request), IDE (Identifier Extension), reserved bit "r", DLC (Data Length Code), data field, CRC (Cyclic Redundancy Check) sequence, CRC delimiter "DEL", ACK (Acknowledgement) slot, ACK delimiter "DEL", and EOF (End Of Frame).

The SOF is made up of 1-bit dominant. The state of the bus is recessive when idle, and start of transmission of a frame is notified by being changed to dominant by the SOF.

The ID field is made up of 11 bits, and is a field storing an ID which is a value indicating the type of data. Design has been implemented so that in a case where multiple nodes start transmission at the same time, frames with smaller ID values are given higher priority, in order to perform communication arbitration by this ID field.

The RTR is a value identifying a data frame and remote frame, and is made up of 1-bit dominant in a data frame. The IDE and "r" are each made up of 1-bit dominant. The DLC is made up of four bits, and is a value indicating the length of the data field.

The data field is made up of a maximum of 64 bits, and is a value indicating the content of the data being transmitted. The length of the data field can be adjusted in 8-bit increments. The CAN protocol does not stipulate the specification of data being transmitted; that is set at the onboard network system 10. Accordingly, the specification is dependent on the model, manufacturer, or the like.

The CRC sequence is made up of 15 bits. The CRC sequence is calculated from the transmitted values of the SOF, ID field, control field, and data field. The CRC delimiter is made up of 1-bit recessive, and is a sectioning symbol representing the end of the CRC sequence.

The ACK slot is made up of one bit. The transmitting node performs transmission with the ACK slot set to recessive. The receiving node transmits the ACK slot as dominant if up to the CRC sequence has been received normally. Dominant has higher priority than recessive, so if the ACK slot is dominant after transmission, the transmitting node will be able to confirm that one of the receiving nodes has succeeded in reception. The ACK delimiter is made up of 1-bit recessive, and is a sectioning symbol representing the end of the ACK. The EOF is made up of 7-bits recessive, and represents the end of the data frame.

1.5 Error Frame Format

FIG. 5 is a diagram illustrating the format of the error frame stipulated in the CAN protocol. An error frame is made up of an error flag (primary), error flag (secondary), and an error delimiter "DEL".

The error flag (primary) is used to notify occurrence of an error to other nodes. A node which has detected an error transmits six consecutive bits dominant to notify other nodes of the occurrence of the error. This transmission violates the bit stuffing rule in the CAN protocol (i.e., that six bits or more of the same value are not to be consecutively transmitted), and causes other nodes to transmit an error frame (secondary).

The error flag (secondary) is made up of six consecutive bits dominant, used to notify occurrence of an error to the other nodes. All nodes that have received the error flag (primary) and detected the violation of the bit stuffing rule will transmit the error flag (secondary). The error delimiter "DEL" is an 8-bit consecutive recessive, and indicates the end of the error frame.

1.6 Data Frame Transmitted by Speed Control ECU 130

FIG. 6A is a diagram illustrating an example of a data frame containing speed control information, which the speed control ECU 130 transmits. In this example, a data frame containing speed control information has an ID that is a predetermined value "0x01", and the data length that the DLC indicates is 2. The data in the data field of this data frame indicates the speed control information. The first byte of the data relating to speed control information represents whether the vehicle 200 is traveling forward or traveling backward, and the second byte represents the speed of the vehicle 200.

FIG. 6B represents the meaning indicated by the data values of the speed control information, as the results of reading data, as a specific example. In a case where the first byte of the data relating to speed control information is 0x00 and the second byte is not 0x00, this means "traveling forward", if the second byte is 0x00 this means "stopped", and if the first byte is 0x10 and the second byte is not 0x00, this means "traveling backward". The data in the data frame exemplified in FIG. 6A is 0x10 for the first byte, and 0x12 for the second byte, so the anomaly detection ECU 110 reads the speed control information of this data frame as "traveling backward".

1.7 Data Frame Transmitted by Gearshift position control ECU 120

FIG. 7A is a diagram illustrating an example of a data frame including gearshift position control information transmitted by the gearshift position control ECU 120. In this example, a data frame containing gearshift position control information has an ID that is a value "0x02" which is different from a data frame including speed control information, and the data length that the DLC indicates is 1. The data in the data field of this data frame indicates the gearshift position control information. One byte of the data relating to gearshift position control information represents the current gearshift position relating to the transmission of the vehicle 200.

FIG. 7B represents the meaning indicated by the data values of the gearshift position control information, as the results of reading data, as a specific example. In a case where the data relating to the gearshift position control information is 0x00, this means "park" which is a gearshift position for parking, if 0x01, this means "neutral" that is neither traveling forward nor traveling backward, if 0x02, this means "drive" that is a gearshift position for the vehicle to travel forward, and if 0x03, this means "reverse" that is a gearshift position for the vehicle to travel backward. For example, the data value of the data frame exemplified in FIG. 7A is 0x01, so the anomaly detection ECU 110 reads the gearshift position control information of this data frame as "neutral".

1.8 Rules in Rule Tables

FIG. 8 is a diagram illustrating the concept of rules stipulated by rule tables that the rule storage unit 114 stores. Rules will be described with a value of data that is a particular bit string in a first-type message that is a message having an ID of a predetermined value, flowing over the bus 150 of the onboard network, as a value A, and a value of data that is a particular bit string in a second-type message that is a message having an ID of a particular value that is different from the predetermined values, as value B. In a case where the first-type message and the second-type message are each periodically and successively transmitted, and there is change that can occur in the values regarding the two values of value A and value B indicated by the messages appearing on the bus 150, with a certain regularity in a normal state, the transition of this value can be expressed by a transitional diagram (see middle of upper tier in FIG. 8).

In the example of this transition diagram, specific values of value A are 0 and 1, and specific values of value B are 0, 1, and 2.

In a rule table, this transmission diagram is expressed by two matrices, for example. The example in FIG. 8 illustrates that in a case where value A is 0, the state is normal regardless of however Value B changes in the range of 0, 1, and 2. Also illustrated is that in a case where value A is 1, the state is normal in cases where the value B is unchanged at 0, unchanged at 1, changes from 1 to 2, is unchanged at 2, and changes from 2 to 1, and otherwise is anomalous. In this way, rule tables indicate rules serving as references to determining whether a message is normal or anomalous, based on the relationship between at least a value indicated by a message having a certain ID, a value indicated by a message having a different ID, and a past value indicated by a message having either one of the IDs. Although an example has been illustrating of rules using one value in each of two types of messages having IDs that are different from each other, this is only an example of rules, and for example, rules can be stipulated in the same way using multiple values within the same message, as well.

1.9 Specific Examples of Rule Tables

FIGS. 9 through 11 illustrate examples of rule tables stored by the rule storage unit 114. In these examples, the data to be monitored is gearshift position control information, and data for comparison is speed control information. That is to say, the data to be monitored is included in the data field of the first-type message, i.e., in the data field of the data frame having a predetermined value ("0x01" in the example in FIG. 6A) included in the ID field. Also, the data for comparison is included in the data field of the second-type message, i.e., in the data field of the data frame having a particular value different from the predetermined value ("0x02" in the example in FIG. 7A) included in the ID field.

FIG. 9 illustrates an example of a rule table regarding change in gearshift position control information. The rule table in this example illustrates rules for change of the gearshift position control information regarding each of a case where the vehicle is stopped and a case where the vehicle is traveling forward. Specifically, the rule table stipulates whether normal or anomalous, for each combination of past state and current state of gearshift position control information. Those where combinations cannot occur are listed as being not applicable (N/A) in the example in FIG. 9, which can be deemed to be anomalous. Note that the current gearshift position state illustrated in FIG. 9 corresponds to the current value which is the newest value of the gearshift position control information, i.e., to the value indicated by the gearshift position control information of the first-type message that the anomaly detection ECU 110 has received last. The gearshift position control information of the first-type message received last is gearshift position control information included in the first-type message that the anomaly detection ECU 110 is currently receiving, for example. The gearshift position state of the past illustrated in FIG. 9 corresponds to past values of the gearshift position control information, e.g., to a value indicated by gearshift position control information in the first-type message received one time back from the first-type message including the current value of the gearshift position control information. The anomaly detection ECU 110 can determine whether the message including the gearshift position control information is normal or anomalous according to this rule table. For example, in a state where the movement of the vehicle can be confirmed to be traveling forward, by speed control information included in the second-type message flowing over the bus 150, in a case where the gearshift position control information included in a first-type message transmitted periodically changes from a state indicating "drive" to a state indicating "reverse", the anomaly detection ECU 110 determines the message including the gearshift position control information to be anomalous, based on the rule table in the example in FIG. 9.

FIG. 10 illustrates an example of a rule table regarding change in speed control information. The rule table in this example illustrates rules for change of the speed control information regarding each of a case where the gearshift position of the vehicle is "drive" and a case where the gearshift position of the vehicle is "reverse". Specifically, the rule table stipulates whether normal or anomalous, for each combination of past state and current state of speed control information. Those where combinations cannot occur are listed as being not applicable (N/A) in the example in FIG. 10, which can be deemed to be anomalous. Note that the state regarding current motion of the vehicle illustrated in FIG. 10 corresponds to the current value which is the newest value of the speed control information, i.e., to the value indicated by the speed control information of the second-type message that the anomaly detection ECU 110 has received last. The state regarding the motion of the vehicle in the past illustrated in FIG. 10 corresponds to past values of the speed control information, e.g., to a value indicated by speed control information in the second-type message received one time back from the second-type message including the current value of the speed control information. The anomaly detection ECU 110 can determine whether the message including the speed control information is normal or anomalous according to this rule table. For example, in a state where the gearshift position control information included in the first-type message transmitted onto the bus 150 is in a state indicating "drive", if in a state where a past value of the speed control information included in the second-type message periodically flowing over the bus 150 can be confirmed to be stopped and the current value to be traveling backward, the anomaly detection ECU 110 determines the message including the gearshift position control information to be anomalous, based on the rule table in the example in FIG. 10.

FIG. 11 illustrates an example of a rule table regarding change in gearshift position control information and change in speed control information. The rule table in this example illustrates rules for change of gearshift position control information for each of a case where the vehicle has changed from stopped to traveling forward, and a case where the vehicle has changed from traveling backward to stopped. Specifically, the rule table stipulates whether normal or anomalous, for each combination of past state and current state of gearshift position control information, for each change in speed control information. Those where combinations cannot occur are listed as being not applicable (N/A) in the example in FIG. 11, which can be deemed to be anomalous. Note that the current gearshift position state illustrated in FIG. 11 corresponds to the current value of the gearshift position control information, in the same way as the case in FIG. 9. The gearshift position state in the past illustrated in FIG. 11 corresponds to past values of the gearshift position control information, in the same way as in the case in FIG. 9. The anomaly detection ECU 110 can determine whether the message including the gearshift position control information is normal or anomalous according to this rule table. For example, in a state where the motion of the vehicle can be confirmed to have changed from stopped to traveling forward, by speed control information included in the second-type message periodically flowing over the bus 150, in a case where the gearshift position control information included in the first-type message periodically transmitted changes from a state indicating "drive" to a state indicating "reverse", the anomaly detection ECU 110 determines the message including the gearshift position control information to be anomalous, based on the rule table in the example in FIG. 11.

1.10 Data Table

FIG. 12 illustrates an example of a data table that the data storage unit 115 stores. The data table is a table recording each of data to be monitored of the first-type message, and data for comparison of the second-type message, in the order of reception of messages, for example. This data table is successively updated by data saving processing (see FIG. 19) being performed at the anomaly detection ECU 110.

The data table in the example in FIG. 12 includes the current value and past value of gearshift position control information as data to be monitored in the first-type message, and includes the current value and past value of speed control information as data for comparison in the second-type message.

1.11 Data Used for Anomaly Determination Processing

Figure 13:
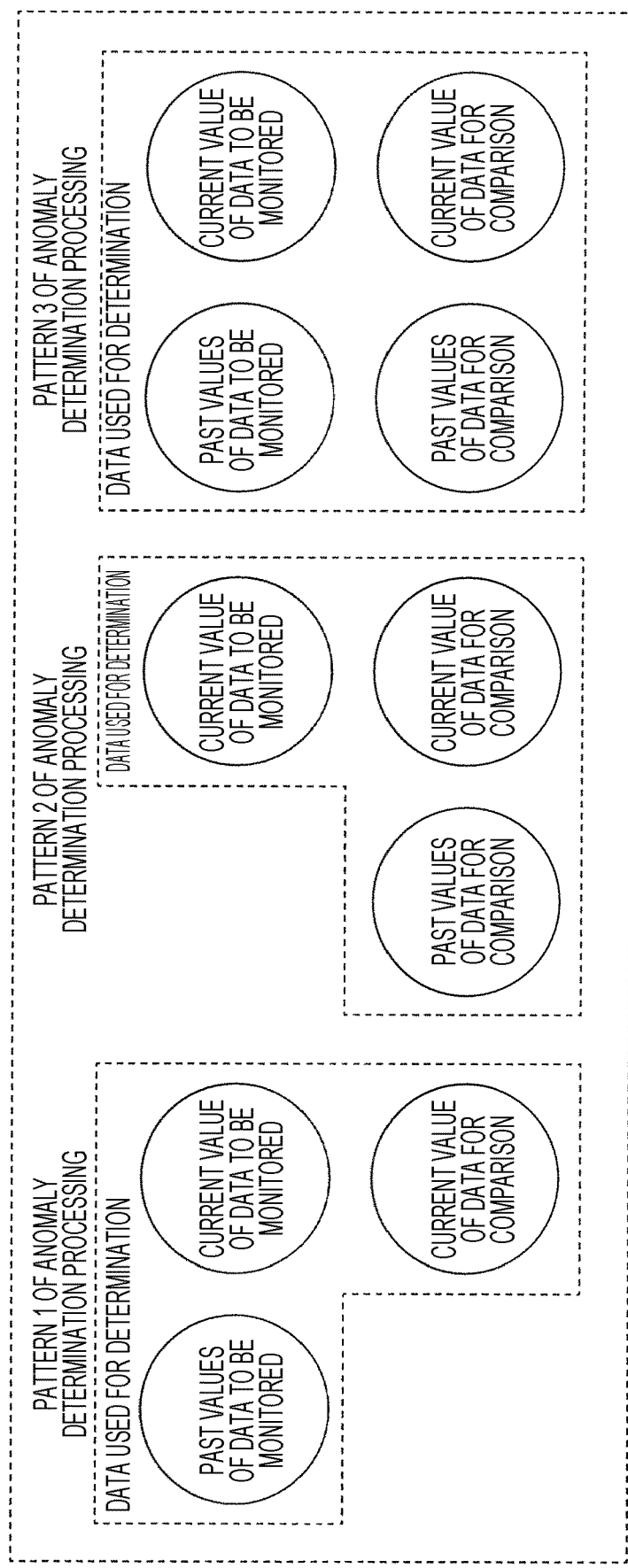
FIG. 13 is a diagram illustrating data used in patterns of anomaly detection processing that the of the anomaly detection ECU according to the first embodiment performs.

FIG. 13 is a diagram illustrating patterns of anomaly determination processing that the anomaly detection ECU 110 performs. Each of the three patterns illustrated in FIG. 13 has different data used for anomaly determination processing.

In the anomaly determination processing pattern 1, regarding the current value and past value of the data to be monitored, and the current value of the data for comparison, these three values are used to determine whether the message including the data to be monitored is normal or anomalous by whether or not these three values satisfy a predetermined standard. A predetermined standard stipulating beforehand whether normal or anomalous, with regard to the data to be monitored exhibiting a particular change or not changing, in a state where the data for comparison is the current value, for example, is used for this determination.

In the anomaly determination processing pattern 2, regarding the current value of the data to be monitored, and the current value and past value of the data for comparison, these three values are used to determine whether the message including the data to be monitored is normal or anomalous by whether or not these three values satisfy a predetermined standard. A predetermined standard stipulating beforehand whether normal or anomalous, with regard to the data to be monitored currently exhibiting a particular value, in a state where the data for comparison has changed from a past value to the current value, for example, is used for this determination.

In the anomaly determination processing pattern 3, regarding the current value and past value of the data to be monitored, and the current value and past value of the data for comparison, these four values are used to determine whether the message including the data to be monitored is normal or anomalous by whether or not these four values satisfy a predetermined standard. A predetermined standard stipulating beforehand whether normal or anomalous, with regard to the data to be monitored exhibiting a particular change or not changing, in a state where the data for comparison has changed from a past value to the current value, for example, is used for this determination.

1.12 Processing Sequence of Anomaly Detection ECU, etc.

Figure 14:
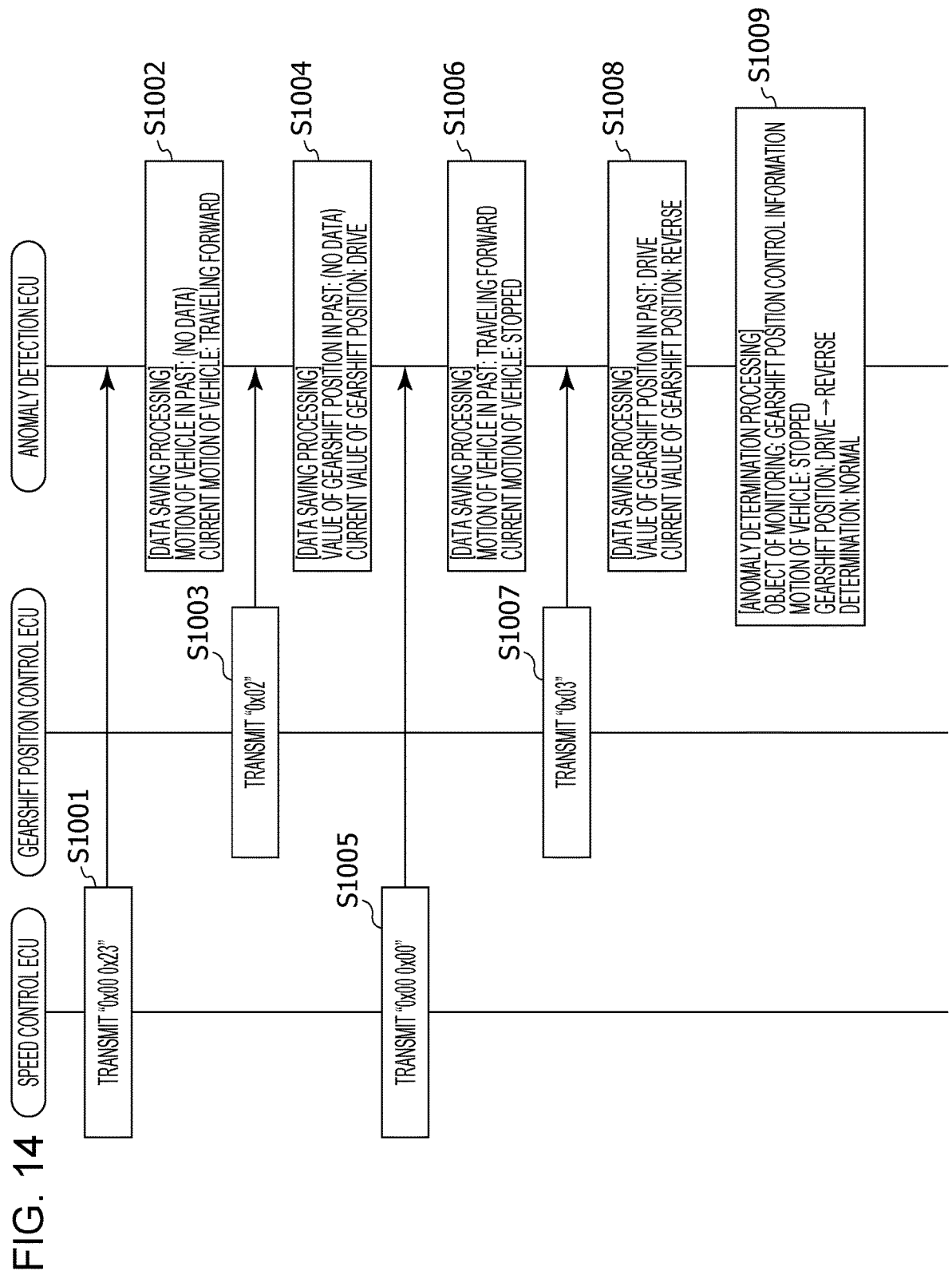
FIG. 14 is a diagram illustrating an example of a processing sequence by the anomaly detection ECU according to the first embodiment, in a case where there is no anomaly.

Next, the operations of the anomaly detection ECU 110 in the onboard network system 100 will be described with reference to FIGS. 14 through 17. FIG. 14 illustrates an example of a processing sequence of the anomaly detection ECU 110 and so forth in a case where there is no anomaly in messages flowing over the bus 150. Here, the anomaly detection ECU 110 performs anomaly determination processing using the rule table shown in FIG. 9.

The speed control ECU 130 transmits a message including speed control information "0x00 0x23" onto the bus 150 (step S1001). The anomaly detection ECU 110 that has received this message reads "traveling forward" from the speed control information in this message, and saves in the data table (step S1002).

The gearshift position control ECU 120 transmits a message including gearshift position control information "0x02" onto the bus 150 (step S1003). The anomaly detection ECU 110 that has received this message reads "drive" from the gearshift position control information in that message, and saves in the data table (step S1004).

Next, the speed control ECU 130 transmits a message including speed control information "0x00 0x00" onto the bus 150 (step S1005). The anomaly detection ECU 110 that has received this message reads "stopped" from the speed control information in that message, and saves in the data table (step S1006).

The gearshift position control ECU 120 transmits a message including gearshift position control information "0x03" onto the bus 150 (step S1007). The anomaly detection ECU 110 that has received this message reads "reverse" from the gearshift position control information in that message, and saves in the data table (step S1008).

The anomaly detection ECU 110 then determines the three of current value "reverse" of the gearshift position control information that is data to be monitored, past value "drive" of the gearshift position control information that is data to be monitored, and current value "stopped" of the speed control information that is data for comparison, to be normal, using the rule table illustrated in FIG. 9 (step S1009).

Figure 15:
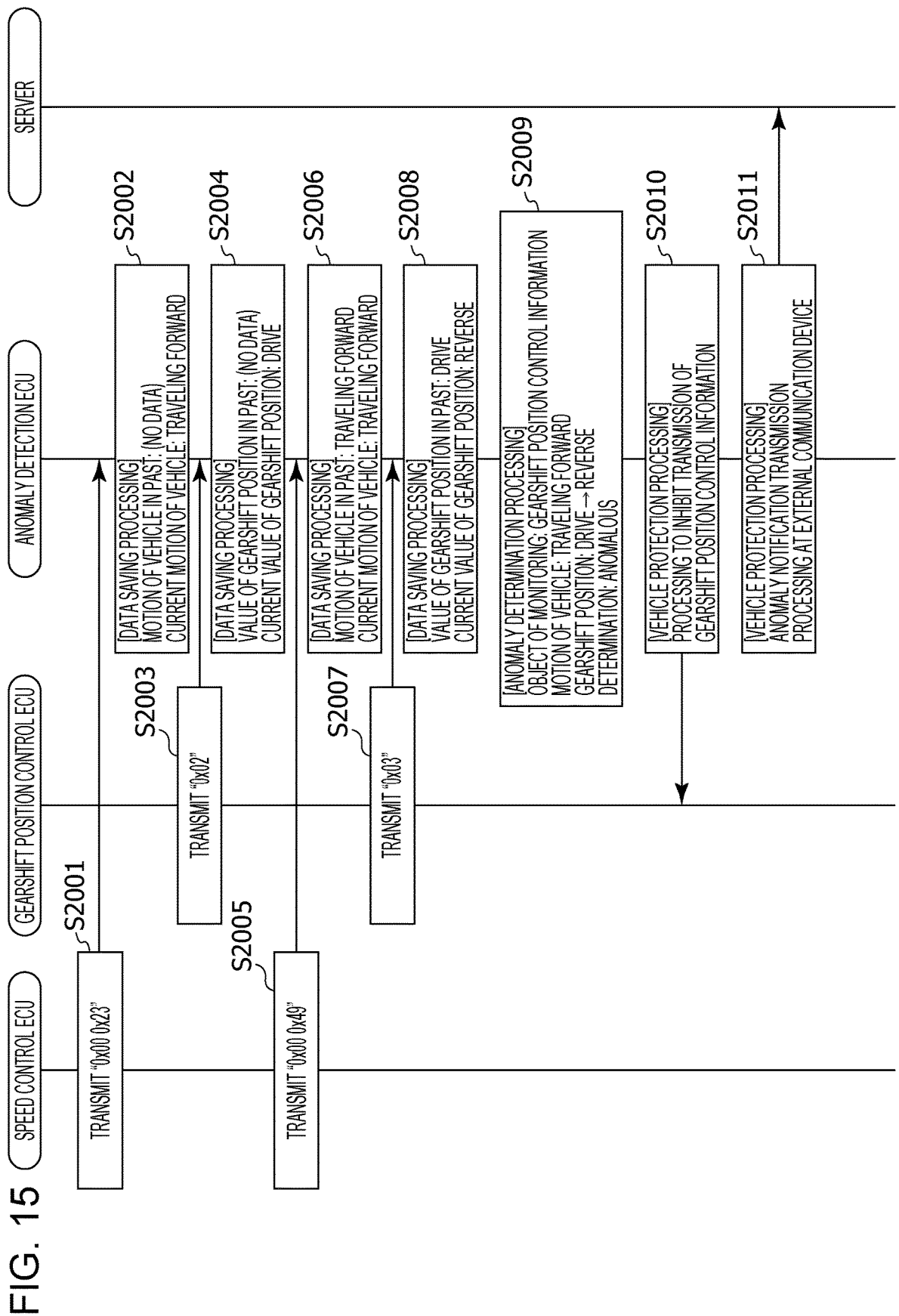
FIG. 15 is a diagram illustrating an example of a processing sequence according to an anomaly detection processing pattern 1 by the anomaly detection ECU according to the first embodiment.

FIG. 15 illustrates an example of a processing sequence of the anomaly detection ECU 110 and so forth in a case where an unauthorized message has flowed onto the bus 150. Here, the anomaly detection ECU 110 performs anomaly determination processing according to anomaly determination processing pattern 1 using the rule table shown in FIG. 9. Note that the unauthorized message can be transmitted from the gearshift position control ECU 120 in a state where an attacker has taken over the gearshift position control ECU 120, for example. The attacker can also stop transmission of legitimate messages from the gearshift position control ECU 120 and transmit unauthorized messages instead, for example.

The speed control ECU 130 transmits a message including speed control information "0x00 0x23" onto the bus 150 (step S2001). The anomaly detection ECU 110 that has received this message reads "traveling forward" from the speed control information in this message, and saves in the data table (step S2002).

The gearshift position control ECU 120 transmits a message including gearshift position control information "0x02" onto the bus 150 (step S2003). The anomaly detection ECU 110 that has received this message reads "drive" from the gearshift position control information in that message, and saves in the data table (step S2004).

Next, the speed control ECU 130 transmits a message including speed control information "0x00 0x49" onto the bus 150 (step S2005). The anomaly detection ECU 110 that has received this message reads "traveling forward" from the speed control information in that message, and saves in the data table (step S2006).

The gearshift position control ECU 120 transmits a message including gearshift position control information "0x03" onto the bus 150 (step S2007). The anomaly detection ECU 110 that has received this message reads "reverse" from the gearshift position control information in that message, and saves in the data table (step S2008).

The anomaly detection ECU 110 then determines the three of current value "reverse" of the gearshift position control information that is data to be monitored, past value "drive" of the gearshift position control information that is data to be monitored, and current value "traveling forward" of the speed control information that is data for comparison, to be anomalous, using the rule table illustrated in FIG. 9 (step S2009). This determination is completed before having received the final bit of the data frame being received from the bus 150 that is the message including the data to be monitored, for example.

Next, an anomaly has been determined, so the anomaly detection ECU 110 performs transmission inhibition processing of the message including the gearshift position control information that is the data to be monitored, as vehicle protection processing (step S2010). As transmission inhibition processing of the message including the data to be monitored, the anomaly detection ECU 110 transmits an error frame onto the bus 150 before receiving the final bit of the data frame being received, that is the message including the data to be monitored, for example. The data frame that was being received is overwritten and invalidated on the bus 150 by this error frame, so the ECUs connected to the bus 150 cannot receive the original data frame in complete form. The anomaly detection ECU 110 further instructs the external communication device 140 to perform anomaly notification transmission processing to transmit information indicating an anomaly to the server 400, as further vehicle protection processing (step S2011). This instruction is performed by transmitting an anomaly notification message that is a data frame that has an ID set beforehand for the external communication device 140 to receive, and that includes information indicating an anomaly onto the bus 150, for example.

Figure 16:
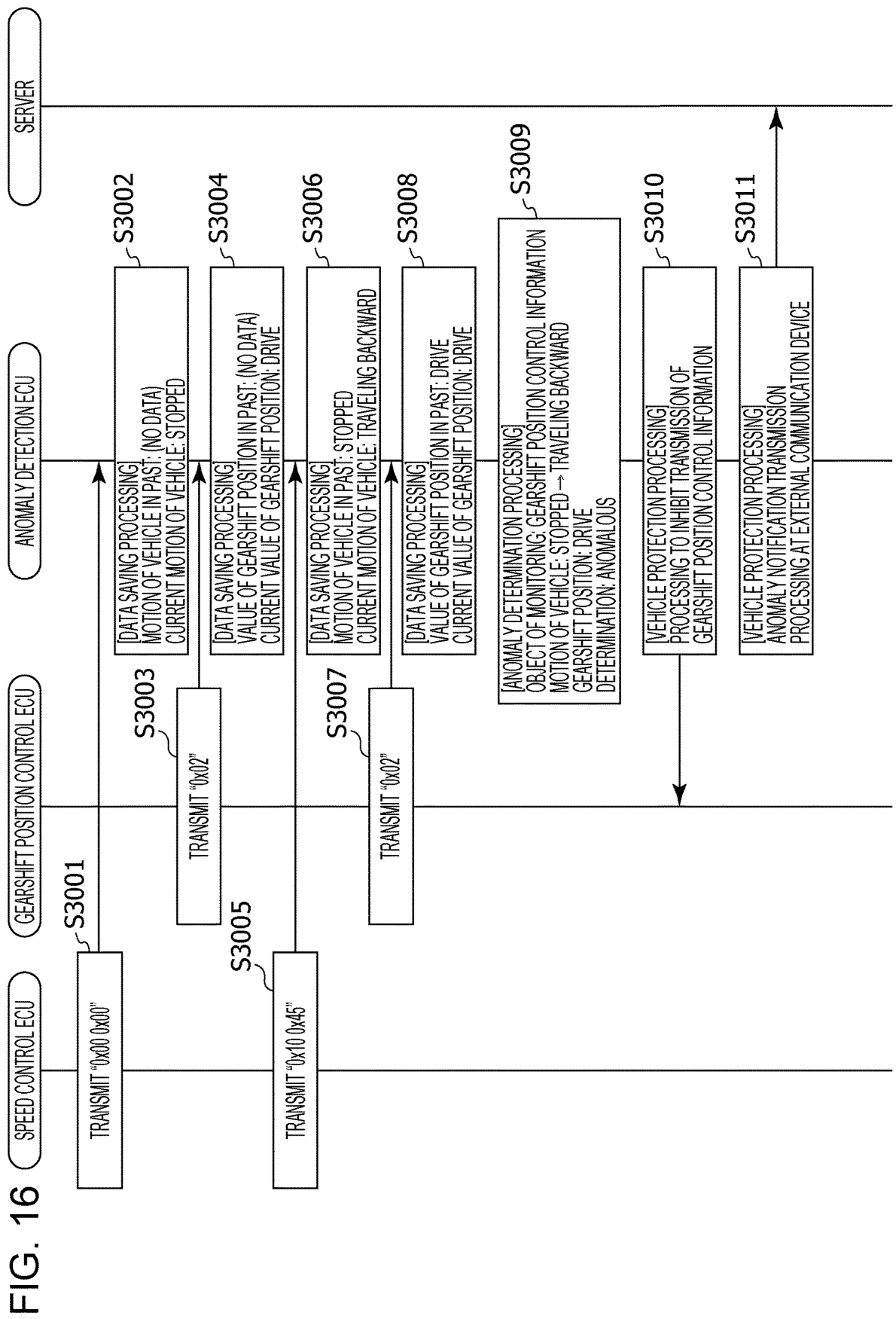
FIG. 16 is a diagram illustrating an example of a processing sequence according to an anomaly detection processing pattern 2 by the anomaly detection ECU according to the first embodiment.

FIG. 16 illustrates another example of a processing sequence of the anomaly detection ECU 110 and so forth in a case where an unauthorized message has flowed onto the bus 150. Here, the anomaly detection ECU 110 performs anomaly determination processing according to anomaly determination processing pattern 2 using the rule table shown in FIG. 10.

The speed control ECU 130 transmits a message including speed control information "0x00, 0x00" onto the bus 150 (step S3001). The anomaly detection ECU 110 that has received this message reads "stopped" from the speed control information in this message, and saves in the data table (step S3002).

The gearshift position control ECU 120 transmits a message including gearshift position control information "0x02" onto the bus 150 (step S3003). The anomaly detection ECU 110 that has received this message reads "drive" from the gearshift position control information in that message, and saves in the data table (step S3004).

Next, the speed control ECU 130 transmits a message including speed control information "0x10, 0x45" onto the bus 150 (step S3005). The anomaly detection ECU 110 that has received this message reads "traveling backward" from the speed control information in that message, and saves in the data table (step S3006).

The gearshift position control ECU 120 transmits a message including gearshift position control information "0x02" onto the bus 150 (step S3007). The anomaly detection ECU 110 that has received this message reads "drive" from the gearshift position control information in that message, and saves in the data table (step S3008).

The anomaly detection ECU 110 then determines the three of current value "drive" of the gearshift position control information that is data to be monitored, current value "traveling backward" of the speed control information that is data for comparison, and past value "stopped" of the speed control information that is data for comparison, to be anomalous, using the rule table illustrated in FIG. 10 (step S3009).

Next, an anomaly has been determined, so the anomaly detection ECU 110 performs transmission inhibition processing of the message including the gearshift position control information that is the data to be monitored, as vehicle protection processing (step S3010). The anomaly detection ECU 110 transmits an error frame to the bus 150 while receiving the data frame that is a message including the data to be monitored, as transmission inhibiting processing, for example. The anomaly detection ECU 110 further instructs the external communication device 140 to perform anomaly notification transmission processing to transmit information indicating an anomaly to the server 400, as further vehicle protection processing (step S3011).

Figure 17:
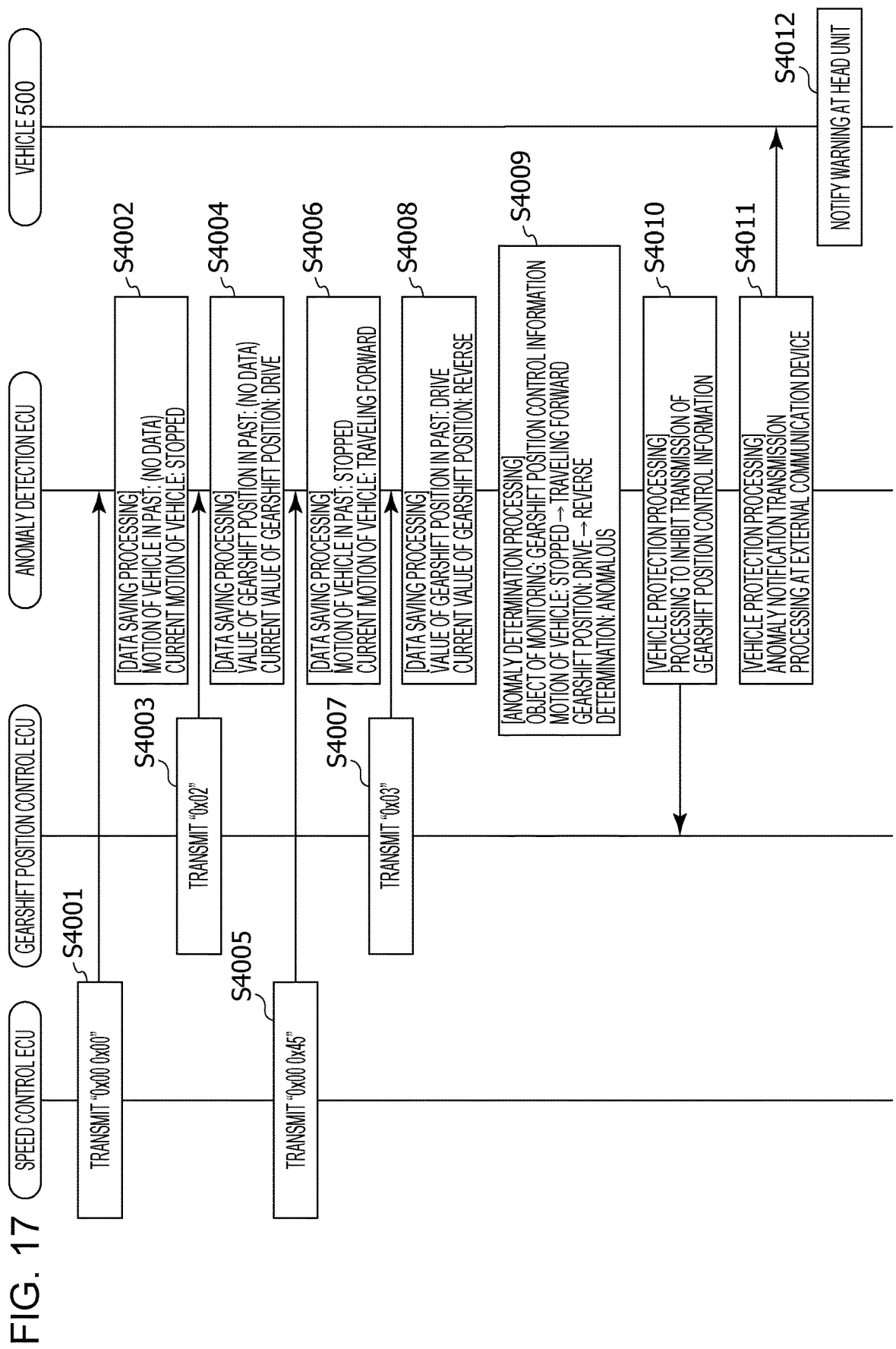
FIG. 17 is a diagram illustrating an example of a processing sequence according to an anomaly detection processing pattern 3 by the anomaly detection ECU according to the first embodiment.

FIG. 17 illustrates another example of a processing sequence of the anomaly detection ECU 110 and so forth in a case where an unauthorized message has flowed onto the bus 150. Here, the anomaly detection ECU 110 performs anomaly determination processing according to anomaly determination processing pattern 3 using the rule table shown in FIG. 11.

The speed control ECU 130 transmits a message including speed control information "0x00, 0x00" onto the bus 150 (step S4001). The anomaly detection ECU 110 that has received this message reads "stopped" from the speed control information in this message, and saves in the data table (step S4002).

The gearshift position control ECU 120 transmits a message including gearshift position control information "0x02" onto the bus 150 (step S4003). The anomaly detection ECU 110 that has received this message reads "drive" from the gearshift position control information in that message, and saves in the data table (step S4004).

Next, the speed control ECU 130 transmits a message including speed control information "0x00, 0x45" onto the bus 150 (step S4005). The anomaly detection ECU 110 that has received this message reads "traveling forward" from the speed control information in that message, and saves in the data table (step S4006).

The gearshift position control ECU 120 transmits a message including gearshift position control information "0x03" onto the bus 150 (step S4007). The anomaly detection ECU 110 that has received this message reads "reverse" from the gearshift position control information in that message, and saves in the data table (step S4008).

The anomaly detection ECU 110 then determines the four of current value "reverse" of the gearshift position control information that is data to be monitored, past value "drive" of the gearshift position control information that is data to be monitored, current value "traveling forward" of the speed control information that is data for comparison, and past value "stopped" of the speed control information that is data for comparison, to be anomalous, using the rule table illustrated in FIG. 11 (step S4009).

Next, an anomaly has been determined, so the anomaly detection ECU 110 performs transmission inhibition processing of the message including the gearshift position control information that is the data to be monitored, as vehicle protection processing (step S4010). The anomaly detection ECU 110 transmits an error frame onto the bus 150 as transmission inhibition processing for example, while receiving the data frame that is the message including the data to be monitored, for example. The anomaly detection ECU 110 further instructs the external communication device 140 to perform anomaly notification transmission processing to transmit information indicating an anomaly to the other vehicle 500, as further vehicle protection processing (step S4011). Accordingly, the external communication device 140 transmits information indicating an anomaly to the vehicle 500. Upon receiving the information indicating an anomaly, the vehicle 500 performs warning notification at a head unit, which is a type of ECU that controls an instrument panel or the like, for example (step S4012). In step S4012, the head unit controls a display or the like on a display device provided to the instrument panel, for example, and switches the display content of the display device to a warning notification display for notifying the driver of the anomaly.

1.13 Processing at Anomaly Detection ECU

Figure 18:
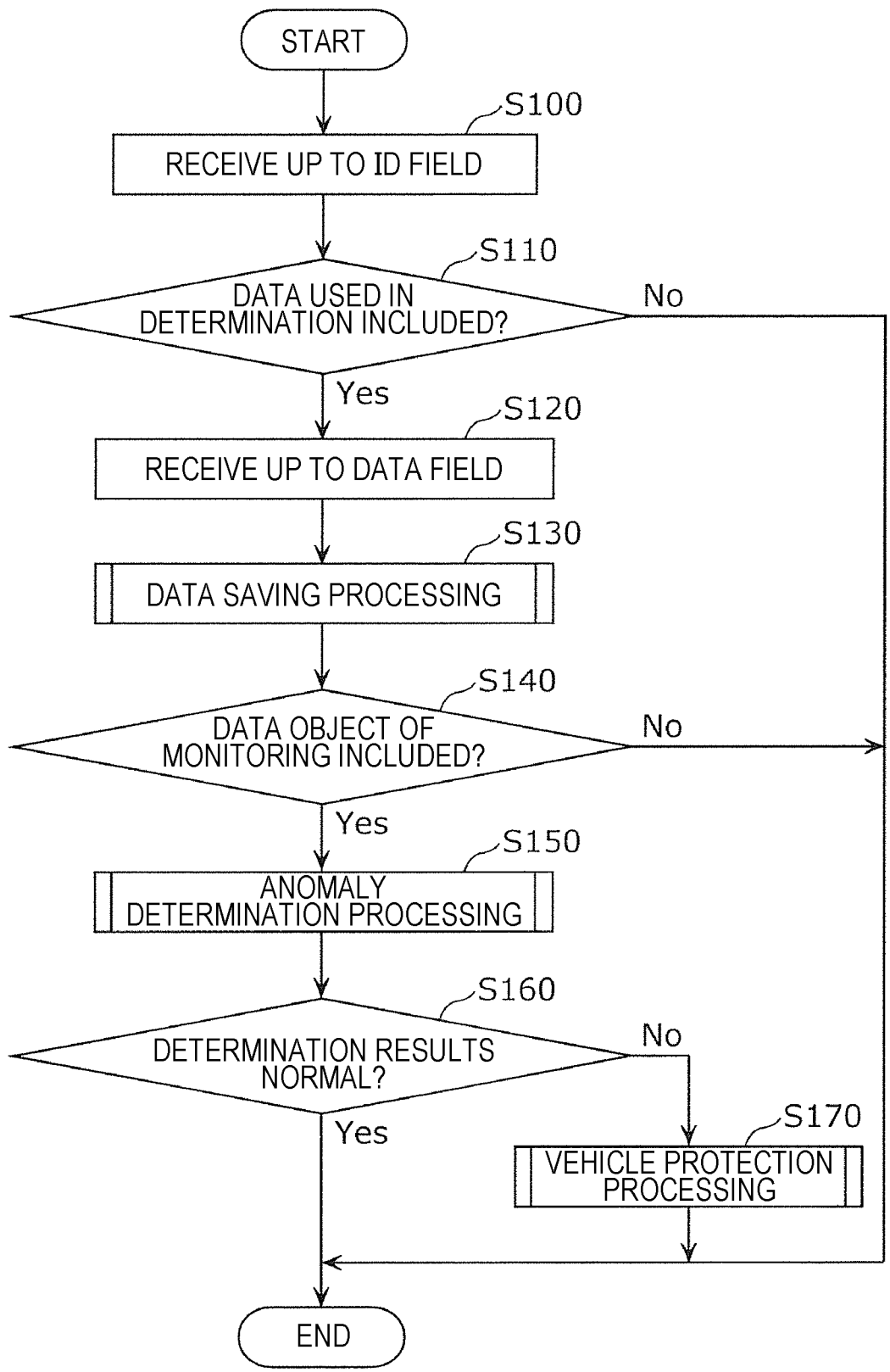
FIG. 18 is a flowchart illustrating an example of processing executed by the anomaly detection ECU according to the first embodiment.

FIG. 18 is a flowchart illustrating an example of processing executed by the anomaly detection ECU 110. Operations of the anomaly detection ECU 110 will be made below by way of FIG. 18.

The anomaly detection ECU 110 receives up to the ID field of a data frame that is a message flowing over the bus 150, and confirms the ID (step S100).

Next, the anomaly detection ECU 110 judges whether or not the confirmed ID is an ID stipulated beforehand to indicate the type of data to be monitored or data for comparison indicated in a rule table stored in the rule storage unit 114 (step S110), and if the judgement is negative, the data frame being received is discarded and the flow ends. In a case where judgment in step S110 is positive, the anomaly detection ECU 110 receives the data frame appearing on the bus 150 up to the data field (step S120). There is no need to wait till all bits in the data field are received in step S120, and the flow can proceed to the next processing at the point that as far as a bit value necessary for performing determination based on a rule table has been received.

Next, the anomaly detection ECU 110 records information that the data field of the data frame being received indicates in the data table, by the data saving processing (see FIG. 19) (step S130).

Next, the anomaly detection ECU 110 references rule tables stored at the rule storage unit 114, and judges whether or not the message being received is a data frame including data to be monitored (step S140). If a data frame including data to be monitored, anomaly determination processing (see FIGS. 20 through 22) is performed, and determination is made regarding whether the data frame being received is normal or anomalous (step S150). In a case where the anomaly detection ECU 110 judges in step S140 that this is not a data frame including data to be monitored, the flow ends.

After the determination at step S150, the anomaly detection ECU 110 judges whether the results of determination in the anomaly determination processing are normal or anomalous (step S160), and only in a case of an anomaly is the vehicle protection processing (see FIGS. 23 and 24) performed (step S170).

1.14 Data Saving Processing at Anomaly Detection ECU 110

Figure 19:
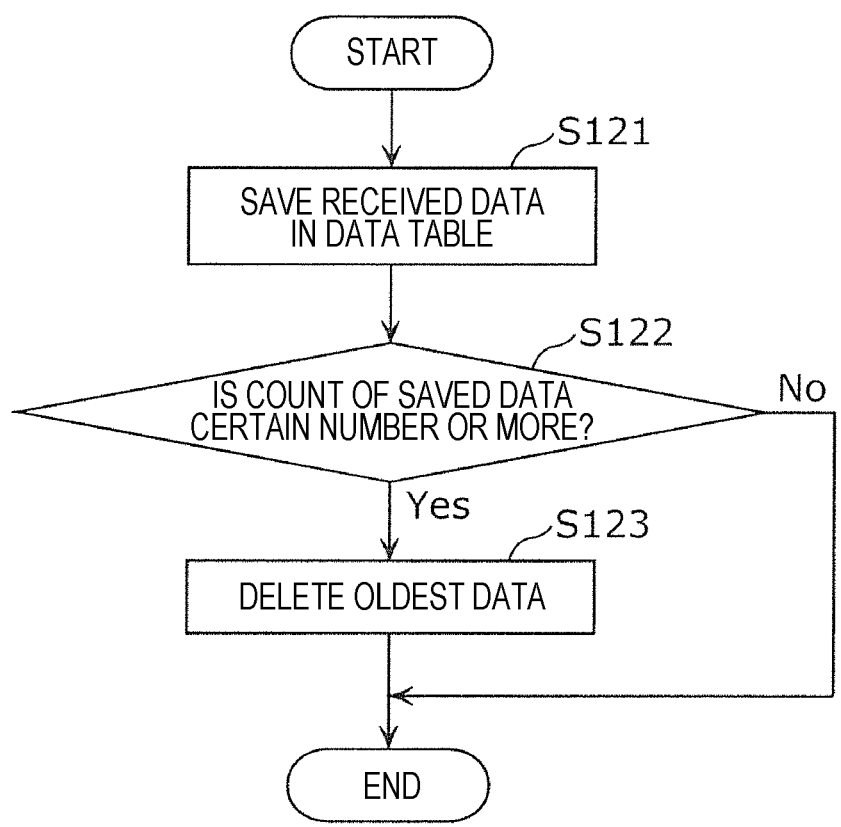
FIG. 19 is a flowchart illustrating an example of data saving processing by the anomaly detection ECU according to the first embodiment.

FIG. 19 is a flowchart illustrating an example of data saving processing at the anomaly detection ECU 110. The data saving processing will be described below by way of FIG. 19.

The anomaly detection ECU 110 saves information that the data field of the data frame being received indicates as data corresponding to the ID of the data frame in the data table (step S121).

Next, the anomaly detection ECU 110 judges whether or not the data count of the data table has reached a certain number or more as a result of having saved information in step S121 (step S122), and only in a case where this is a certain number or more, deletes the oldest data (step S123). This certain number is a number decided beforehand taking into consideration the data used in the anomaly determination processing, and will be three in a case of saving the current value and one past value, for example.

1.15 Anomaly Determination Processing at Anomaly Detection ECU 110

Figure 20:
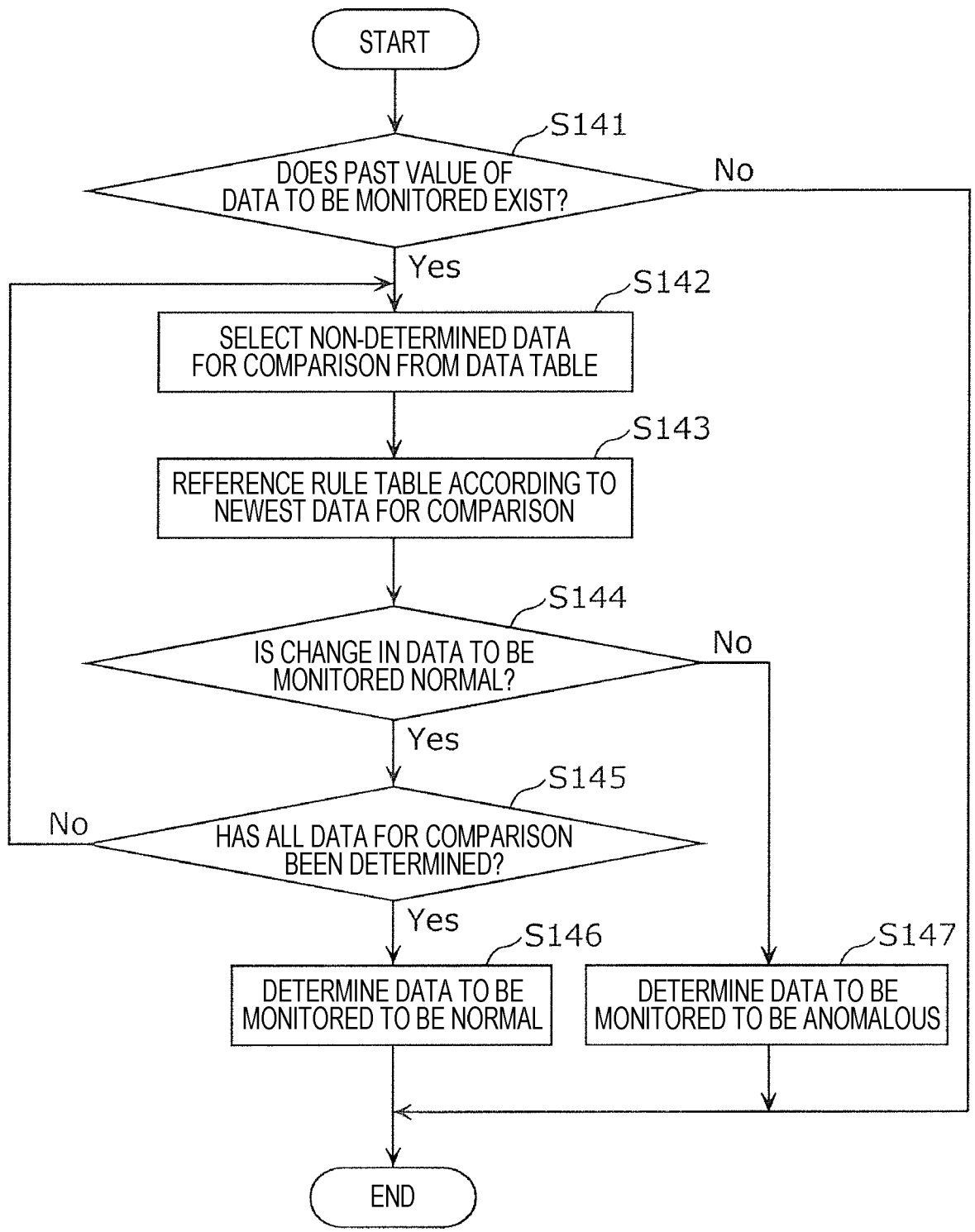
FIG. 20 is a diagram illustrating an example of anomaly detection processing according to an anomaly detection processing pattern 1 by the anomaly detection ECU according to the first embodiment.
Figure 21:
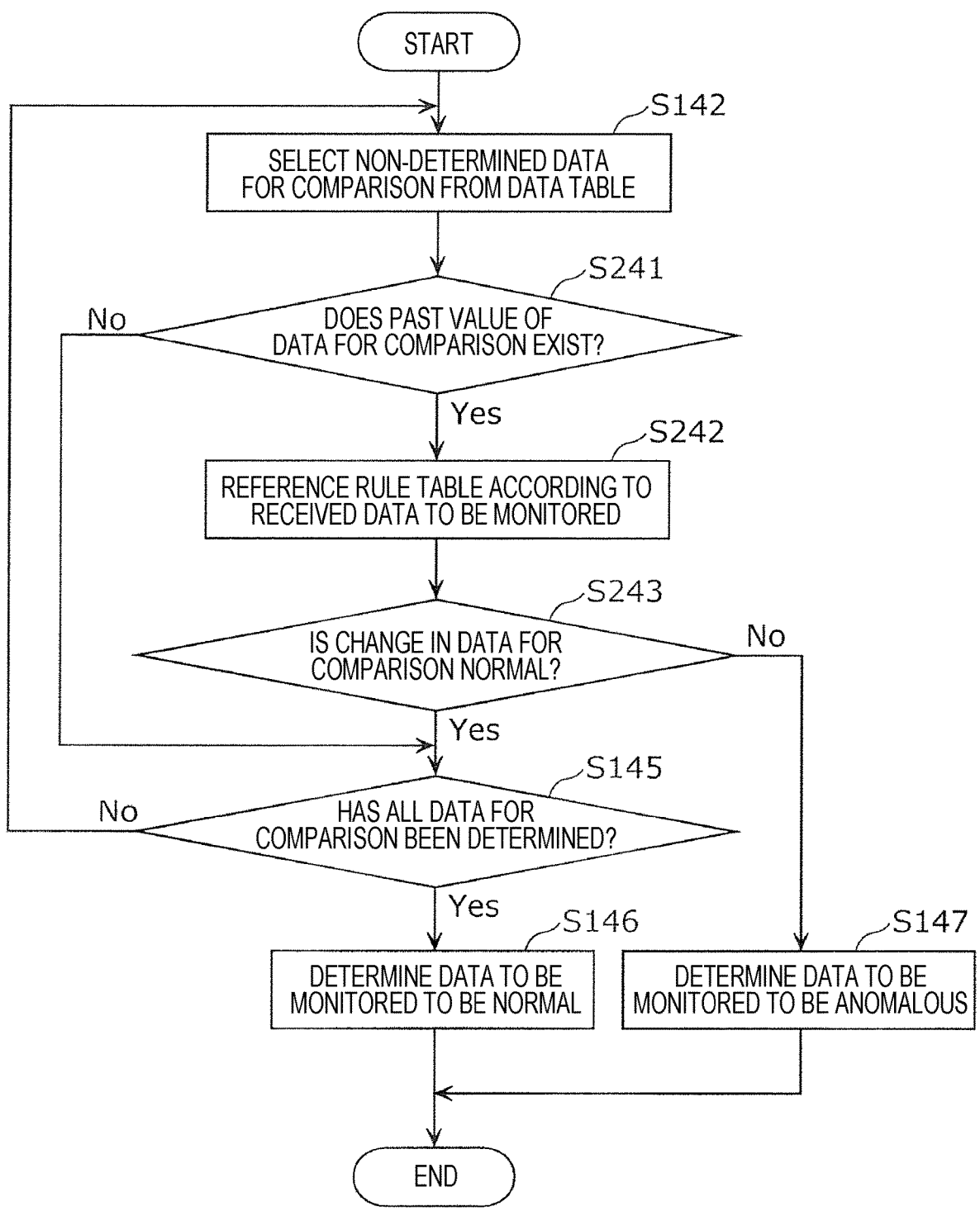
FIG. 21 is a flowchart illustrating an example of anomaly detection processing according to an anomaly detection processing pattern 2 by the anomaly detection ECU according to the first embodiment.
Figure 22:
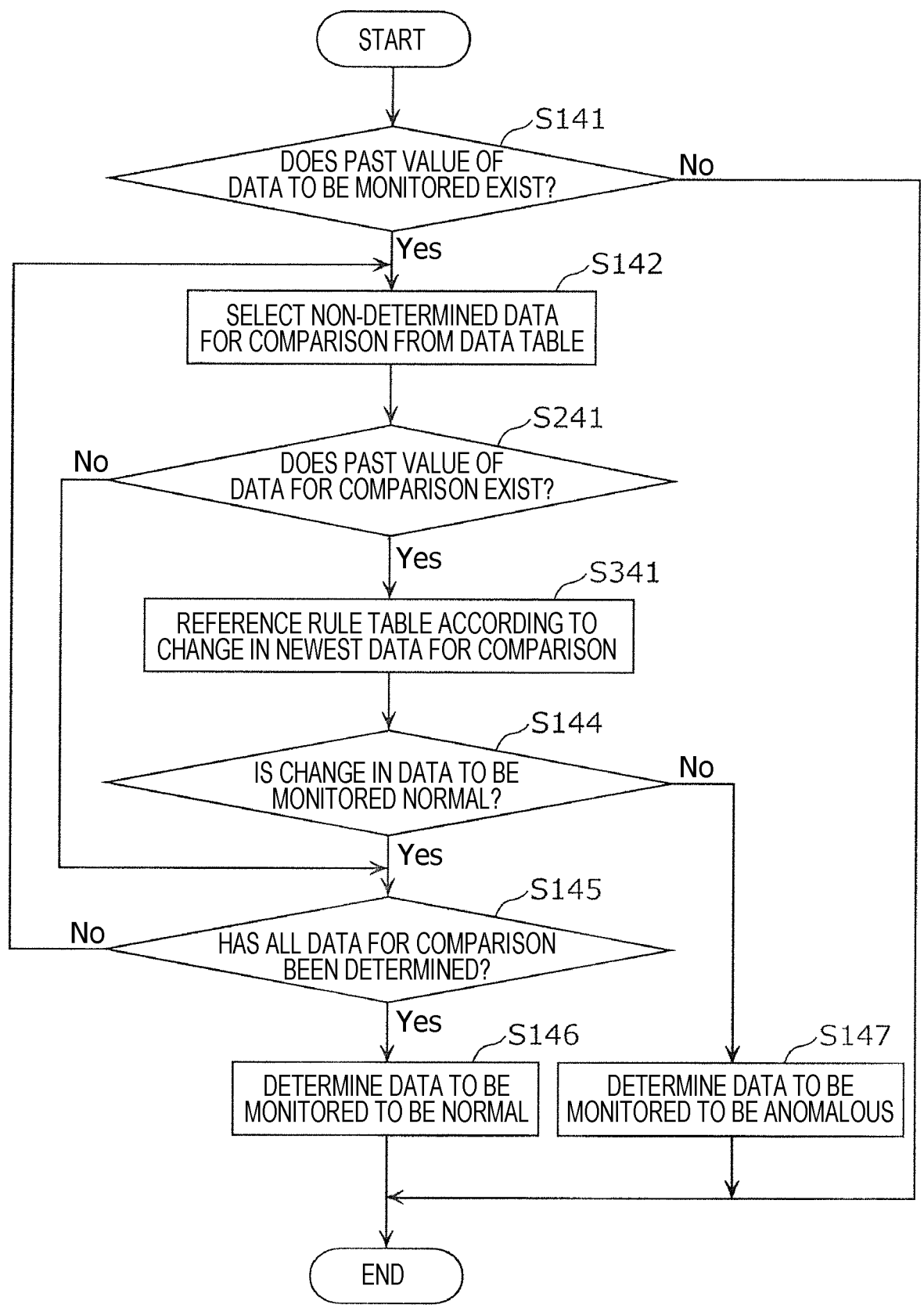
FIG. 22 is a flowchart illustrating an example of anomaly detection processing according to an anomaly detection processing pattern 3 by the anomaly detection ECU according to the first embodiment.

FIGS. 20 through 22 are flowcharts illustrating anomaly determination processing at the anomaly detection ECU 110, respectively illustrating anomaly determination processing according to anomaly determination processing pattern 1, anomaly determination processing according to anomaly determination processing pattern 2, and anomaly determination processing according to anomaly determination processing pattern 3.

In the anomaly determination processing according to anomaly determination processing pattern 1 illustrated in FIG. 20, determination is made using the three values of the current value and past value of the data to be monitored, and the current value of the data for comparison. Although description has been made regarding the rule table in FIG. 9 that the data for comparison corresponding to the data to be monitored is only speed control information, multiple of data for comparison may exist. For example, reference data in a third-type message including reference data (i.e., a data frame having an ID different from the first-type message and second-type message) may be handled as a second data for comparison. FIG. 20 illustrates an example of anomaly determination processing corresponding to a case where there are multiple of data for comparison. The anomaly determination processing according to anomaly determination processing pattern 1 will be described below by way of FIG. 20.

First, the anomaly detection ECU 110 judges whether or not a past value of data to be monitored exists in the data table at the data storage unit 115 (step S141). In a case where no past data value of data to be monitored exists in the data table, the anomaly detection ECU 110 ends the anomaly determination processing.

In a case where a past value of data to be monitored exists in the data table, the anomaly detection ECU 110 selects non-determined data for comparison from the data table (step S142). The anomaly detection ECU 110 then references the rule table shown in FIG. 9, for the data for comparison to determine change in the data to be monitored for the current value i.e., in the newest state (step S143).

Next, the anomaly detection ECU 110 determines whether the change in data to be monitored is normal or not, based on the rule table (step S144), and in a case where the determination is negative, determines the data frame including the data to be monitored to be anomalous, and ends the anomaly determination processing (step S147).

In a case where the change of the data to be monitored is judged to be normal in step S144, the anomaly detection ECU 110 judges whether or not determination in step S144 has been performed for all data for comparison (step S145). In a case where determination has not been performed regarding all data for comparison, the anomaly detection ECU 110 returns to the processing of selecting data for comparison in step S142. In a case where determination has been made regarding all data for comparison, the anomaly detection ECU 110 determines that the data frame including the data to be monitored is normal, and the anomaly determination processing ends (step S146).

In the anomaly determination processing according to anomaly determination processing pattern 2 illustrated in FIG. 21, determination is made using the three values of the current value of the data to be monitored, and the current value and past value of the data for comparison. Although description has been made regarding the rule table in FIG. 10 that the data for comparison corresponding to the data to be monitored is only speed control information, multiple of data for comparison may exist. For example, reference data in a third-type message including reference data periodically transmitted to any one of the ECUs connected to the bus 150 may be handled as a second data for comparison. FIG. 21 illustrates an example of anomaly determination processing corresponding to a case where there are multiple of data for comparison. The anomaly determination processing according to anomaly determination processing pattern 2 will be described below by way of FIG. 21. Note that processing steps that are the same as the anomaly determination processing according to the anomaly determination processing pattern 1 in FIG. 20 are denoted by the same symbols in FIG. 21 as well, and description here will be omitted as appropriate.

First, the anomaly detection ECU 110 selects non-determined data for comparison (step S142).

Next, the anomaly detection ECU 110 judges whether or not a past value of data for comparison exists in the data table (step S241). If there is no past value of data for comparison existing in the data table, the anomaly detection ECU 110 transitions to judgment in step S145. In a case where judgment is made in step S241 that there is a past value of data for comparison existing in the data table, the anomaly detection ECU 110 references the rule table shown in FIG. 10, corresponding to the received data to be monitored (step S242).

Next, the anomaly detection ECU 110 determines whether or not the change in data for comparison is normal or not, based on the rule table (step S243), and in a case where the determination is negative, determines the data frame including the data to be monitored to be anomalous, and ends the anomaly determination processing (step S147).

In a case where the change of the data for comparison is judged to be normal, the anomaly detection ECU 110 judges whether or not determination in step S243 has been performed for all data for comparison (step S145). In a case where determination has not been performed regarding all data for comparison, the anomaly detection ECU 110 returns to the processing of selecting data for comparison in step S142. In a case where determination has been made regarding all data for comparison, the anomaly detection ECU 110 determines that the data frame including the data to be monitored is normal, and the anomaly determination processing ends (step S146).

In the anomaly determination processing according to anomaly determination processing pattern 3 illustrated in FIG. 22, determination is made using the four values of the current value and past value of the data to be monitored, and the current value and past value of the data for comparison. Although description has been made regarding the rule table in FIG. 11 that the data for comparison corresponding to the data to be monitored is only speed control information, multiple of data for comparison may exist. For example, reference data in a third-type message including reference data may be handled as a second data for comparison. FIG. 22 illustrates an example of anomaly determination processing corresponding to a case where there are multiple of data for comparison. The anomaly determination processing according to anomaly determination processing pattern 3 will be described below by way of FIG. 22. Note that processing steps in the anomaly determination processing according to anomaly determination processing pattern 3 that are the same as the anomaly determination processing in FIG. 20 or FIG. 21 are denoted by the same symbols in FIG. 22 as well, and description here will be omitted as appropriate.

First, the anomaly detection ECU 110 judges whether or not a past value of data to be monitored exists in the data table (step S141). In a case where no past value of data to be monitored exists in the data table, the anomaly detection ECU 110 ends the anomaly determination processing.

In a case where a past value of data to be monitored exists in the data table, the anomaly detection ECU 110 selects non-determined data for comparison from the data table (step S142).

Next, the anomaly detection ECU 110 judges whether or not a past value of data for comparison exists in the data table (step S241). If there is no past value of data for comparison existing in the data table, the anomaly detection ECU 110 transitions to judgment in step S145. In a case where judgment is made in step S241 that there is a past value of data for comparison existing in the data table, the anomaly detection ECU 110 references the rule table shown in FIG. 11, corresponding to the change from the past value to the current value of the data for comparison, i.e., to change of the newest data for comparison (step S341).

Next, the anomaly detection ECU 110 determines whether the change in data to be monitored is normal or not, based on the rule table (step S144), and in a case where the determination is negative, determines the data frame including the data to be monitored to be anomalous, and ends the anomaly determination processing (step S147).

In a case where the change of the data to be monitored is judged to be normal in step S144, the anomaly detection ECU 110 judges whether or not determination in step S144 has been performed for all data for comparison (step S145). In a case where determination has not been performed regarding all data for comparison, the anomaly detection ECU 110 returns to the processing of selecting data for comparison in step S142. In a case where determination has been made regarding all data for comparison, the anomaly detection ECU 110 determines that the data frame including the data to be monitored is normal, and the anomaly determination processing ends (step S146).

1.16 Vehicle Protection Processing at Anomaly Detection ECU 110

Figure 23:
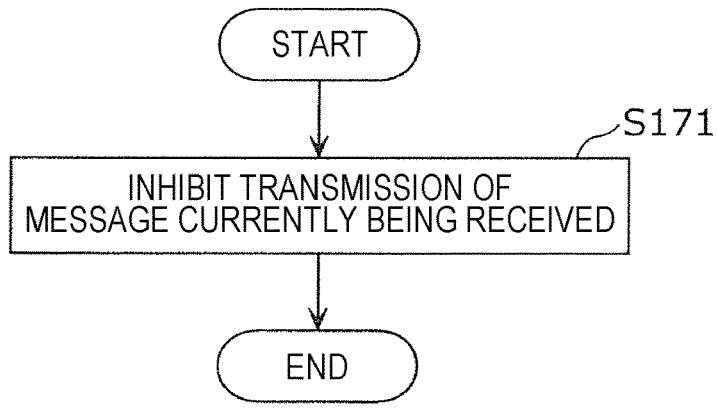
FIG. 23 is a flowchart illustrating an example of vehicle protection processing by the anomaly detection ECU according to the first embodiment.
Figure 24:
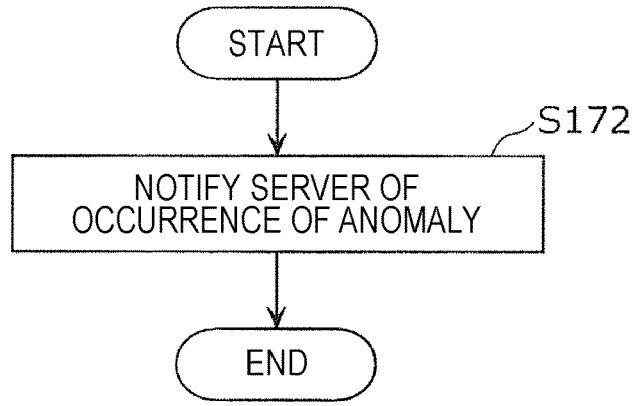
FIG. 24 is a flowchart illustrating another example of vehicle protection processing by the anomaly detection ECU according to the first embodiment.

FIGS. 23 and 24 each illustrate examples of vehicle protection processing by the anomaly detection ECU 110. In the example of FIG. 23, an example is illustrated of ensuring safety of the vehicle 200 by transmission inhibition of the message currently being received regarding vehicle protection processing. In this example, the anomaly detection ECU 110 transmits a predetermined message that invalidates the message including the data to be monitored being received from the bus 150 (step S171). Specifically, the predetermined message is an error frame.

In the example in FIG. 24, an example is illustrated where the server 400 is notified that an anomaly is occurring at the vehicle 200 using the external communication device 140, as vehicle protection processing. In this example, the anomaly detection ECU 110 instructs the external communication device 140, whereby the server 400 is notified of the occurrence of the anomaly from the external communication device 140 via the external network 300 (step S172). In step S172, the external communication device 140 may transmit information indicating the anomaly to other vehicles around the vehicle 200 by inter-vehicular communication. The external communication device 140 may transmit information indicating the anomaly so as to include the vehicle identification number (VIN: Vehicle Identification Number), body number, and so forth, to the server 400. The server 400 may transmit information indicating the anomaly to other vehicles, upon receiving notification from the vehicle 200. The server 400 may, for example, based on the vehicle identification number, body number, and so forth, notified from the vehicle 200, reference list information correlating these with vehicle types and so forth, to identify vehicles of the same vehicle type as the vehicle 200, and transmit information indicating the anomaly to vehicles of the same vehicle type. Vehicles of the same vehicle type have generally the same configuration, for example. Also, vehicles of the same vehicle type are vehicles of which the model in the body number (i.e., vehicle model) are the same, for example, or alternatively, are vehicles of which the digits in the vehicle identification number are the same from the beginning up to before the serial number, for example. Alternatively, the external communication device 140 may transmit information indicating the anomaly to vehicles that are of the same vehicle type as the vehicle 200. These notifications of the anomaly enable vehicles other than the vehicle 200 to also avoid danger and so forth.

The vehicle protection processing may be a combination of each processing illustrated in FIGS. 23 and 24, or may be processing other than these. Note that the vehicle 200 may have a notification device that notifies the server 400, vehicle 500, and so forth, that are outside of the vehicle 200, regarding the anomaly in a case where determination is made that an anomaly is occurring regarding a message, by anomaly determination processing at the anomaly detection ECU 110. Although an example of a notification device in the vehicle 200 is the external communication device 140, but the notification device is not restricted to a device having communication functions, and may be a warning device (e.g., a device that performs lighting control to light an emergency flashing display light, a device to perform control to sound a horn, etc.) that alerts vehicles nearby by emitting light, sound, or the like.

1.17 Warning Notification at Vehicle 500 Receiving Notification of Anomaly

Figure 25:
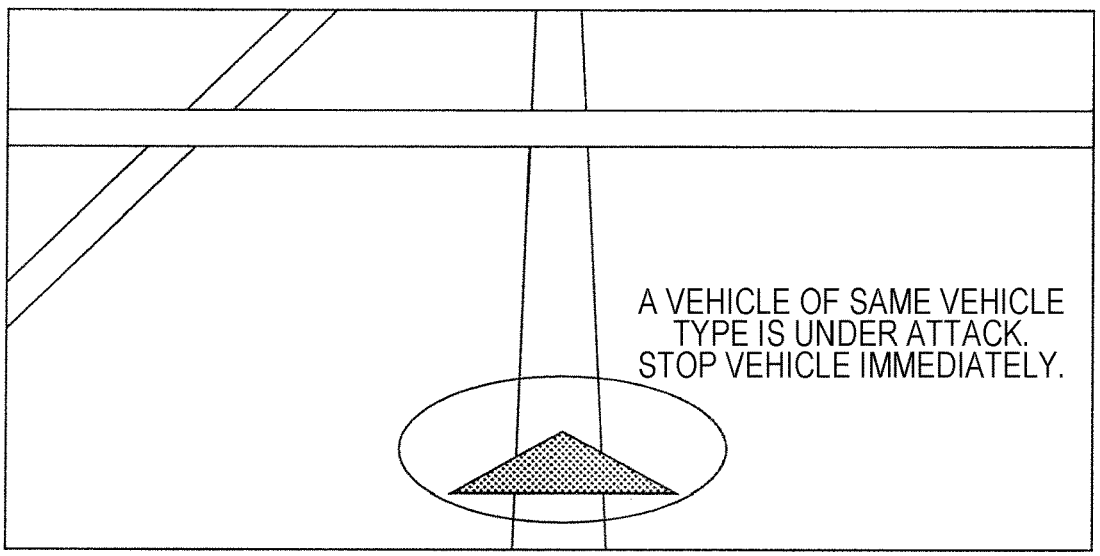
FIG. 25 is a diagram illustrating an example of a warning notification at a head unit of a vehicle.

FIG. 25 is a diagram illustrating an example of a warning notification at the head unit of the vehicle 500. In a case where transmission of information indicating anomaly in the same vehicle type has been made, as vehicle protection processing by the anomaly detection ECU 110 of the vehicle 200, the vehicle 500 receives that information either directly or via the server 400. The vehicle 500 then displays a warning notification display such as shown in FIG. 25, for example, on a display device, as a warning notification at the head unit. In the example in FIG. 25, the anomaly is occurring at a vehicle of the same vehicle type as the vehicle 500, so a message serving as a warning notification display is displayed on the display device to prompt the driver to quickly bring the vehicle to a halt. Thus, harm from attacks on vehicles of the same vehicle type can be proactively prevented. Note that the warning notification at the head unit may be performed by audio output or other methods, besides display of a warning notification display on a display device.

1.18 Advantages of First Embodiment

In the onboard network system 100 according to the present embodiment, even if an attacker transmits an unauthorized message at the same cycle as a cycle of transmission from valid ECUs connected on the onboard network, the message can be determined to be anomalous based on received data to be monitored, a current value of data for comparison as a newest value, and at least one of a past value of data to be monitored and a past value of data for comparison. The onboard network system 100 can deal with the attack in accordance with the determination results. Also, in the anomaly detection system 10 configured of multiple vehicles including the onboard network system 100 and a server, the effects of an attack can be reduced by notification among vehicles regarding the occurrence of an anomaly.

Second Embodiment

Next, an anomaly detection system that includes a vehicle in which is installed an onboard network system that is capable of detecting anomalies in messages flowing over an onboard network, another vehicle, and a server, will be described as a second embodiment of the present disclosure with reference to the drawings.

2.1 Overall Configuration of Anomaly Detection System

The configuration of the anomaly detection system according to the second embodiment of the present disclosure is the same as the configuration of the anomaly detection system 10 described in the first embodiment, so description thereof will be omitted here.

2.2 Configuration of Onboard Network System 2600

Figure 26:
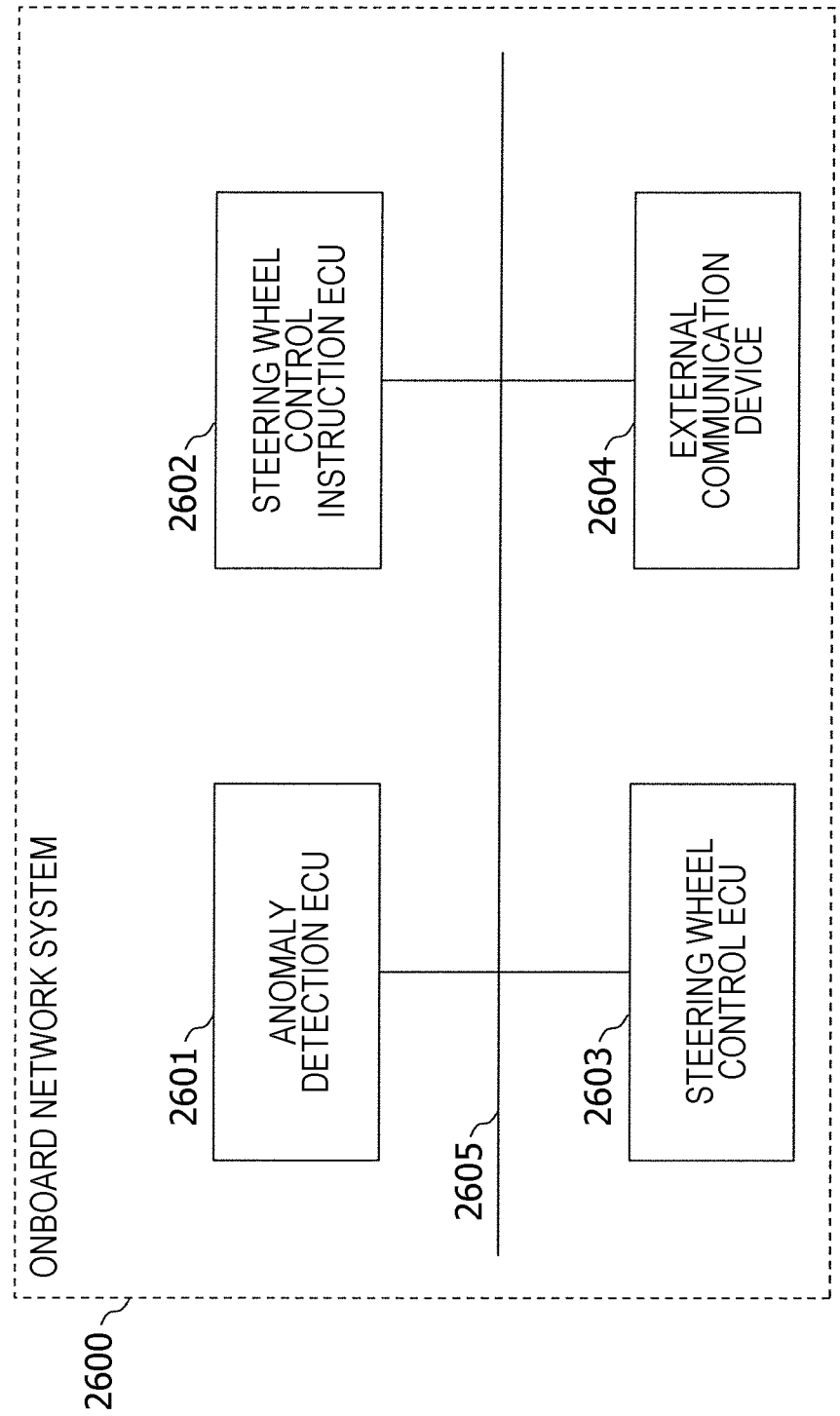
FIG. 26 is a diagram illustrating the configuration of an onboard network system according to a second embodiment.

FIG. 26 illustrates the configuration of an onboard network system 2600. The onboard network system 2600 is an example of a communication system that performs communication following the CAN protocol, and is a communication system in the vehicle 200 where various types of devices, such as control devices, sensors, actuators, user interface devices, and so forth, have been installed. The onboard network system 2600 has multiple ECUs that perform communication relating to frames (also referred to as messages) over a bus (network bus), and uses an anomaly detection method. Specifically, the onboard network system 2600 includes a bus 2605, and an anomaly detection ECU 2601, steering wheel control instruction ECU 2602, steering wheel control ECU 2603, and external communication device 2604 that is a type of ECU, connected to the bus 2605 as illustrated in FIG. 26. The bus 2605 is a wired communication path of the onboard network, and is connected to each ECU. Note that the onboard network system 2600 can include many more ECUs besides the anomaly detection ECU 2601, steering wheel control instruction ECU 2602, steering wheel control ECU 2603, and external communication device 2604, but description will be made here primarily focusing on the ECUs illustrated in FIG. 26, for the sake of convenience.

Each ECU is a device that includes, for example, digital circuits such as a processor (microprocessor), memory, and so forth, analog circuits, communication circuits, and so forth. The memory is ROM, RAM, and so forth, capable of storing a program (computer program) to be executed by the processor. Functions of the ECU are realized by the processor operating following the program, for example. A computer program is configured as a combination of multiple command codes representing instructions to the processor, to achieve predetermined functions. ECUs can be connected to various types of devices.

The ECUs can exchange frames via the bus 2605, following the CAN protocol. There are data frames in frames exchanged among ECUs. A data frame can include data used for control of the vehicle, such as for example, data relating to the state of the vehicle, data instructing control of the vehicle, and so forth.

The anomaly detection ECU 2601 is an ECU that is connected to the bus 2605, and that receives a first-type message, second-type message and so forth flowing over the bus 2605 of the onboard network, determines whether the first-type message is normal or anomalous, and performs predetermined processing based on the results of the determination. The anomaly detection ECU 2601 uses the received second-type message for determination of whether the first-type message is normal or anomalous. The first-type message is a message that has predetermined identification information (ID), that has been decided indicating that data to be monitored is included. The second-type message is a message having identification information (ID) that differs from the first-type message, that has been decided indicating that data for comparison is included.

The steering wheel control instruction ECU 2602 transmits steering wheel control instruction information relating to instructions to control the steering wheel (e.g., angle of turning the steering wheel, etc.) at certain cycles, in a case of realizing an advanced driver assistance system (ADAS: Advanced Driver Assistance System) that involves steering wheel operations such as parking assistance functions, lane-keeping functions, and so forth, for example.

The steering wheel control ECU 2603 is connected to the steering wheel for example, receives steering wheel control instruction information that the steering wheel control instruction ECU 2602 transmits, controls the steering wheel based on the received steering wheel control instruction information, and also transmits steering wheel state information relating to the current state of the steering wheel (e.g., the angle to which the steering wheel is turned, etc.), at a certain cycle.

The external communication device 2604 is connected to the external network 300, and has a function of transmitting information relating to the vehicle 200, such as information indicating anomalies or the like, externally from the vehicle 200.

2.3 Configuration of Anomaly Detection ECU 2601

Figure 27:
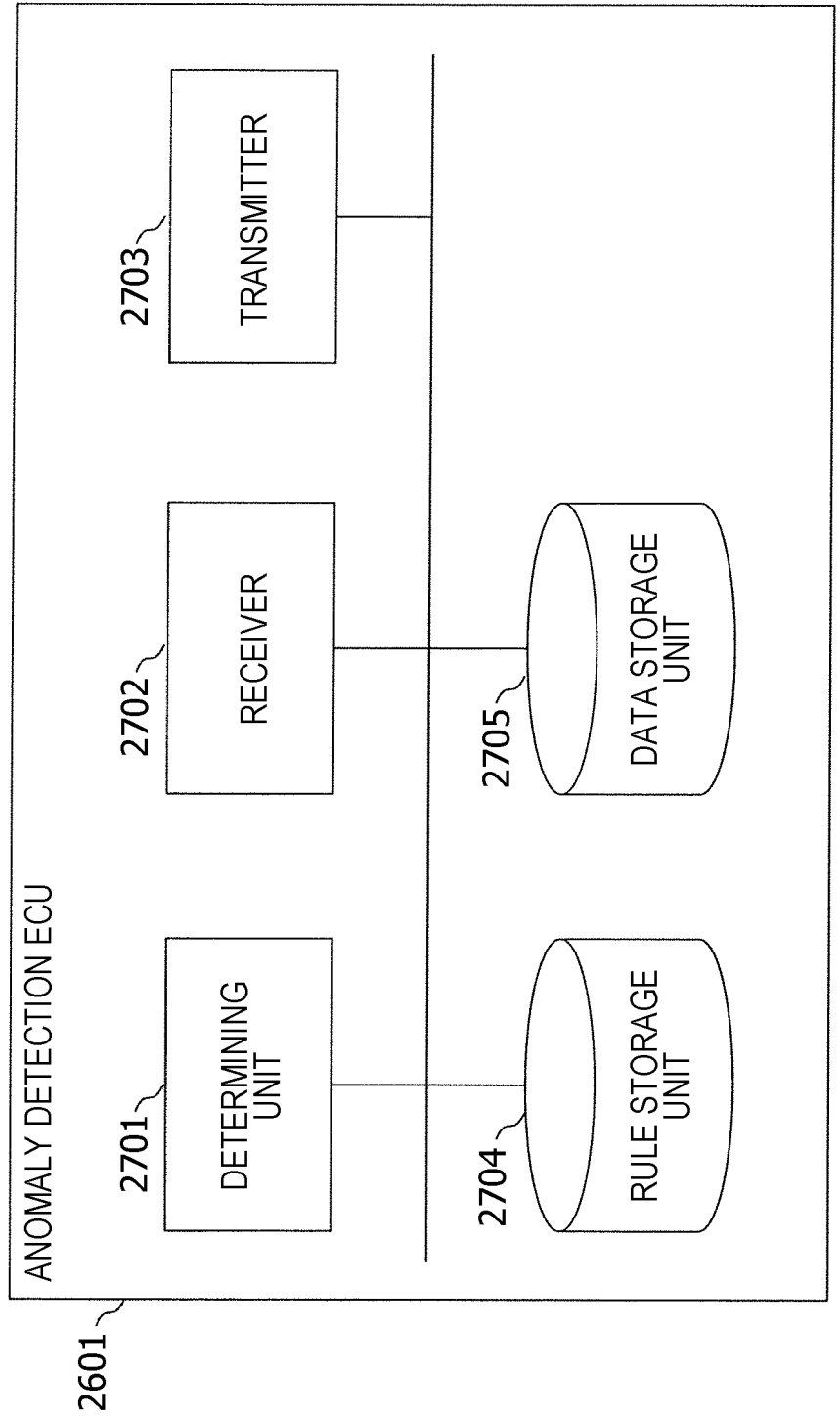
FIG. 27 is a diagram illustrating the configuration of an anomaly detection ECU according to the second embodiment.

FIG. 27 illustrates the configuration of the anomaly detection ECU 2601. The anomaly detection ECU 2601 includes a determining unit 2701, a receiver 2702, a transmitter 2703, a rule storage unit 2704, and a data storage unit 2705, as illustrated in FIG. 27. The components of the anomaly detection ECU 2601 illustrated in FIG. 27 can be realized by a storage medium such as memory or the like of the anomaly detection ECU 2601, a communication circuit, and a processor or the like that executes programs stored in memory.

The determining unit 2701 determines whether or not a data frame being received is normal or anomalous, by performing anomaly detection processing using the data frame that the receiver 2702 is currently receiving, a data table (see FIG. 34) stored in the data storage unit 2705 and sequentially updated, and rules shown in a rule table (see FIG. 33) stored in the rule storage unit 2704. In a case of having determined that a data frame being received is anomalous, the determining unit 2701 performs later-described vehicle protection processing (see FIGS. 40 and 41). The determining unit 2701 can be realized by a processor or the like that executes programs, for example.

If messages transmitted from the ECUs within the onboard network system 2600 and appearing on the bus 2605 (i.e., data frames) are message having identification information (ID) necessary for determination of data to be monitored, from information in the rule tables, the receiver 2702 receives the messages. The receiver 2702 also performs data saving processing (see FIG. 38) which is processing of updating a data table so as to include the contents of a received message in the data table that the data storage unit 2705 stores. The receiver 2702 can be realized by a communication circuit or the like.

The transmitter 2703 performs transmission in accordance with the results of determination by the determining unit 2701, under control of the determining unit 2701. In a case of the determining unit 2701 has determined that a data frame being received is anomalous, for example, the transmitter 2703 transmits a predetermined message to invalidate this data frame to the bus 2605, as transmission inhibition processing of the data frame. The predetermined message is an error frame, for example. Also, in a case where the determining unit 2701 has determined that a data frame being received is anomalous, for example, the transmitter 2703 transmits a message having identification information (ID) set beforehand so that the external communication device 2604 will receive, and including information indicating an anomaly, to the bus 2605, so that the external communication device 2604 notifies the server 400 and another vehicle 500 of the anomaly that has occurred at the vehicle 200. The transmitter 2703 can be realized by a communication circuit or the like.

The storage units, i.e., the rule storage unit 2704 and data storage unit 2705, can be realized by one region of a storage medium, for example. The rule storage unit 2704 stores rule tables regarding the relation between data to be monitored, and data for comparison. The data storage unit 2705 stores data tables including data that are the content of messages including data to be monitored, and data for comparison, in accordance with identification information (ID) received by the receiver 2702.

2.4 Data Frame Format

Data frames used in networks following the CAN protocol are the same as in the first embodiment, so description with be omitted here.

2.5 Error Frame Format

Error frames stipulated in the CAN protocol are the same as in the first embodiment, so description with be omitted here.

2.6 Data Frames Transmitted by Steering Wheel Control Instruction ECU 2602

Figure 28:
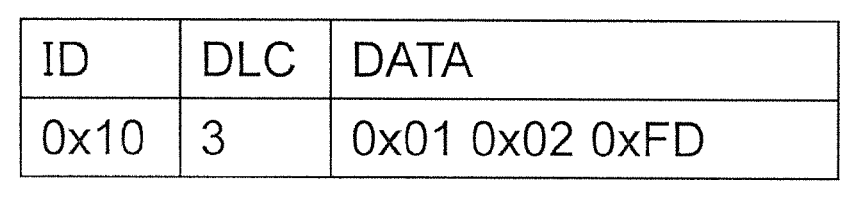

FIG. 28 is a diagram illustrating an example of data frames including steering wheel control instruction information that the steering wheel control instruction ECU 2602 transmits. In this example, a data frame including steering wheel control instruction information has an ID that is a predetermined value "0x10", and the data length indicated by the DLC is 3. The data in the data filed of this data frame indicates the steering wheel control instruction information. The first byte of the steering wheel control instruction information represents whether this steering wheel control instruction is valid or invalid, and the second byte to the third byte indicate the steering instruction angle of the steering wheel (instruction of the angle to turn the steering wheel).

Figure 29:
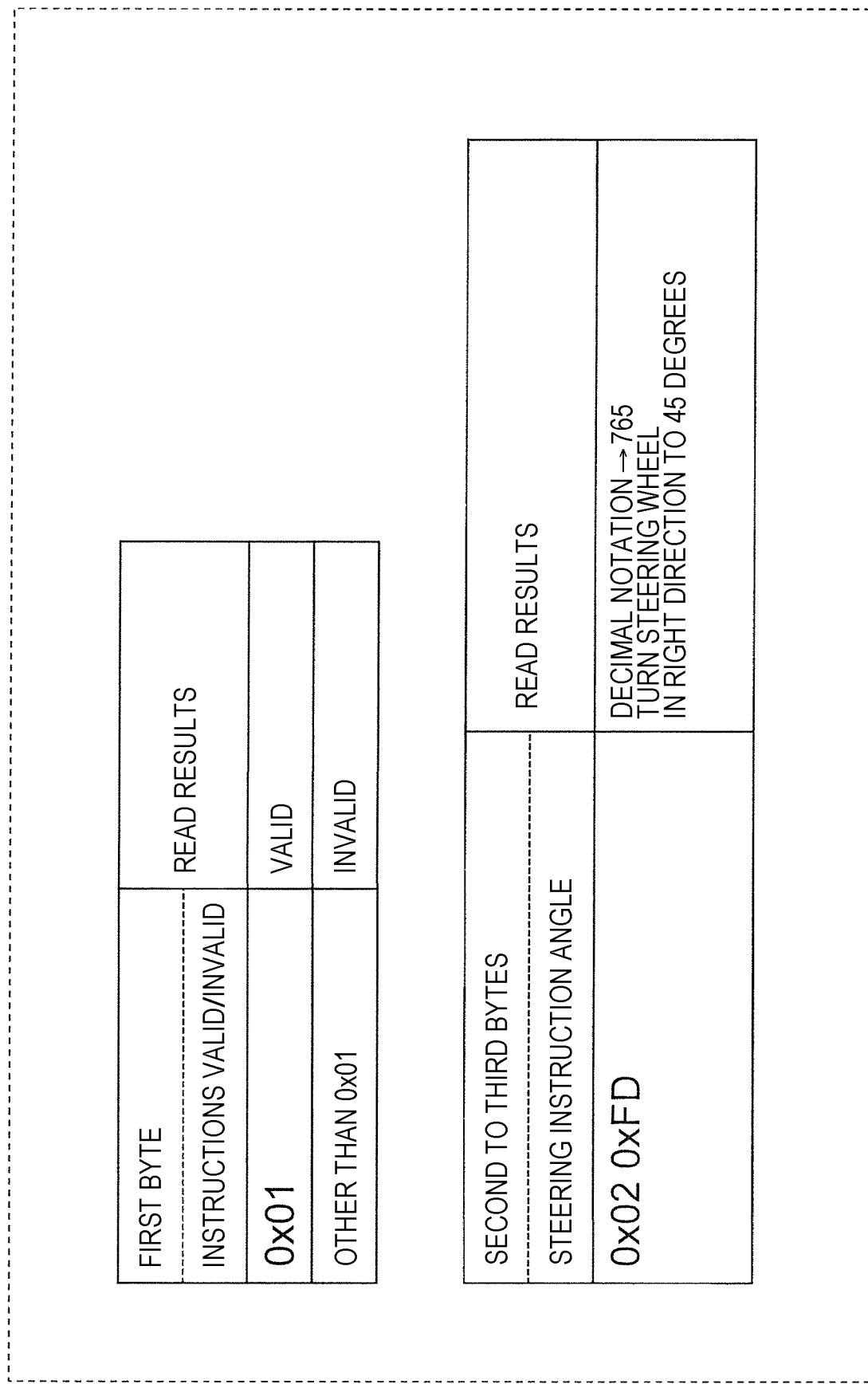
FIG. 29 is a diagram illustrating an example of a method of reading steering wheel control instructions in a data frame transmitted by the steering wheel control instruction ECU.

FIG. 29 represents the meaning that the data values indicate in the steering wheel control instruction information as results of reading the data, as a specific example. In a case where the first byte of data relating to the steering wheel control instruction information is 0x01, this steering wheel control instruction information is valid, and in a case of being other than 0x01, this means that this steering wheel control instruction information is invalid. What it means here for the steering wheel control instruction information to be "valid" is that the steering wheel control ECU 2603 that has received this steering wheel control instruction information will control the steering wheel following this steering wheel control instruction information, and what it means to be "invalid" is that the steering wheel control ECU 2603 will not control the steering wheel and will not follow this steering wheel control instruction information.

Further, the second byte to the third byte of the steering wheel control instruction information indicates the steering instruction angle. The steering instruction angle indicates the state of how many degrees the steering wheel is to be turned (in other words how many degrees the steering wheel is to be rotated to). In a case where the steering instruction angle is "45 degrees to right direction" this means to move the steering wheel to a state of having been rotated 45 degrees to the right direction, and if the steering instruction angle is "45 degrees to left direction" this means to move the steering wheel to a state of having been rotated 45 degrees to the left direction. The angle of the steering wheel when the vehicle is traveling straight ahead is 0 degrees, as a reference.

The data in the data frame exemplified in FIG. 29 has 0x01 for the first byte, and the second byte to the third byte are 0x02, 0xFD, so the anomaly detection ECU 2601 and the steering wheel control ECU 2603 that have received this steering wheel control instruction information reads the steering wheel control instruction information to mean that "control instruction is valid" and "rotate steering wheel by 45 degrees in right direction".

Here, the steering angle that the second byte to third byte indicate is obtained by converting hexadecimal notation into decimal notation, and finding the difference between this converted value and "720", which is the target angle at the time of rotating the steering wheel. For example, in a case where the converted value is greater than "720", this means rotation in the right direction, and if smaller, rotation to the left direction. The difference between the converted value and "720" is the target steering wheel angle. Specifically, in a case where the converted value is "765", this means to rotate the steering wheel to 45 degrees in the right direction, and in a case where the converted value is "675", this means to rotate the steering wheel to 45 degrees in the left direction.

2.7 Data Frame Transmitted by Steering Wheel Control ECU 2603

Figure 30:
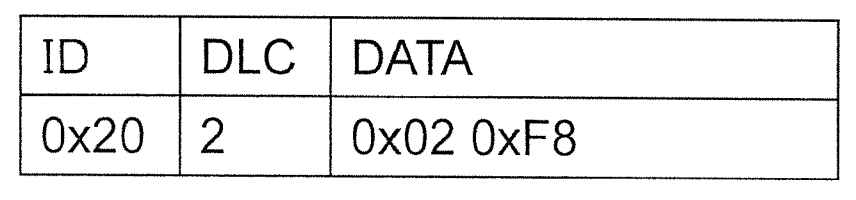

FIG. 30 is a diagram illustrating an example of a data frame including steering wheel state information that the steering wheel control ECU 2603 transmits. In this example, a data frame including the steering wheel state information has an ID that is a value "0x20" which is different from the data frame including the steering wheel control instruction information, and the data length indicated by the DLC is 2. Data in the data field of this data frame indicates the steering wheel state information. The first byte to second byte of data relating to the steering wheel state information represents the steering state angle of the steering wheel (the state of how many degrees the steering wheel is currently turned).

FIG. 31 represents the meaning that the data values indicate in the steering wheel state information as results of reading the data, as a specific example. The first byte to second byte of data relating to the steering wheel state information represents the steering state angle. The steering state angle indicates the current rotation angle of the steering wheel (the state of how many degrees the steering wheel is currently turned), so in a case where the steering state angle is "40 degrees in right direction", the current state of the steering wheel is a state turned to the right direction by 40 degrees, and in a case where the steering state angle is "40 degrees in left direction", the current state of the steering wheel is a state turned to the left direction by 40 degrees. The angle of the steering wheel when the vehicle is traveling straight ahead is 0 degrees, as a reference.

The data in the data frame exemplified in FIG. 31 is 0x02, 0xF8 for the first byte to the second byte, so the anomaly detection ECU 2601 and the steering wheel control instruction ECU 2602 receiving this steering wheel state information read the steering wheel state information in this data frame as being "state where steering wheel is currently turned 40 degrees to the right direction".

Now, the steering state angle that the first byte to the second byte indicate is obtained by converting hexadecimal notation into decimal notation, and finding the difference between this converted value and "720" as the current steering wheel inclination. For example, in a case where the converted value is greater than "720" this means that the steering wheel is turned in the right direction, and if smaller, means that the steering wheel is turned in the left direction. The difference indicates the angle to which the steering wheel is currently turned. Specifically, in a case where the converted value is "760", this means that the steering wheel is currently turned 40 degrees to right direction, and in a case where the converted value is "680", this means that the steering wheel is currently turned 40 degrees to left direction.

2.8 Rules in Rule Table

Figure 32:
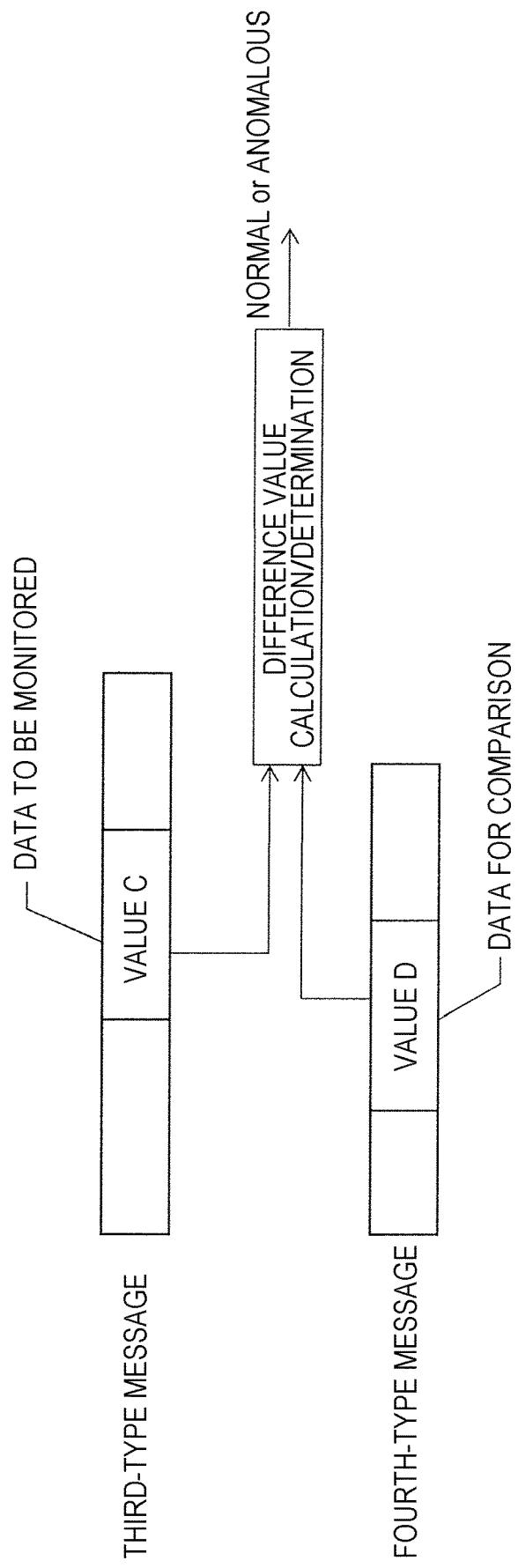
FIG. 32 is a diagram illustrating rules that the anomaly detection ECU according to the second embodiment uses.

FIG. 32 is a diagram illustrating the concept of rules stipulated by a rule table stored in the rule storage unit 2704. Rules will be described with a value of data that is a particular bit string in a third-type message that is a message having an ID of a predetermined value, flowing over the bus 2605 of the onboard network, as a value C, and a value of data that is a particular bit string in a fourth-type message that is a message having an ID of a particular value that is different from the predetermined values, as value D. In a case where the third-type message and the fourth-type message are each periodically and successively transmitted, and there is change that can occur in the values regarding the two values of value C and value D indicated by the messages appearing on the bus 2605, with a certain regularity in a normal state, the difference value of these values is stipulated as a rule. Here, the value C of the third-type message is data to be monitored, and the value D of the fourth-type message is data for comparison. In a case of determining whether or not the third-type message is normal, the difference value between the data to be monitored (value C) included in the third-type message and the data for comparison (value D) included in the fourth-type message is calculated, and whether or not the calculated difference value is within a certain range decided beforehand is determined, thereby determining whether or not the third-type message is normal.

2.9 Specific Example of Rule Table

FIG. 33 illustrates an example of a rule table that the rule storage unit 2704 stores. In this example, the data to be monitored is steering wheel control instruction information, and the data for comparison is steering wheel state information. That is to say, the data to be monitored is included in the data field of the steering wheel control instruction information, i.e., in the data field of the data frame having a predetermined value ("0x10" in the example in FIG. 33) in the ID field. Also, the data for comparison is included in the data field of the steering wheel state information, i.e., in the data field of the data frame having a particular value different from the predetermined value ("0x20" in the example in FIG. 33) in the ID field. The rule here is that "difference of values between data to be monitored and data for comparison within 30" is normal.

As a specific example, an example of anomaly determination processing in a case where the anomaly detection ECU 2601 has received the steering wheel control instruction information shown in FIG. 28 and the steering wheel state information shown in FIG. 30 will be illustrated. The anomaly detection ECU 2601 upon receiving steering wheel control instruction information (FIG. 28), performs determination of whether or not this steering wheel control instruction information is normal, using the steering wheel state information (FIG. 30) that has been received most recently. The data to be monitored in the example in FIG. 28 is "0x02, 0xFD" (765 in decimal notation), and the data for comparison in the example in FIG. 30 is "0x02, 0xF8" (760 in decimal notation), so the difference value thereof is "5". Accordingly, the difference between the steering wheel control instruction information and steering wheel state information is within the "30" stipulated by the rule, and the anomaly detection ECU 2601 determines that the received steering wheel control instruction information is normal.

2.10 Data Table

FIG. 34 illustrates an example of a data table that the data storage unit 2705 stores. The data table is a table recording each of data to be monitored of the third-type message, and data for comparison of the fourth-type message, in the order of reception of messages, for example. This data table is successively updated by data saving processing (see FIG. 38) being performed at the anomaly detection ECU 2601.

The data table in the example in FIG. 34 includes the current value and past values of steering wheel control instruction information (ID=0x10) that is the data to be monitored of the third-type message, and the current value and past values of steering wheel state information (ID=0x20) that is the data for comparison of the fourth-type message.

2.11 Processing Sequence of Anomaly Detection ECU, etc.

Figure 35:
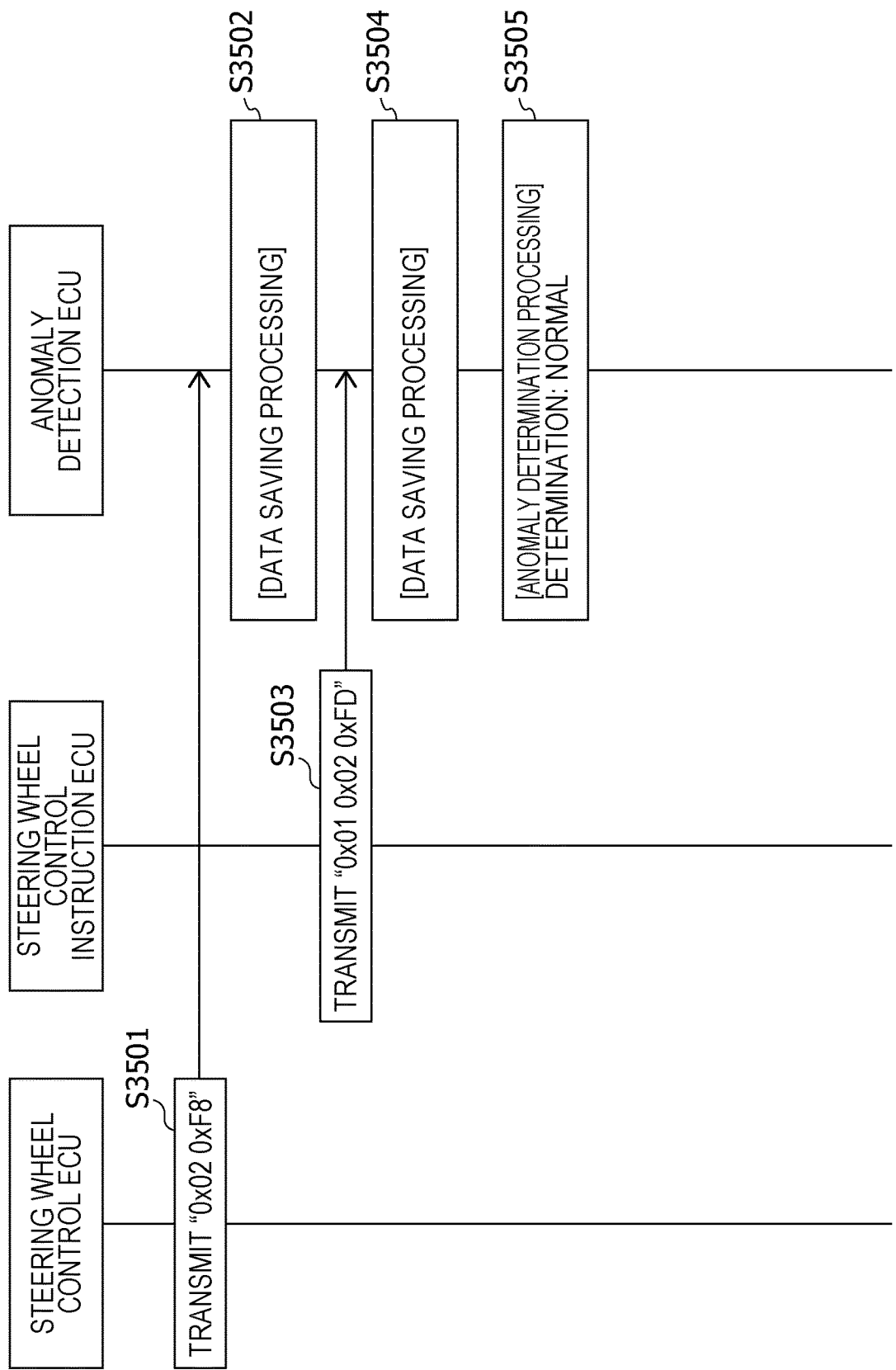
FIG. 35 is a diagram illustrating an example of a processing sequence by the anomaly detection ECU according to the second embodiment in a case where there is no anomaly.

Next, the operations of the anomaly detection ECU 2601 in the onboard network system 2600 will be described with reference to FIGS. 35 and 36. FIG. 35 illustrates an example of a processing sequence of the anomaly detection ECU 2601 and so forth in a case where there is no anomaly in messages flowing over the bus 2605. Here, the anomaly detection ECU 2601 performs anomaly determination processing using the rule table shown in FIG. 33.

The steering wheel control ECU 2603 transmits a message including steering wheel state information "0x02, 0xF8" onto the bus 2605 (step S3501). The anomaly detection ECU 2601 that has received this message reads "steering state angle" from the steering wheel state information in this message, and saves in the data table (step S3502).

The steering wheel control instruction ECU 2602 transmits a message including steering wheel control information "0x01, 0x02, 0xFD" onto the bus 2605 (step S3503). The anomaly detection ECU 2601 that has received this message reads "steering instruction angle" from the steering wheel control instruction information in that message, and saves in the data table (step S3504).

The anomaly detection ECU 2601 then determines the two of current value "steering instruction angle" of the steering wheel control instruction information that is data to be monitored, and past value "steering state angle" of the steering wheel state information that is data for comparison, to be normal, using the rule table illustrated in FIG. 33 (step S3505). Here, the past value is the past value that is the closest to the present. In other words, in a case where values are received regularly, and in a case where the current value is a value received at the m'th time, the past value is a value received at the m−1'th time.

Figure 36:
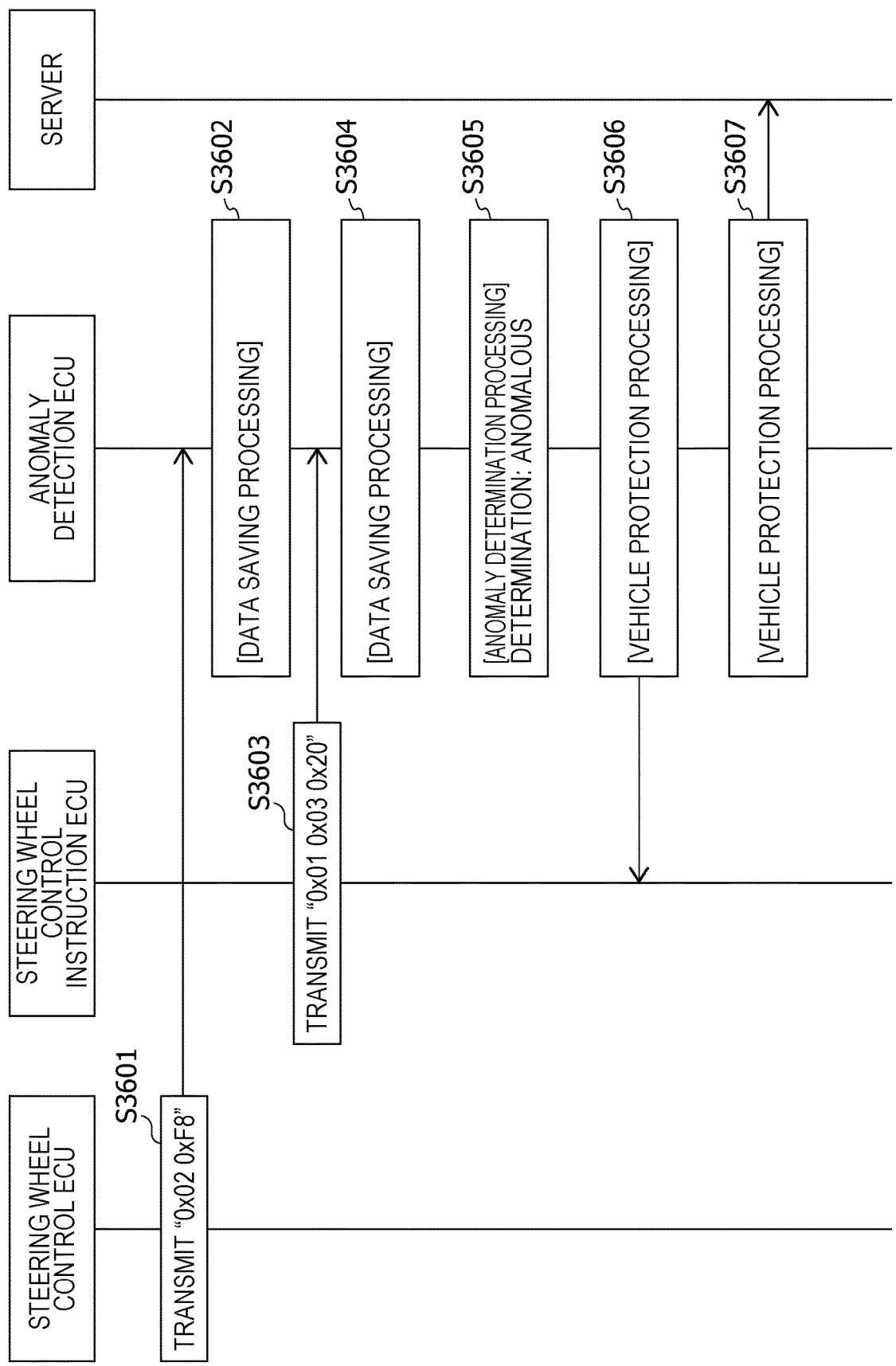
FIG. 36 is a diagram illustrating an example of a processing sequence relating to anomaly detection processing by the anomaly detection ECU according to the second embodiment.

FIG. 36 illustrates an example of a processing sequence of the anomaly detection ECU 2601 and so forth in a case where an unauthorized message has flowed onto the bus 2605. Here, the anomaly detection ECU 2601 performs anomaly determination processing using the rule table shown in FIG. 33. Note that the unauthorized message can be transmitted from the steering wheel control instruction ECU 2602 in a state where an attacker has taken over the steering wheel control instruction ECU 2602, for example. The attacker can also stop transmission of legitimate messages from the steering wheel control instruction ECU 2602 and transmit unauthorized messages instead, for example.

The steering wheel control ECU 2603 transmits a message including steering wheel state information "0x02, 0xF8" onto the bus 2605 (step S3601). The anomaly detection ECU 2601 that has received this message reads "steering state angle" from the steering wheel state information in this message, and saves in the data table (step S3602).

The steering wheel control instruction ECU 2602 transmits a message including steering wheel control information "0x01, 0x03, 0x20" onto the bus 2605 (step S3603). The anomaly detection ECU 2601 that has received this message reads "steering instruction angle" from the steering wheel control instruction information in that message, and saves in the data table (step S3604).

The anomaly detection ECU 2601 then determines the two of current value "steering instruction angle" of the steering wheel control instruction information that is data to be monitored, and past value "steering state angle" of the steering wheel state information that is data for comparison, to be anomalous, using the rule table illustrated in FIG. 33 (step S3605). This determination is completed before having received the final bit of the data frame being received from the bus 2605 that is the message including the data to be monitored, for example.

Next, an anomaly has been determined, so the anomaly detection ECU 2601 performs transmission inhibition processing of the message including the steering wheel control instruction information that is the data to be monitored, as vehicle protection processing (step S3606). As transmission inhibition processing of the message including the data to be monitored, the anomaly detection ECU 2601 transmits an error frame onto the bus 2605 before receiving the final bit of the data frame being received, that is the message including the data to be monitored from the bus 2605, for example. The data frame that was being received is overwritten and invalidated on the bus 2605 by this error message, so the ECUs connected to the bus 2605 cannot receive the original data frame in complete form. The anomaly detection ECU 2601 further instructs the external communication device 2604 to perform anomaly notification transmission processing of information indicating an anomaly to the server 400, as further vehicle protection processing (step S3607). This instruction is performed by transmitting onto the bus 2605 an anomaly notification message that is a data frame that has an ID set beforehand for the external communication device 2604 to receive, and that includes information indicating an anomaly, for example.

2.12 Processing at Anomaly Detection ECU

Figure 37:
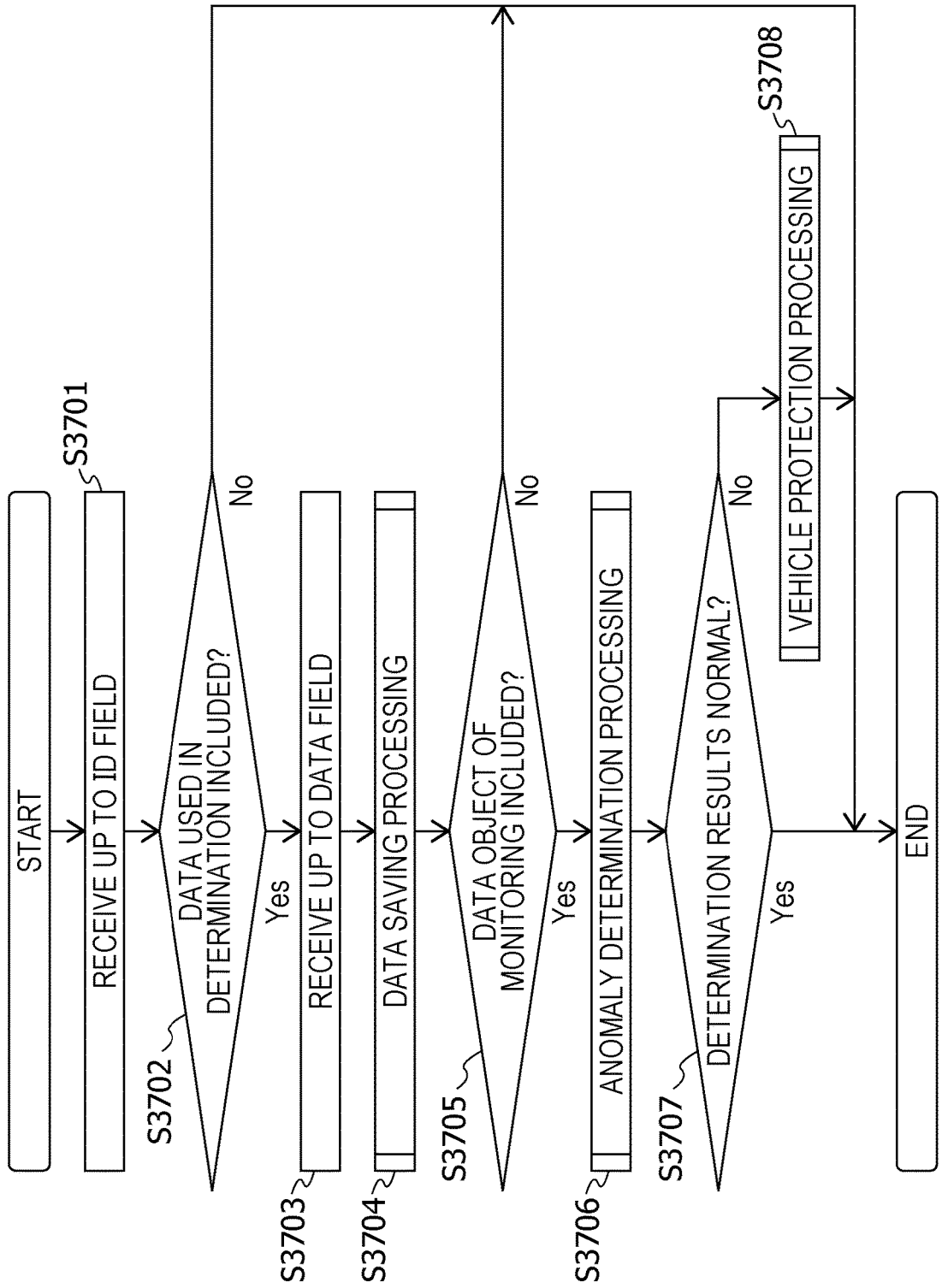
FIG. 37 is a flowchart illustrating an example of processing executed by the anomaly detection ECU according to the second embodiment.

FIG. 37 is a flowchart illustrating an example of processing executed by the anomaly detection ECU 2601. Operations of the anomaly detection ECU 2601 will be described below by way of FIG. 37.

The anomaly detection ECU 2601 receives up to the ID field of a data frame that is a message flowing over the bus 2605, and confirms the ID (step S3701).

Next, the anomaly detection ECU 2601 judges whether or not the confirmed ID is an ID stipulated beforehand to indicate data to be monitored or data for comparison indicated in a rule table stored in the rule storage unit 2704 (step S3702), and if the judgement is negative, the data frame being received is discarded and the flow ends. In a case where judgment in step S3702 is positive, the anomaly detection ECU 2601 receives the data frame appearing on the bus 2605 up to the data field (step S3703). There is no imperative need to wait until all bits in the data field are received in step S3703, and the flow can proceed to the next processing at the point that as far as a bit value necessary for performing determination based on a rule table has been received.

Next, the anomaly detection ECU 2601 records information that the data field of the data frame being received indicates in the data table, by the data saving processing (see FIG. 38) (step S3704).

Next, the anomaly detection ECU 2601 references rule tables stored at the rule storage unit 2704, and judges whether or not the message being received is a data frame including data to be monitored (step S3705). If a data frame including data to be monitored, anomaly determination processing (see FIG. 39) is performed, and determination is made regarding whether the data frame being received is normal or anomalous (step S3706). In a case where the anomaly detection ECU 2601 judges in step S3705 that this is not a data frame including data to be monitored, the flow ends.

After the determination at step S3706, the anomaly detection ECU 2601 judges whether the results of determination in the anomaly determination processing are normal or anomalous ((step S3707), and only in a case of an anomaly is the vehicle protection processing (see FIGS. 40 and 41) performed (step S3708).

2.13 Data Saving Processing at Anomaly Detection ECU 2601

Figure 38:
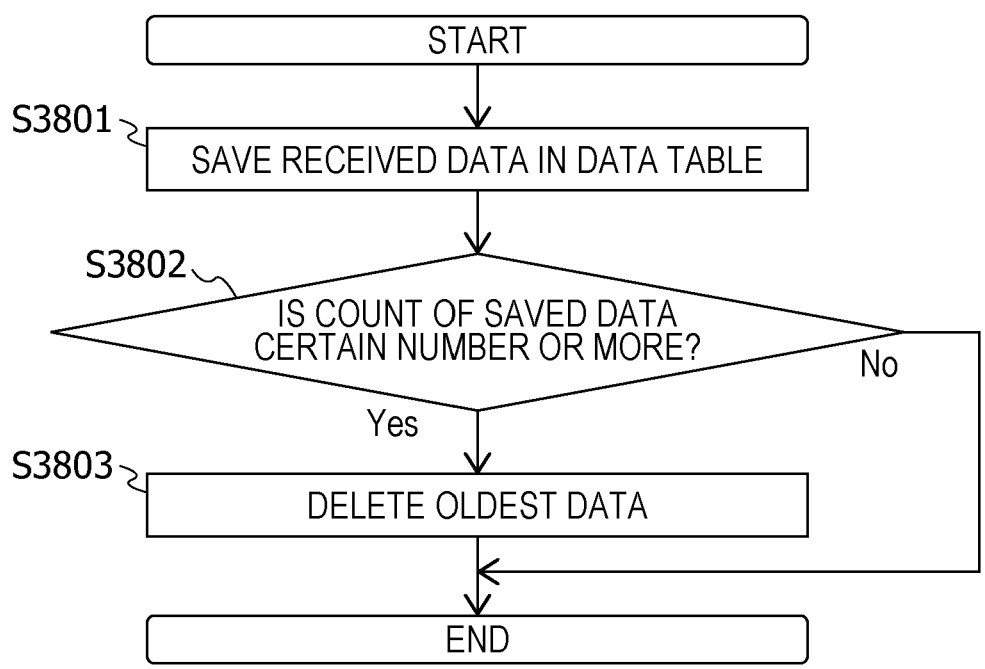
FIG. 38 is a flowchart illustrating an example of data saving processing executed by the anomaly detection ECU according to the second embodiment.

FIG. 38 is a flowchart illustrating an example of data saving processing at the anomaly detection ECU 2601. The data saving processing will be described below by way of FIG. 38.

The anomaly detection ECU 2601 saves information that the data field of the data frame being received indicates as data corresponding to the ID of the data frame in the data table (step S3801).

Next, the anomaly detection ECU 2601 judges whether or not the data count of the data table has reached a certain number or more as a result of having saved information in step S3801 (step S3802), and only in a case where this is a certain number or more, deletes the oldest data (step S3803). This certain number is a number decided beforehand taking into consideration the data used in the anomaly determination processing, and will be four in a case of saving the current value and two past values.

2.14 Anomaly Determination Processing at Anomaly detection ECU 2601

Figure 39:
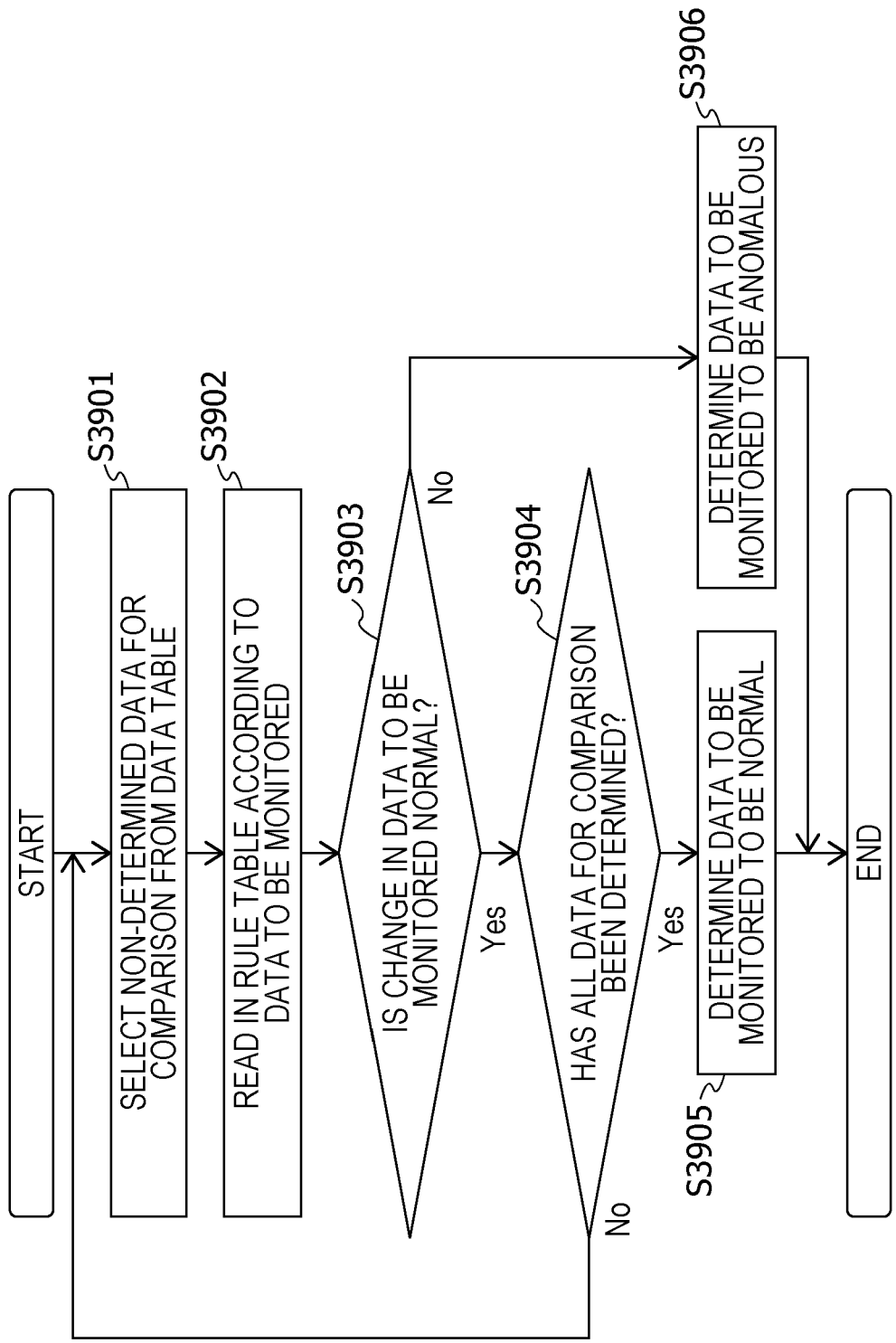
FIG. 39 is a flowchart illustrating an example of anomaly determination processing by the anomaly detection ECU according to the second embodiment.

FIG. 39 is a flowchart illustrating anomaly determination processing at the anomaly detection ECU 2601. The anomaly determination processing will be described below by way of FIG. 39.

In the anomaly determination processing shown in FIG. 39, determination is performed using the two values of the current value of data to be monitored and a pat value of the data for comparison. Although description has been made regarding the rule table in FIG. 33 that the data for comparison corresponding to the data to be monitored is only steering wheel state information, multiple of data for comparison may exist. For example, reference data in a fifth-type message including reference data (i.e., a data frame having an ID different from the third-type message and fourth-type message) may be handled as a second data for comparison. FIG. 39 illustrates an example of anomaly determination processing corresponding to a case where there are multiple of data for comparison.

First, the anomaly detection ECU 2601 selects non-determined data for comparison from the data table in the data storage unit 2705 (step S3901). The anomaly detection ECU 2601 then reads in the rule table corresponding to data to be monitored (the rule table shown in FIG. 33) from the rule tables in the rule storage unit 2704 (step S3902).

Next, the anomaly detection ECU 2601 determines whether the change in data to be monitored (difference value as to data for comparison) is normal or not, based on the rule table (step S3903), and in a case where the determination is negative, determines the data frame including the data to be monitored to be anomalous, and ends the anomaly determination processing (step S3906).

In a case where the change in the data to be monitored is judged to be normal in step S3903, the anomaly detection ECU 2601 judges whether or not determination in step S3903 has been performed for all data for comparison (step S3904). In a case where determination has not been performed regarding all data for comparison, the anomaly detection ECU 2601 returns to the processing of selecting data for comparison in step S3901. In a case where determination has been made regarding all data for comparison, the anomaly detection ECU 2601 determines that the data frame including the data to be monitored is normal, and the anomaly determination processing ends (step S3905).

2.15 Vehicle Protection Processing at Anomaly Detection ECU 2601

Figure 40:
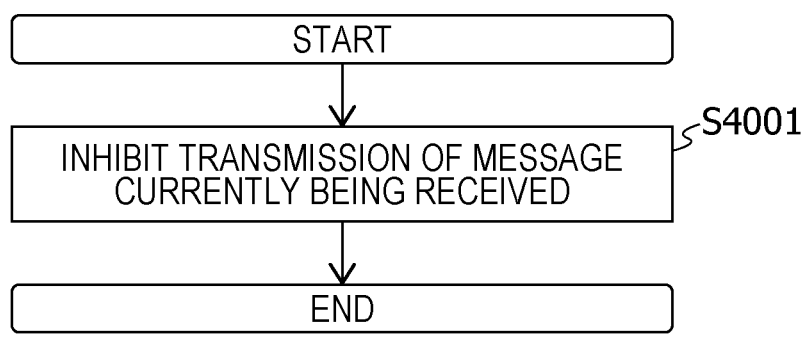
FIG. 40 is a flowchart illustrating an example of vehicle protection processing executed by the anomaly detection ECU according to the second embodiment.
Figure 41:
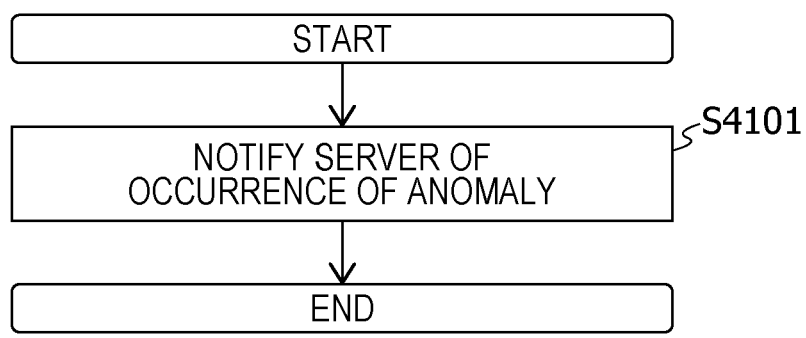
FIG. 41 is a flowchart illustrating another example of vehicle protection processing executed by the anomaly detection ECU according to the second embodiment.

FIGS. 40 and 41 each illustrate examples of vehicle protection processing by the anomaly detection ECU 2601. In the example of FIG. 40, an example is illustrated of ensuring safety of the vehicle 200 by transmission inhibition of the message currently being received. In this example, the anomaly detection ECU 2601 transmits a predetermined message that invalidates the message including the data to be monitored being received from the bus 2605 (step S4001). Specifically, the predetermined message is an error frame.

In the example in FIG. 41, an example is illustrated where the server 400 is notified that an anomaly is occurring at the vehicle 200 using the external communication device 2604, as vehicle protection processing. In this example, the anomaly detection ECU 2601 instructs the external communication device 2604, whereby the server 400 is notified of the occurrence of the anomaly from the external communication device 2604 via the external network 300 (step S4101). In step S4101, the external communication device 2604 may transmit information indicating the anomaly to other vehicles around the vehicle 200 by inter-vehicular communication. The external communication device 2604 may transmit information indicating the anomaly so as to include the VIN, body number, and so forth, to the server 400. The server 400 may transmit information indicating the anomaly to other vehicles, upon receiving notification from the vehicle 200. The server 400 may, for example, based on the vehicle identification number, body number, and so forth, notified from the vehicle 200, reference list information correlating these with vehicle types, to identify vehicles of the same vehicle type as the vehicle 200, and transmit information indicating the anomaly to vehicles of the same vehicle type. Vehicles of the same vehicle type have generally the same configuration for onboard networks, for example. Also, vehicles of the same vehicle type are vehicles of which the model in the body number (i.e., vehicle model) are the same, for example, or alternatively, are vehicles of which the digits in the vehicle identification number are the same from the beginning up to before the serial number. Alternatively, the external communication device 2604 may transmit information indicating the anomaly to vehicles that are of the same vehicle type as the vehicle 200. These notifications of the anomaly enable vehicles other than the vehicle 200 to also avoid danger and so forth.

The vehicle protection processing may be a combination of each processing illustrated in FIGS. 40 and 41, or may be processing other than these. Note that the vehicle 200 may have a notification device that notifies the server 400, vehicle 500, and so forth, that are outside of the vehicle 200, regarding the anomaly in a case where determination is made that an anomaly is occurring regarding a message, by anomaly determination processing at the anomaly detection ECU 2601. Although an example of a notification device in the vehicle 200 is the external communication device 2604, but the notification device is not restricted to a device having communication functions, and may be a warning device (e.g., a device that performs lighting control to light an emergency flashing display light, a device to perform control to sound a horn, etc.) that alerts vehicles nearby by emitting light, sound, or the like.

2.16 Warning Notification at Vehicle 500 Receiving Notification of Anomaly

The warning notification at the head unit of the vehicle 500 is the same as in the first embodiment, so description will be omitted here.

2.17 Advantages of Second Embodiment

In the onboard network system 2600 according to the present embodiment, even if an attacker transmits an unauthorized message at the same cycle as a cycle of transmission from valid ECUs connected to the onboard network, whether the message is normal or not can be determined based on a current value of received data to be monitored, and a past value of data for comparison. The onboard network system 2600 can deal with the attack in accordance with the determination results. Also, in the anomaly detection system 10 configured of multiple vehicles including the onboard network system 2600 and a server, the effects of an attack can be reduced by notification among vehicles regarding the occurrence of an attack.

Other Embodiments

The embodiments have been described above as examples of technology relating to the present disclosure. However, technology relating to the present disclosure is not restricted to this, and is applicable to embodiments where modifications, substitutions, addition, omission, and so forth have been made as appropriate. For example, the following modifications are also included in an embodiment of the present disclosure.

(1) Description has been made in the above embodiments that the determining unit 111 (2701), rule storage unit 114 (2704), and data storage unit 115 (2705) are components of the anomaly detection ECU 110 (2601) connected to the bus 150 (2605) for exchanging frames among multiple ECUs, but these may be components of another one or multiple ECUs. The above-described anomaly detection ECU 110 (2601) does not need to be an ECU dedicated to anomaly detection, as long as it is an ECU connected to the bus in the onboard network system, and may also have functions different from anomaly detection and processing. Also, one or more components of the anomaly detection ECU 110 (2601) may be transferred to another ECU. The anomaly detection processing, vehicle protection processing, and so forth at the anomaly detection ECU 110 (2601) may be performed by any other ECU. For example, an ECU or the like that receives a data frame and performs control of the vehicle in accordance with the contents of that data frame may have the same components as the above-described anomaly detection ECU 110 (2601). For example, the components of the anomaly detection ECU 110 (2601) may be included in gateway ECU that transfers data frames among busses in a case where the onboard network is configured of multiple busses. This is useful, since the gateway ECU can monitor the state of the busses. A gateway ECU including the configuration of the anomaly detection ECU 110 (2601) can, in order to suppress the vehicle from being unauthorizedly controlled by a data frame determined to be anomalous, performs processing such as suppressing transfer of the data frame determined to be anomalous among busses, and so forth, besides invalidating the anomalous data frame by an error frame. The components of the above-described anomaly detection ECU 110 (2601) may also be included as components of a key managing master ECU that manages secret keys.

(2) Although data frames in the CAN protocol are described in a standard ID format in the above embodiments, this may be the extended ID format, and IDs that are identification information of data frames may be extended IDs in the extended ID format, or the like.

(3) Although an example has been described in the above embodiments where the anomaly detection ECU 110 (2601) stores history of received data in a data table, and uses current values and past values for determination in anomaly determination processing, a greater amount of histories may be stored and used for determination. Data regarding time where there is no reception may be interpolated and stored in a data table or the like, taking into consideration transmission cycles of data frames decided beforehand.

(4) Although an example has been described in the above embodiments where the data storage unit 115 (2705) stores a value of a data field, as the content of a data frame that has been received, multiple values extracted from the content of a data field may be stored, and further the reception time and other information may be stored.

(5) Rules relating to the relation between gearshift position control information and speed control information. i.e., the relationship between gearshift position and vehicle speed, have been described in the above embodiments, as rules used for determining in anomaly determination processing, but gearshift position, vehicle speed, and so forth, are only one example. Rules used for determination may be stipulated with the relationship between data obtained from sensors, data indicating control instruction, and other optional data, as a reference for determination. In addition to vehicle speed and gearshift position, examples of data to be monitored or data for comparison include rotation speed of wheels, yaw rate, acceleration, steering angle, accelerator pedal angle, braking level, engine revolutions, electric motor revolutions, state of ignition switch, steering torque of steering wheel, whether or not there is an obstacle ahead, whether or not there is an obstacle behind, distance to obstacle ahead, distance to obstacle behind, state of recognition of pavement lane markings to the right and left, distance to pavement lane markings to the right and left, and so forth. The data to be monitored and data for comparison are not restricted to data indicating the state of the vehicle, and may be data indicating parameters for vehicle control, for example. In a case where the vehicle has parking assistance functions as a function of ADAS, and the anomaly detection ECU 110 is to perform anomaly detection of which the object is the parking assistance function. Data within messages of automatic steering may be data to be monitored, and data such as vehicle speed or gearshift position or the like may be data for comparison. Also, an example has been described in the above embodiments where the anomaly detection ECU 110 performs determination based on change in multiple of data of the same type received from the bus 150 having a temporal before-and-after relation, and so forth, and the relationship between other values of data of other types. Additionally, the anomaly detection ECU 110 may further determine, based on relationship of different types of data, whether a message including one of the types of data is anomalous or not. In the parking assistance function where automatic steering is performed when backing up to part, an upper limit is set for the speed of baking up at the time of performing automatic steering, for safety reasons and so forth. Accordingly, in a case where the speed that the received data indicates has exceeded the upper limit speed, a case where the gearshift position indicated by the received data is not "reverse", or the like, for example, the anomaly detection ECU 110 can receive a message including data of control instructions for automatic steering and determine that message to be anomalous.

Also, in a case where the anomaly detection ECU 110 performs anomaly detection where the object is lane keeping assistance functions as a function of ADAS, data within messages relating to control instructions of automatic steering may be data to be monitored, and data indicating vehicle speed, state of recognition of pavement lane markings to the right and left, distance to pavement lane markings to the right and left, and so forth, may be data for comparison. Lane keeping assistance functions where automatic steering is performed so that the vehicle does not stray from the lane have a lower limit to speed for traveling forward at the time of performing automatic steering, for safety reasons and so forth. Accordingly, in a case where the speed that the received data indicates has not reached the lower limit speed, a case where the left and right pavement lane markings necessary to comprehend the lane that the vehicle is traveling have not been recognized, the vehicle is not within a predetermined distance to either right or left pavement lane marking, or the like, for example, the anomaly detection ECU 110 can receive a message of automatic steering and determine that message to be anomalous.

Also, in a case where the anomaly detection ECU 110 performs anomaly detection where the object relating to automatic emergency braking is collision avoidance assistance functions as a function of ADAS, data within messages of automatic braking may be data to be monitored, and data such as vehicle speed, whether or not there is an obstacle, distance to obstacle, and so forth may be data for comparison. Automatic emergency braking where automatic braking is performed to avoid collision with an obstacle or to reduce the effects of collision with the obstacle has an upper limit and lower limit to speed for performing automatic braking, for safety reasons and so forth. Accordingly, in a case where the speed that the received data indicates is not between the range from the upper limit to the lower limit, a case where there is no obstacle as an object to avoid or reduce collision with, a case where the obstacle is not within a certain distance, or the like, for example, the anomaly detection ECU 110 can receive a message regarding automatic braking and determine that message to be anomalous.

Also, in a case where the anomaly detection ECU 110 performs anomaly detection where the object is adaptive cruise control functions as a function of ADAS, data within messages of control instructions for automatic acceleration/deceleration may be data to be monitored, and data such as current vehicle speed, target vehicle speed, whether or not there is a vehicle traveling ahead, distance to vehicle traveling ahead, and so forth may be data for comparison. Adaptive cruise control functions, where automatic acceleration/deceleration is performed to maintain distance as to a vehicle traveling ahead within a range where the upper limit is the target speed, have a lower limit to speed for traveling forward at the time of performing automatic acceleration/deceleration, for safety reasons and so forth. Accordingly, in a case where the current vehicle speed that the received data indicates has not reached the lower limit speed but a message has been received instructing automatic acceleration or automatic deceleration, a case where a message has been received instructing automatic deceleration in a state where there is no vehicle traveling ahead and the current vehicle speed has not reached the target vehicle speed, a case where a message has been received instructing automatic deceleration in a state where there is the certain distance or more to the vehicle traveling ahead and the current vehicle speed has not reached the target vehicle speed, a case where a message has been received instructing automatic acceleration in a state where the current vehicle speed has reached the target vehicle speed, a case where a message has been received instructing automatic acceleration though the vehicle traveling ahead is within the certain distance, or the like, for example, the anomaly detection ECU 110 can determine the message relating to automatic acceleration/deceleration to be anomalous.

(6) Although an example has been described in the above embodiments where the anomaly detection ECU 110 determines whether a message including data to be monitored is normal or anomalous based on the relationship between the data to be monitored and data for comparison, determination may be performed in an interlinked manner. For example, the anomaly detection ECU 110 may determine whether a message including data for comparison used for determining a message relating to data to be monitored is normal or anomalous. For example, the anomaly detection ECU 110 makes determination of whether a message including gearshift position control information is normal or not in the above embodiments, assuming that the speed control information is correct, but the possibility that the speed control information is unauthorized is conceivable. Accordingly, an arrangement may be made where, based on the relationship between speed control information and the driving method information of a hybrid automobile, a message including speed control information indicating that the vehicle speed has changed to 50 km while in a state of being driven by the electric motor, for example, is determined to be anomalous. The anomaly detection ECU 110 may also further determine whether the information of the driving method is unauthorized or not, using the amount of reduction in the remaining battery charge, and so forth, for example.

For example, in a case where the onboard network system 100 includes an ECU that periodically transmits a third-type message including reference data of a type that differs from data to be monitored contained in a first-type message and from data for comparison contained in a second-type message, the anomaly detection ECU 110 may be modified as follows. An arrangement may be made where the receiver 112 further successively receives the third-type message. The determining unit 111 further determines whether or not the second-type message received by the receiver 112 is normal, based on the content of the second-type message, the content of the third-type message that had been received last by the receiver 112 at the time of receiving the second-type message, and either of the content of a second-type message received further in the past by the receiver 112 than that second-type message, and the content of a third-type message received further in the past than the third-type message received last by the receiver 112, and the determining unit 111 determines whether the first-type message received by the receiver 112 is normal or anomalous, based on the content of the first-type message, the content of the second-type message that had been received last by the receiver 112 at the time of having the received the first-type message and that has been determined as being normal, and either of the content of the first-type message received further in the past by the receiver 112 than that first-type message, and the content of a second-type message received and determined to be normal further in the past than the second-type message that was received last by the receiver 112 and determined to be normal. Thus, performing interlinked determination, based on reference data that is the content of the third-type message regarding whether the data for comparison used for determination of the data to be monitored is normal or anomalous can further improve resistance against attacks. Accordingly, an attack will not be successful unless the attack is made under comprehension of the relationship among various types of data, which can increase the cost of attacking.

Also, for example, in the example described in modification (5) above regarding the anomaly detection ECU 110 performing anomaly detection for parking assistance functions, before automatic steering is performed to back up to park, the vehicle comes to a stop, the gearshift position changes to "reverse", and the vehicle backs up within a range of not exceeding the upper limit speed. Accordingly, an arrangement may be made where one of the data of the contents of various types of messages such as speed control information such as vehicle speed or the like, gearshift position control information such as gearshift position, control instructions of automatic steering, and so forth, are handled as data to be monitored and data for comparison, from moment to moment, and determination is made regarding whether the gearshift position has changed to "reverse" with the vehicle in a stopped state, the vehicle has changed to traveling backwards in a state where the gearshift position is in "reverse", the upper limit speed is not exceeded while the vehicle is backing up, and so forth, are satisfied, in that order, and if not satisfied in order, determination is made that a message relating to automatic steering is anomalous. In the same way, an arrangement may be made with regard to the lane keeping assistance functions, automatic emergency braking, and adaptive cruise control function, described in modification (5) above, whether a sequence of events that inevitably has to occur before each automatic control is satisfied in order, and if not satisfied in order, determination is made that a message relating to automatic control is anomalous.

(7) Although description has been made in the above embodiments that the determining unit 111 of the anomaly detection ECU 110 determines whether a message is anomalous or not based on a rule table, a rule table is only one example of a reference for the determination. The determining unit 111 can made the determination thereof in accordance of whether a predetermined reference decided beforehand has been satisfied or not. The predetermined reference, for example, stipulates the relationship between data in each of multiple messages including the same type of data received having a temporal before-and-after relation, and a data group of data of messages including data of a different type from these messages. For example, an arrangement may be made where, when a first-type message is received by the receiver 112, the determining unit 111 decides whether the first-type message is normal or anomalous in accordance with whether or not a first data to be monitored included in the first-type message, a first data for comparison included in the second-type message received last by the receiver 112, and second data to be monitored included in a first-type message received by the receiver 112 one time back from that first-type message, satisfy a predetermined reference A that has been decided beforehand. Also, for example, an arrangement may be made where, when a first-type message is received by the receiver 112, the determining unit 111 decides whether the first-type message is normal or anomalous in accordance with whether or not a first data to be monitored included in the first-type message, a first data for comparison included in the second-type message received last by the receiver 112, and second data for comparison included in a second-type message received by the receiver 112 one time back from that last time, satisfy a predetermined reference B that has been decided beforehand. Also, for example, an arrangement may be made where, when a first-type message is received by the receiver 112, the determining unit 111 decides whether the first-type message is normal or anomalous in accordance with whether or not a first data to be monitored included in the first-type message, a first data for comparison included in the second-type message received last by the receiver 112, second data to be monitored included in a first-type message received by the receiver 112 one time back from that first-type message, and second data for comparison included in a second-type message received by the receiver 112 one time back from the last, satisfy a predetermined reference C that has been decided beforehand.

In addition to the second-type message, the determining unit 111 may use a third-type message periodically transmitted to determine whether a message including data to be monitored is normal or anomalous. For example, the determining unit 111 may further determine whether a first-type message received by the receiver 112 is normal or anomalous, based on the content of the third-type message received last by the receiver 112 at the time of receiving the first-type message, and the content of a third-type message received further in the past than the third-type message received last by the receiver 112, in addition to whether one of the predetermined references A through C is satisfied.

(8) Although an example has been described in the above embodiments where the determining unit 111 makes determination based on at least one of the current value of the data to be monitored, the current value of the data for comparison, a past value of data to be monitored received one time back, and a past value of data for comparison received one time back, values of data received further in the past may be used to perform determination, instead of past values received one time back. For example, an arrangement may be made where, when a first-type message is received by the receiver 112, the determining unit 111 decides whether the first-type message is normal or anomalous in accordance with whether or not a first data to be monitored included in the first-type message, a first data for comparison included in the second-type message received last by the receiver 112, and second data to be monitored included in a first-type message including second data to be monitored of a value different from the first data to be monitored, received last by the receiver 112 before reception of the first-type message, satisfy a predetermined reference D that has been decided beforehand. Also, for example, an arrangement may be made where, when a first-type message is received by the receiver 112, the determining unit 111 decides whether the first-type message is normal or anomalous in accordance with whether or not a first data to be monitored included in the first-type message, a first data for comparison included in the second-type message received last by the receiver 112, and second data for comparison included in a second-type message including second data for comparison of a value different from the first data for comparison, received last by the receiver 112 before reception of the second-type message received last, satisfy a predetermined reference E that has been decided beforehand. Also, for example, an arrangement may be made where, when a first-type message is received by the receiver 112, the determining unit 111 decides whether the first-type message is normal or anomalous in accordance with whether or not a first data to be monitored included in the first-type message, a first data for comparison included in the second-type message received last by the receiver 112, second data for comparison included in a first-type message including second data for comparison of a value different from the first data for comparison, received by the receiver 112 before reception of the first-type message, and second data to be monitored in a second-type message including the second data to be monitored of a different value from the first data for comparison received last by the receiver 112 last before receiving the second-type message received last, satisfy a predetermined reference F that has been decided beforehand.

(9) Also, although an example has been described in the above embodiments where an anomaly detection ECU is installed in a vehicle and included in an onboard network system that performs communication for control of the vehicle, these may be included in a network system for control of an object of control other than a vehicle. Examples of objects of control other than vehicles include robots, aircraft, ships, machines, and so forth.

(10) In the above-described embodiments, an onboard network that performs transmission of data frames and so forth, in accordance with the CAN protocol, has been illustrated. This CAN protocol is to be understood to have a broad meaning, encompassing derivative protocols such as CANOpen used in embedded systems within automation systems and so forth, TTCAN (Time-Triggered CAN), CANFD (CAN with Flexible Data Rate) and so forth. Also, protocols other than the CAN protocol may be used in the onboard network. Examples of onboard network protocols that transmit state messages which are messages including information relating to the state of the vehicle, and control messages that are messages instructing predetermined control to the vehicle, include LIN (Local Interconnect Network), MOST (registered trademark) (Media Oriented Systems Transport), FlexRay (registered trademark), Ethernet (registered trademark), and so forth. Further, networks using these protocols may be used as sub-networks, and sub-networks relating to multiple types of protocols may be combined to configure the onboard network. The Ethernet (registered trademark) protocol may be understood to have a broad meaning, encompassing derivative protocols such as Ethernet (registered trademark) AVB (Audio Video Bridging) relating to IEEE 802.1, Ethernet (registered trademark) TSN (Time Sensitive Networking) relating to IEEE 802.1, Ethernet (registered trademark)/IP (Industrial Protocol), EtherCAT (registered trademark) (Ethernet (registered trademark) for Control Automation Technology), and so forth. Note that the communication channel of the onboard network may be a wired communication channel configured of a network bus, other wires, optical fiber, or the like, or may be another communication channel. The embodiments described above are applied to achieve high cyber security in the onboard network installed in a vehicle. However, the applications are not limited to those examples. The embodiments may be applied to achieve high security not only in vehicles but also mobilities such as construction machines, farm machines, vessels, railways, airplanes, or the like. That is, the embodiments described above may be applied to achieve high cyber security in mobility networks and mobility network systems. Furthermore, the embodiments can also be applied to communication networks used in factories or industrial control systems or can be applied to communication networks for controlling embedded devices.

(11) The devices such as ECUs described in the above embodiments may have, besides memory and processors, hard disk units, display units, keyboards, mice, and so forth. The external communication device 140 (2604) may also be connected to the anomaly detection ECU 110 (2601) by a communication path, without being connected to the bus 150 (2605), and have memory, processor, communication circuit, and so forth. The devices such as ECUs described in the above embodiments may also be arrangements where programs stored in memory are executed by processors so that the functions of the devices are realized by software, or may be realized by dedicated hardware (digital circuits, etc.) without using programs. Sharing of functions among the components within the devices may also be changed. The determining unit 111 (2701), receiver 112 (2702), transmitter 113 (2703), storage units (rule storage unit 114 (2704) and data storage unit 115 (2705)) of the anomaly detection ECU 110 (2601) may each be realized as integrated circuits such as, for example, a determining circuit, a reception circuit, a transmission circuit, and a storage circuit.

(12) Part or all of the components configuring the devices in the above-described embodiments may be configured as a single system LSI (Large Scale Integration). A system LSI is a super-multi-functional LSI manufactured integrating multiple components on a single chip, and specifically is a computer system configured including a microprocessor, ROM, RAM, and so forth. A computer program is recorded in the RAM. The system LSI realizes its functions by the microprocessor operating according to the computer program. The parts of the components making up the above devices may be individually formed into one chip, or part or all may be included in one chip. While description has been made here regarding a system LSI, there are different names such as IC, LSI, super LSI, and ultra LSI, depending on the degree of integration. The circuit integration technique is not restricted to LSIs, and dedicated circuits or general-purpose processors may be used to realize the same. An FPGA (Field Programmable Gate Array) which can be programmed after manufacturing the LSI, or a reconfigurable processor where circuit cell connections and settings within the LSI can be reconfigured, may be used. Further, in the event of the advent of an integrated circuit technology which would replace LSIs by advance of semiconductor technology or a separate technology derived therefrom, such a technology may be used for integration of the functional blocks, as a matter of course. Application of biotechnology and the like is a possibility.

(13) Part or all of the components of which the above-described devices are configured may be configured as an IC card detachably mountable to each device or a standalone module. The IC card or module is a computer system configured including a microprocessor, ROM, RAM, and so forth. The IC card or module may include the above-described super-multifunctional LSI. The IC card or module achieves its functions by the microprocessor operating according to the computer program. The IC card or module may be tamper-resistant.

(14) One aspect of the present disclosure may be an anomaly detection method including all or part of processing procedures illustrated in, for example, FIGS. 14 through 24 (FIGS. 35 through 41) or the like. For example, the anomaly detection method is an anomaly detection method used in an onboard network system having a plurality of electronic control units that communicate via a communication path of the onboard network, including an electronic control unit that periodically transmits a first-type message including data to be monitored, and an electronic control unit that periodically transmits a second-type message including data for comparison, and includes: a reception step (e.g., steps S100, S120 (S3701, S3703)) of successively receiving first-type messages and second-type messages from the communication path of the onboard network; a determining step (e.g., step S150 (S3706)) of determining whether a first-type message received in the reception step is normal or anomalous, based on content of the first-type message, content of a second-type message received last in the reception step at the time of receiving this first-type message, and either one of content of a first-type message received in the reception step further in the past than this first-type message, and content of a second-type message received in the reception step further in the past than the second-type message received last; and a transmission step (e.g., steps S171, S172 (S4001, S1401)) of transmitting in accordance with results of the determination in the determining step. In the transmission step, transmission of an error frame, transmission of information indicating the anomaly to outside of the vehicle, and so forth, can be performed, for example. An aspect of the present disclosure may be a program (computer program) which realizes this method by a computer, or may be digital signals made up of the computer program. An aspect of the present disclosure may be the computer program or the digital signals recorded in a computer-readable recording medium, such as for example, a flexible disk, a hard disk, a CD-ROM, MO, DVD, DVD-ROM, DVD-RAM, BD (Blu-ray (registered trademark) Disc), semiconductor memory, or the like. The present disclosure may also be the digital signals recorded in these recording mediums. An aspect of the present disclosure may be an arrangement where the computer program or the digital signals are transmitted over an electric communication line, wireless or cable communication line, a network of which the Internet is representative, data broadcasting, or the like. Also, an aspect of the present disclosure may be a computer system having a microprocessor and memory, where the memory records the computer program, and the microprocessor operates according to the computer program. The program or the digital signals may be recorded in the recording medium and transported, or the program or the digital signals may be transported over the network or the like, and thereby be executed by another computer system that is independent.

Although description has been made in the above embodiments that information including data to be monitored is steering wheel control instruction information and information containing data for comparison is steering wheel state information, the present disclosure is not restricted to this configuration. Information including data to be monitored may be deceleration control instruction information of reducing the speed of the vehicle using the foot brake, shifting down, and so forth, and the information including the data for comparison may be information indicating a state relating to the speed of the vehicle, such as vehicle speed information, wheel rotation speed information, degree of depressing the brake pedal, engine revolutions, electric motor revolutions, and so forth. Further, information including data to be monitored may be acceleration control instruction information for accelerating the speed of the vehicle using the accelerator or the like, and information including data for comparison may be information indicating a state relating to the speed of the vehicle, such as vehicle speed information, wheel rotation speed information, accelerator pedal angle, engine revolutions, electric motor revolutions, and so forth.

In a case where the onboard network system 100 includes an ECU that periodically transmits third-type message including reference data, that is of a different type from data to be monitored included in the first-type message and data for comparison included in the second-type message, the anomaly detection ECU 2601 may be modified as follows. The receiver 2702 further successively receives third-type messages. The determining unit 2701 further determines whether a second-type message received by the receiver 2702 is normal or not, based on content of that second-type message, content of a third-type message received last by the receiver 2702 at the time of receiving the second-type message, and either of content of a second-type message received by the receiver 2702 further in the past than the second-type message, and content of a third-type message received further in the past than the third-type message received last by the receiver 2702, and the determining unit 2701 determines whether the first-type message received by the receiver 2702 is normal or anomalous, based on content of the first-type message, content of the second-type message that was received last by the receiver 2702 at the timing of receiving the first-type message that has been determined to be normal, and either of content of a first-type message received further in the past by the receiver 2702 than that first-type message, and content of a second-type message that was received by the receiver 2702 and determined to be normal further in the past than the second-type message received last by the receiver 2702 and determined to be normal. Thus, performing interlinked determination or the like, based on reference data that is the content of the third-type message regarding whether the data for comparison used for determination of the data to be monitored is normal or anomalous can further improve resistance against attacks. Accordingly, an attack will not be successful unless the attack is made under comprehension of the relationship among various types of data, which can increase the cost of attacking.

(16) Forms realized by optionally combining the components and functions described in the above embodiments and the above modifications are also included in the scope of the present disclosure.

The present disclosure is usable in an onboard network system including an onboard network.

What is claimed is:

1. An anomaly detection electronic control circuit in a network system installed in a vehicle and having a plurality of electronic control circuits that communicate via a communication path, the anomaly detection electronic control circuit being connected to the communication path, the plurality of electronic control circuits including:

a first electronic control circuit that periodically transmits a first-type message which is a data frame that includes a predetermined value in an ID field, and that further includes data to be monitored in a data field, and a second electronic control circuit that periodically transmits a second-type message which is a data frame that includes a particular value that differs from the predetermined value in an ID field, and that further includes data for comparison in a data field, the anomaly detection electronic control circuit comprising:

a receiver circuit that successively receives first-type messages and second-type messages from the communication path, wherein the communication path is a network bus;

the plurality of electronic control circuits exchange frames following the Controller Area Network protocol;

the first-type messages include one of vehicle gearshift position or steering position data to be monitored including instruction information indicating an instruction as to the first electronic control circuit that controls behavior of the vehicle, and the second-type messages include data for comparison including state information indicating the state of the second electronic circuit;

a processor and a memory which stores an instruction such that the processor, upon executing the instruction, performs operations including determining whether a first-type message received by the receiver circuit is normal or anomalous, based on content of the first-type message, content of a second-type message last received by the receiver circuit at the time of receiving this first-type message, and at least one of content of a first-type message received by the receiver circuit further in the past than this first-type message, or content of a second-type message received by the receiver circuit further in the past than the second-type message last received; and a transmitter circuit that transmits a predetermined message, in accordance with results of the determination.

2. The anomaly detection electronic control circuit according to claim 1, further comprising:

a storage, wherein:

the receiver circuit stores, in the storage, content of each of the first-type message and second-type message that have been received, and the determining is performed by referencing the storage.

3. The anomaly detection electronic control circuit according to claim 1, wherein, when a first-type message is received by the receiver circuit, the determining is performed in accordance with whether or not a first data to be monitored included in the first-type message satisfy a predetermined reference, a first data for comparison included in the second-type message last received by the receiver circuit satisfy the predetermined reference, and second data to be monitored included in a first-type message received by the receiver circuit one time back from that first-type message satisfy the predetermined reference.

4. The anomaly detection electronic control circuit according to claim 1, wherein, when a first-type message is received by the receiver circuit, the determining is performed in accordance with whether or not a first data to be monitored included in the first-type message satisfy a predetermined reference, a first data for comparison included in the second-type message last received by the receiver circuit satisfy the predetermined reference, and second data for comparison included in a second-type message received by the receiver circuit one time back from that last time satisfy the predetermined reference.

5. The anomaly detection electronic control circuit according to claim 1, wherein, when a first-type message is received by the receiver circuit, the determining is performed in accordance with whether or not a first data to be monitored included in the first-type message satisfy a predetermined reference, a first data for comparison included in the second-type message last received by the receiver circuit satisfy the predetermined reference, second data to be monitored included in a first-type message received by the receiver circuit one time back from that first-type message satisfy the predetermined reference, and second data for comparison included in a second-type message received by the receiver circuit one time back from the last satisfy the predetermined reference.

6. The anomaly detection electronic control circuit according to claim 1, wherein, when a first-type message is received by the receiver circuit, the determining is performed in accordance with whether or not a first data to be monitored included in the first-type message satisfy a predetermined reference, a first data for comparison included in the second-type message last received by the receiver circuit satisfy the predetermined reference, and second data to be monitored included in a first-type message including second data to be monitored of a value different from the first data to be monitored, last received by the receiver circuit before reception of the first-type message satisfy the predetermined reference.

7. The anomaly detection electronic control circuit according to claim 1, wherein, when a first-type message is received by the receiver circuit, the determining is performed in accordance with whether or not a first data to be monitored included in the first-type message satisfy a predetermined reference, a first data for comparison included in the second-type message last received by the receiver circuit satisfy the predetermined reference, and second data for comparison included in a second-type message including second data for comparison of a value different from the first data for comparison, last received by the receiver circuit before reception of the second-type message last received satisfy the predetermined reference.

8. The anomaly detection electronic control circuit according to claim 1, wherein, when a first-type message is received by the receiver circuit, the determining is performed in accordance with whether or not a first data to be monitored included in the first-type message, a first data for comparison included in the second-type message last received by the receiver circuit satisfy a predetermined reference, second data to be monitored included in a first-type message including second data to be monitored of a value different from the first data to be monitored, last received by the receiver circuit before reception of the first-type message satisfy the predetermined reference, and second data for comparison in a second-type message including the second data for comparison of a different value from the first data for comparison received by the receiver circuit last before receiving the second-type message last received satisfy the predetermined reference.

9. The anomaly detection electronic control circuit according to claim 1, wherein the plurality of electronic control circuits includes a third electronic control circuit that periodically transmits a third-type message including reference data, wherein the receiver circuit successively receives third-type messages, and wherein the determining is further performed based on content of the third-type message last received by the receiver circuit at the time of receiving the first-type message, and content of a third-type message received further in the past than the third-type message last received by the receiver circuit.

10. The anomaly detection electronic control circuit according to claim 1, wherein the plurality of electronic control circuits includes a third electronic control circuit that periodically transmits a third-type message including reference data, wherein the receiver circuit further successively receives the third-type messages, wherein the operations further include determining whether a second-type message received by the receiver circuit is normal or not, based on content of the second-type message, content of a third-type message last received by the receiver circuit at the time of receiving the second-type message, and at least one of content of a second-type message received by the receiver further in the past than the second-type message, or content of a third-type message received further in the past than the third-type message last received by the receiver circuit, and wherein determining of whether the first-type message received by the receiver circuit is normal or anomalous is performed based on content of the first-type message, content of the second-type message that was last received by the receiver circuit at the time of receiving the first-type message that has been determined to be normal, and either of content of a first-type message received further in the past by the receiver circuit than that first-type message, or content of a second-type message that was received by the receiver circuit and determined to be normal further in the past than the second-type message last received by the receiver circuit and determined to be normal.

11. The anomaly detection electronic control circuit according to claim 1, wherein the network bus is a wired network bus in the vehicle.

12. The anomaly detection electronic control circuit according to claim 1, wherein, when data to be monitored in a first-type message is being received by the receiver circuit, the determining is performed before the final bit of the first-type message is received, and wherein, in a case where determination is made that the first-type message is anomalous, the transmitter circuit transmits a predetermined message that invalidates the first-type message onto the network bus before the final bit of the first-type message is received by the receiver circuit.

13. The anomaly detection electronic control circuit according to claim 1, wherein the transmitter circuit transmits an error frame as the predetermined message.

14. The anomaly detection electronic control circuit according to claim 1, wherein, in a case of determining that a first-type message is anomalous, the transmitter circuit transmits an anomaly notification message onto the network bus.

15. The anomaly detection electronic control circuit according to claim 1, wherein the vehicle gearshift position includes positions among a parking position, neutral position, reverse position and drive position.

16. An onboard network system installed in a vehicle, the onboard network system comprising:

a plurality of electronic control circuits that communicate via a network bus, the plurality of electronic control circuits exchanging frames following the Controller Area Network protocol and including a first electronic control circuit that periodically transmits a first-type message which is a data frame that includes a predetermined value in an ID field, and that further includes one of vehicle gearshift or steering position data to be monitored in a data field including instruction information indicating an instruction as to the first electronic control circuit that controls behavior of the vehicle, and a second electronic control circuit that periodically transmits a second-type message which is a data frame that includes a particular value that differs from the predetermined value in an ID field, and that further includes data for comparison in a data field, and that further includes data for comparison in a data field including state information indicating the state of the second electronic circuit; and an anomaly detection electronic control circuit connected to the network bus, wherein the anomaly detection electronic control circuit includes a receiver circuit that successively receives first-type messages and second-type messages from the network bus, and a processor and a memory which stores an instruction such that the processor, upon executing the instruction, performs operations including determining whether a first-type message received by the receiver circuit is normal or anomalous, based on
content of the first-type message,
content of a second-type message last received by the receiver circuit at the time of receiving this first-type message, and
at least one of content of a first-type message received by the receiver circuit further in the past than this first-type message, and content of a second-type message received by the receiver circuit further in the past than the second-type message last received.

17. The onboard network system according to claim 16, wherein the operations further include
notifying, in a case where a first-type message has been determined to be anomalous, a server situated outside of a first vehicle in which the onboard network system is installed, or a second vehicle other than the first vehicle, of the anomaly.

18. The onboard network system according to claim 17, wherein the operations further include
notifying, in a case where a first-type message has been determined to be anomalous, of the anomaly by transmitting information indicating the anomaly to the second vehicle that is of a same vehicle type as the first vehicle.

19. The onboard network system according to claim 17, wherein the operations further include
notifying, in a case where a first-type message has been determined to be anomalous, of the anomaly by transmitting information indicating the anomaly to the second vehicle that is present proximate the first vehicle.

20. An anomaly detection method used in a network system installed in a vehicle and having a plurality of electronic control circuits that communicate via a communication path, the plurality of electronic control circuits being connected to the communication path, the plurality of electronic control circuits including a first electronic control circuit that periodically transmits:
a first-type message, and
a second electronic control circuit that periodically transmits a second-type message, the anomaly detection method comprising:
successively receiving first-type messages and second-type messages from the communication path, wherein
the first type message is a data frame that includes a predetermined value in an ID field;
the second-type message which is a data frame that includes a particular value that differs from the predetermined value in an ID field, and that further includes data for comparison in a data field;
the communication path is a network bus;
the plurality of electronic control circuits exchange frames following the Controller Area Network protocol;
the first-type messages include one of vehicle gearshift position or steering position data to be monitored in a data field including instruction information indicating an instruction as to the first electronic control circuit that controls behavior of the vehicle, and
the second-type messages include data for comparison including state information indicating the state of the second electronic circuit;
determining whether a first-type message received in the receiving is normal or anomalous, based on
content of the first-type message,
content of a second-type message last received in the receiving at the time of receiving this first-type message, and
at least one of content of a first-type message received in the receiving further in the past than this first-type message, and content of a second-type message received in the receiving further in the past than the second-type message last received; and
transmitting at least one of the first-type message or the second-type message, in accordance with results of the determining.

* * * * *